(12) United States Patent
Teruyama

(10) Patent No.: US 9,083,679 B2
(45) Date of Patent: Jul. 14, 2015

(54) COMMUNICATION DEVICE, PROGRAM, AND COMMUNICATION METHOD FOR ACCURATELY TRANSMITTING A MESSAGE IN A DEVICE

(75) Inventor: Katsuyuki Teruyama, Tokyo (JP)

(73) Assignee: SONY CORPORATION, Tokyo (JP)

(*) Notice: Subject to any disclaimer, the term of this patent is extended or adjusted under 35 U.S.C. 154(b) by 686 days.

(21) Appl. No.: 12/942,401

(22) Filed: Nov. 9, 2010

(65) Prior Publication Data
US 2011/0124285 A1    May 26, 2011

(30) Foreign Application Priority Data

Nov. 20, 2009  (JP) ................ P2009-264880
Oct. 12, 2010  (JP) ................ P2010-229899

(51) Int. Cl.
*H04W 4/00* (2009.01)
*H04L 29/08* (2006.01)
(Continued)

(52) U.S. Cl.
CPC ............ *H04L 67/04* (2013.01); *H04L 12/6418* (2013.01); *H04L 69/08* (2013.01); *H04L 69/18* (2013.01); *H04L 69/324* (2013.01); *H04W 4/008* (2013.01)

(58) Field of Classification Search
CPC ......... G06F 9/54; H04L 69/12; H04L 69/324; H04W 4/008
USPC .............. 370/310, 314, 389, 392, 394, 395.1, 370/395.4, 464, 465, 466, 470, 473, 474; 455/41.1, 41.2
See application file for complete search history.

(56) References Cited

U.S. PATENT DOCUMENTS

| | | | | |
|---|---|---|---|---|
| 6,643,522 | B1 * | 11/2003 | Young | .................. 455/552.1 |
| 7,298,745 | B2 | 11/2007 | Egevang | |
| 2001/0002912 | A1 * | 6/2001 | Tony et al. | .................. 370/487 |

(Continued)

FOREIGN PATENT DOCUMENTS

| | | | | |
|---|---|---|---|---|
| EP | 1967990 A1 * | 9/2008 | ........... G06K 19/077 |
| EP | 2034428 | 3/2009 | |

(Continued)

OTHER PUBLICATIONS

EP Search Report for corresponding European Application EP 10 19 0820 dated Jul. 13, 2011.

(Continued)

*Primary Examiner* — Curtis A Alia
(74) *Attorney, Agent, or Firm* — K&L Gates LLP

(57) ABSTRACT

A communication device includes: a communication unit executing short-range radio communication with another device; a control unit controlling the short-range radio communication executed by the communication unit; a first fragmenting unit fragmenting a message transmitted from the communication unit to the control unit so as to have a predetermined size; a first message fragment transmission unit sequentially transmitting a plurality of message fragments obtained by fragmenting the message by the first fragmenting unit to the control unit; and a first termination message transmission unit transmitting a termination message, which is a message used to terminate the message fragments being transmitted by the first message fragment transmission unit, before another message when the another message is transmitted during the transmission of the plurality of message fragments from the communication unit to the control unit.

24 Claims, 34 Drawing Sheets

(51) Int. Cl.
*H04L 12/64* (2006.01)
*H04L 29/06* (2006.01)

(56) References Cited

U.S. PATENT DOCUMENTS

| | | | | |
|---|---|---|---|---|
| 2004/0258092 | A1* | 12/2004 | Sugaya | 370/474 |
| 2005/0014468 | A1* | 1/2005 | Salokannel et al. | 455/41.2 |
| 2007/0106804 | A1* | 5/2007 | Bosschaert et al. | 709/229 |
| 2008/0224825 | A1* | 9/2008 | Nystrom et al. | 340/10.1 |
| 2008/0288958 | A1* | 11/2008 | Ryoo et al. | 719/313 |
| 2009/0147803 | A1* | 6/2009 | Takayama | 370/475 |
| 2009/0274099 | A1* | 11/2009 | Gao et al. | 370/328 |

FOREIGN PATENT DOCUMENTS

| | | |
|---|---|---|
| JP | 2008-219323 | 9/2008 |
| JP | 2008219323 | 9/2008 |
| WO | WO 9708838 A2 * | 3/1997 |
| WO | 2008071924 | 6/2008 |

OTHER PUBLICATIONS

"Promising Secure Element Alternatives for NFC Technology" Marie Reveilhae and Mare Pasquet, IEEE Computer Society, 2009 First International Workshop on Near Field Communication.
European Patent Office, Extended European Search Report issued in connection with European Patent Application No. 12159607.6, dated Nov. 2, 2012. (7 pages).

* cited by examiner

| VALUE | EVENT |
|---|---|
| '10' | EVT_SEND_DATA |
| '11' | EVT_FIELD_ON |
| '12' | EVT_CARD_DEACTIVATED |
| '13' | EVT_CARD_ACTIVATED |
| '14' | EVT_FIELD_OFF |

FIG. 20

| ConnID | P_ID | NCI BUFFER SIZE | HCI BUFFER SIZE |
|---|---|---|---|
| NCI COMMUNICATION CHANNEL IDENTIFICATION | HCI COMMUNICATION CHANNEL IDENTIFICATION | DEPENDENT ON CLF CAPABILITY AND DH CAPABILITY | DEPENDENT ON HCI TRANSPORT LAYER |

FIG. 21

| HEADER | | MESSAGE | |
|---|---|---|---|
| CB | P_ID | TYPE | DATA |
| | | INSTRUCTION | |
| | | EVT_SEND_DATA | PBF | NCI DATA |

CB    CB=0 INDICATES THE HCP PACKET IS SEGMENTED BY SWP BUFFER SIZE

P_ID  CORRESPONDING TO ConnID MANAGED BY CLF
      ASSIGNED BY CLF WHEN PIPE IS CONNECTED PBF   PBF=1 WHEN THERE IS SUBSEQUENT NCI DATA. MEANINGFUL DATA DOES NOT BECOME IN THE ENTIRETY IS NOT INCLUDED, WHEN THERE IS SUBSEQUENT NCI DATA UICC ACQUIRES INFORMATION ON LENGTH OF NCI DATA FROM TRANSPORT LAYER OF HCI SIZE OF PBF IS 1 BYTE. 0X10 IS REGARDED AS PBF=1 AND 0X00 IS REGARDED AS PBF=0

FIG. 22

| MT | PBF | ConnID | Credit_Avail | L | DATA |
|---|---|---|---|---|---|
| DATA | | | | | HCI DATA |

PBF         PBF=1 INDICATES THE NCI DATA MESSAGE IS SEGMENTED BY NCI BUFFER SIZE

ConnID      CORRESPONDING TO pID MANAGED BY CLF

ASSIGNED BY CLF WHEN CONNECTION IS CONNECTED

Credit_Avail USED FOR NCI FLOW CONTROL MANAGED BY CLF

L           LENGTH OF DATA

WHEN HCI DATA IS LARGER THAN L, DATA IS FRAGMENTED BY PBF AND THUS DH CAN BE IDENTIFIED

COMMUNICATION DEVICE, PROGRAM, AND COMMUNICATION METHOD FOR ACCURATELY TRANSMITTING A MESSAGE IN A DEVICE

CROSS REFERENCES TO RELATED APPLICATIONS

The present application claims priority to Japanese Priority Patent Applications JP 2009-264880 filed in the Japan Patent Office on Nov. 20, 2009 and Japanese Priority Patent Application JP 2010-229899 filed in the Japan Patent Office on Oct. 12, 2010, the entire contents of which are hereby incorporated by reference.

BACKGROUND

The present application relates to a communication device, a program, and a communication method, and more particularly, to a communication device, a program, and a communication method capable of more accurately transmitting a message in a device.

In the past, there was a specification in which when a message is transmitted via pipes inside an NFC (Near Field Communication) device performing a short-range radio communication, one message is fragmented and the fragmented messages are transmitted as message fragments, and then the message fragments are re-assembled into one message by a reception side in conformity with the ETSI (European Telecommunications Standards Institute) SCP (Smart Card Platform) HCI (Host Controller Interface) standard (TS 102 622 V7.5.0) which defines a logical interface between a CLF (Contactless Front End) and a UICC (Universal Integrated Circuit Card).

When an undelivered message (NAK) occurs, a method of fragmenting and transmitting the packet into a plurality of pieces has been suggested (for example, Japanese Unexamined Patent Application Publication No. 2008-219323).

SUMMARY

However, for example, when an event occurs during transmission of the message fragments and an event message giving notification of the event is preferentially transmitted, a problem may arise in that the reception side may recognize the event message as one of the message fragments and thus may not recognize the event message.

When the event message is not correctly recognized, for example, a problem may arise in that a mismatch may occur between the state of an RF (Radio Frequency) unit executing non-contact communication and the internal state of the NFC device and thus processing by the NFC device may not be correctly performed.

It is desirable to provide a communication device, a program, and a communication method capable of more accurately transmitting a message in a device.

According to an embodiment, there is provided a communication device including: communication means for executing short-range radio communication with another device; control means for controlling the short-range radio communication executed by the communication means; first fragmenting means for fragmenting a message transmitted from the communication means to the control means so as to have a predetermined size; first message fragment transmission means for sequentially transmitting a plurality of message fragments obtained by fragmenting the message by the first fragmenting means to the control means; and first termination message transmission means for transmitting a termination message, which is a message used to terminate the message fragments being transmitted by the first message fragment transmission means, before another message when the another message is transmitted during the transmission of the plurality of message fragments from the communication means to the control means.

The predetermined size may be an upper limit value of data size determined by a data transmission standard between the communication means and the control means.

The communication device may further include event detection means for detecting occurrence of an event; and event transmission means for transmitting an event message used to give notification of the event from the communication means to the control means when the event detection means detects the occurrence of the event. The first termination message transmission means may transmit the termination message before the transmission of the event message, when the event transmission means transmits the event message during the transmission of the plurality of message fragments by the first message fragment transmission means.

The event detection means may detect disconnection of the short-range radio communication, which is executed by the communication means, with the another device. The first termination message transmission means may terminate the message fragments and transmit the termination message indicating that a cause for terminating the message fragments is the disconnection of the short-range radio communication. The event transmission means may transmit an event message indicating the disconnection of the short-range radio communication after the transmission of the termination message ends.

Flag information indicating whether the message fragment is a message fragment other than the final message fragment may be added to the message fragment. The flag information with a value indicating that the message fragment is the final message fragment may be added to the termination message.

The communication device may further include message reception means for receiving the message fragments transmitted by the first message fragment transmission means or the termination message transmitted by the first termination message transmission means; message determination means for determining a value of the flag information added to the message received by the message reception means; synthesis means for synthesizing the messages determined as the message fragments by the message determination means; and confirmation means for confirming the message determined not to be the message fragment by the message determination means or the message synthesized by the synthesis means.

The communication device may further include period determination means for determining whether a period in which the message is not transmitted by the first fragment message transmission means exceeds a maximum allowable value; and setting update means for updating setting of an operation of the control means when the period determination means determines that the period in which the message is not transmitted exceeds the maximum allowable value.

The communication device may further include second fragmenting means for fragmenting a message to be transmitted from the control means to the communication means so as to have a predetermined size; second message fragment transmission means for sequentially transmitting a plurality of message fragments obtained by fragmenting the message by the second fragmenting means to the communication means; and second termination message transmission means for transmitting a termination message, which is a message used to terminate the message fragments being transmitted by the second message fragment transmission means, before another message when the another message is transmitted during the transmission of the plurality of message fragments from the control means to the communication means.

The second termination message transmission means may transmit the termination message of an empty message to terminate the message fragments.

The communication device may further include event detection means for detecting occurrence of an event; event transmission means for transmitting an event message used to give notification of the event from the communication means to the control means when the event detection means detects the occurrence of the event; and event reception means for receiving the event message transmitted by the event transmission means. The second termination message transmission means may transmit the termination message, when the event reception means receives the event message during the transmission of the plurality of message fragments by the second message fragment transmission means.

According to another embodiment, there is provided a program causing a computer to function as: communication means for executing short-range radio communication with another device; control means for controlling the short-range radio communication executed by the communication means; fragmenting means for fragmenting a message transmitted from the communication means to the control means so as to have a predetermined size; message fragment transmission means for sequentially transmitting a plurality of message fragments obtained by fragmenting the message by the fragmenting means to the control means; and termination message transmission means for transmitting a termination message, which is a message used to terminate the message fragments being transmitted by the message fragment transmission means, before another message when the another message is transmitted during the transmission of the plurality of message fragments from the communication means to the control means.

According to still another embodiment, there is provided a communication method including the steps of: executing, by communication means of a communication device, short-range radio communication with another device; controlling, by control means of the communication device, the short-range radio communication; fragmenting, by fragmenting means of the communication device, a message transmitted from the communication means to the control means so as to have a predetermined size; sequentially transmitting, by message fragment transmission means of the communication device, a plurality of message fragments obtained by fragmenting the message to the control means; and transmitting, by termination message transmission means of the communication device, a termination message, which is a message used to terminate the message fragments being transmitted, before another message when the another message is transmitted during the transmission of the plurality of message fragments from the communication means to the control means.

According to still another embodiment, there is provided a communication device including: short-range radio communication means for executing short-range radio communication with another device; first processing means for transmitting and receiving a message to and from the another device through the short-range radio communication executed by the short-range radio communication means and having a first interface of a predetermined standard; second processing means for having a second interface of a standard different from that of the first interface and communicating with the first processing means via the second interface; reception means for receiving a first message, which is a message to be transmitted to the second processing means, from the first processing means via the first interface and receiving a second message, which is a message to be transmitted to the first processing means, from the second processing means via the second interface; conversion means for converting a format of the first message received by the reception means from a format of the first interface to a format of the second interface and converting a format of the second message received by the reception means from the format of the second interface to the format of the first interface; and transmission means for transmitting the first message, of which the format is converted into the format of the second interface by the conversion means, to the second processing means via the second interface and transmitting the second message, of which the format is converted into the format of the first interface by the conversion means, to the first processing means via the first interface.

The conversion means may include: size comparison means for comparing a size of the second message to the maximum size of data in the format of the first interface; and fragmenting means for fragmenting the second message when the size of the second message is larger than the maximum size as the comparison result of the size comparison means. The transmission means may transmit message fragments obtained by fragmenting the second message by the fragmenting means one by one.

The conversion means may further include synthesis means for synthesizing a plurality of the second messages until the size of the sum of the plurality of second messages exceeds the maximum size as the comparison result of the size comparison means. The transmission means may transmit the plurality of second messages synthesized by the synthesis means at once.

The conversion means may further include flag determination means for determining a value of flag information indicating whether there is a subsequent message fragmented from data with the same meaning as that of the second message. The synthesis means may also terminate the synthesis even in a case where the size of the sum of the plurality of second messages is smaller than the maximum size, when the flag determination means determines that there is no subsequent message. The transmission means may transmit the messages synthesized when the synthesis means terminates the synthesis at once.

The conversion means may include: size comparison means for comparing a size of the first message to the maximum size of data in the format of the second interface; and fragmenting means for fragmenting the first message when the size of the first message is larger than the maximum size as the comparison result of the size comparison means. The transmission means may transmit message fragments obtained by fragmenting the first message by the fragmenting means one by one.

The conversion means may include synthesis means for synthesizing a plurality of the first messages until the size of the sum of the plurality of first messages exceeds the maximum size as the comparison result of the size comparison means. The transmission means may transmit the plurality of first messages synthesized by the synthesis means at once.

The conversion means may further include flag determination means for determining a value of flag information indicating whether there is a subsequent message fragmented from data with the same meaning as that of the first message. The synthesis means may also terminate the synthesis even in a case where the size of the sum of the plurality of first messages is smaller than the maximum size, when the flag determination means determines that there is no subsequent message. The transmission means may transmit the messages synthesized when the synthesis means terminates the synthesis at once.

The conversion means may set the second message and flag information indicating whether there is a subsequent message fragmented from data with the same meaning as the second message to data in the format of the first interface, when the conversion means converts the format of the second message. The conversion means may set the first message to data in the format of the second interface when the conversion means converts the format of the first message.

According to still another embodiment, there is provided a program causing a computer to function as: short-range radio communication means for executing short-range radio communication with another device; first processing means for transmitting and receiving a message to and from the another device through the short-range radio communication executed by the short-range radio communication means and having a first interface of a predetermined standard; second processing means for having a second interface of a standard different from that of the first interface and communicating with the first processing means via the second interface; reception means for receiving a first message, which is a message to be transmitted to the second processing means, from the first processing means via the first interface and receiving a second message, which is a message to be transmitted to the first processing means, from the second processing means via the second interface; conversion means for converting a format of the first message received by the reception means from a format of the first interface to a format of the second interface and converting a format of the second message received by the reception means from the format of the second interface to the format of the first interface; and transmission means for transmitting the first message, of which the format is converted into the format of the second interface by the conversion means, to the second processing means via the second interface and transmitting the second message, of which the format is converted into the format of the first interface by the conversion means, to the first processing means via the first interface.

According to still another embodiment, there is provided a communication method including: executing short-range radio communication with another device by short-range radio communication means of a communication device; transmitting and receiving a message to and from the another device through the short-range radio communication by first processing means of the communication device for having a first interface of a predetermined standard; communicating with the first processing means via a second interface by second processing means of the communication device for having the second interface of a standard different from that of the first interface; receiving a first message, which is a message to be transmitted to the second processing means, from the first processing means via the first interface and receiving a second message, which is a message to be transmitted to the first processing means, from the second processing means via the second interface by reception means of the communication device; converting a format of the received first message from a format of the first interface to a format of the second interface and converting a format of the received second message from the format of the second interface to the format of the first interface by conversion means of the communication device; and transmitting the first message, of which the format is converted into the format of the second interface, to the second processing means via the second interface and transmitting the second message, of which the format is converted into the format of the first interface, to the first processing means via the first interface by transmission means of the communication device.

According to still another embodiment, short-range radio communication with another device is executed, the short-range radio communication is controlled, a message transmitted from the communication unit to the control unit is fragmented so as to have a predetermined size; a plurality of message fragments obtained by fragmenting the message is sequentially transmitted to the control unit, and a termination message, which is a message used to terminate the message fragments being transmitted, is transmitted from a communication unit to a control unit before another message when the another message is transmitted during the transmission of the plurality of message fragments from the communication unit to the control unit.

According to still another embodiment, short-range radio communication is executed with another device, a first interface of a predetermined standard transmitting and receiving a message to and from the another device through the short-range radio communication is included, a second interface of a standard different from that of the first interface is included, communication is executed with a first processing unit via the second interface and a first message, which is a message to be transmitted to a second processing unit, is received from the first processing unit via the first interface, a second message, which is a message to be transmitted to the first processing unit, is received from the second processing unit via the second interface, a format of the received first message is converted from a format of the first interface to a format of a second interface, a format of the received second message is converted from the format of the second interface to the format of the first interface, the first message, of which the format is converted into the format of the second interface, is transmitted to the second processing unit via the second interface, and the second message, of which the format is converted into the format of the first interface, is transmitted to the first processing unit via the first interface.

According to an embodiment, a message can be transmitted and received. In particular, the message can be transmitted in a device more accurately.

Additional features and advantages are described herein, and will be apparent from the following Detailed Description and the figures.

BRIEF DESCRIPTION OF THE FIGURES

FIG. 20 is a diagram illustrating a correspondence table of ID.

FIG. 21 is an explanatory diagram illustrating an example of a case where an HCI message format includes NCI data.

FIG. 22 is an explanatory diagram illustrating an example of a case where an NCI message format includes HCI data.

DETAILED DESCRIPTION

Embodiments of this application will be described below with reference to the drawings. The description will be made in the following order.

1. First Embodiment (Communication Device)
2. Second Embodiment (Communication Device)
3. Third Embodiment (Communication Device)
4. Fourth Embodiment (Computer)

1. First Embodiment

Communication Device

Configuration of Communication Device

Figure 1:
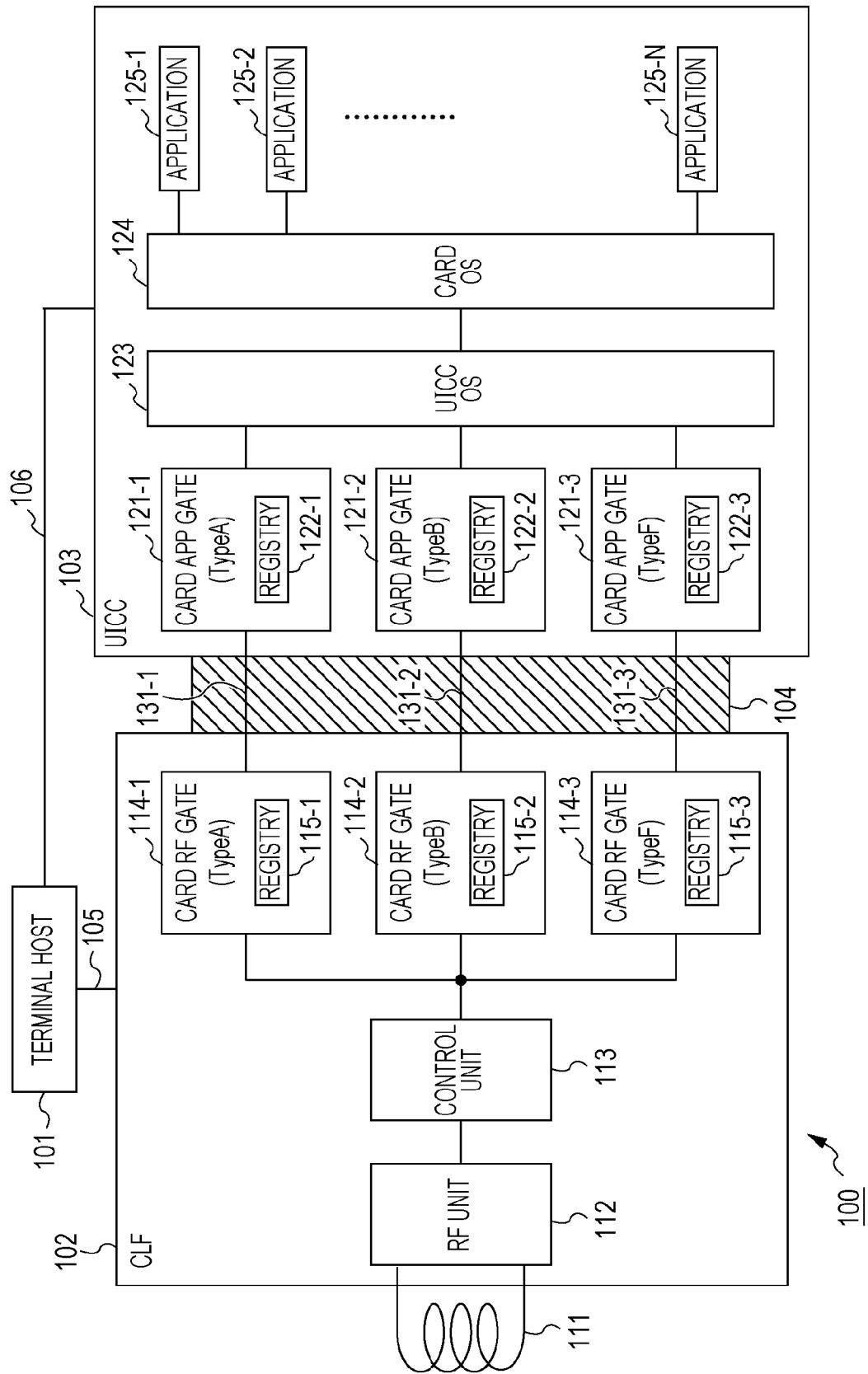
FIG. 1 is a block diagram illustrating an exemplary overall configuration of a communication device according to an embodiment.

FIG. 1 is a block diagram illustrating an exemplary overall configuration of a communication device according to an embodiment.

A communication device 100 shown in FIG. 1 is an NFC device that has a non-contact short-range radio communication function. Examples of the communication device 100 include a mobile phone, a smart phone, a PDA (Personal Digital Assistants), a personal computer, an UMPC (Ultra Mobile Personal Computer), an audio device, and a car navigation system. The communication device 100 is an electronic device that has a function of a so-called non-contact IC card.

As shown in FIG. 1, the communication device 100 includes a terminal host 101 serving as a control unit controlling the communication device as a whole, a CLF 102 executing non-contact short-range radio communication, and a UICC 103 serving as a control unit controlling the non-contact short-range radio communication executed by the CLF 102.

The CLF 102 and the UICC 130 are connected to each other through a bus 104. For example, the bus 104 is formed by a single physical line. The terminal host 101 and the CLF 102 are also connected to each other through a bus 105. For example, the bus 105 is formed by two physical lines. The terminal host 101 and the UICC 103 are connected to each other through, for example, a bus 106.

The CLF 102 includes an antenna 111, an RF unit 112, a control unit 113, and card RF gates 114-1 to 114-3.

The antenna 111 is an antenna that transmits and receives a non-contact short-range radio communication signal to and from an external device such as a reader/writer (R/W). For example, a loop antenna is used as the antenna 111.

The RF unit 112 transmits and receives the non-contact short-range radio communication signal. For example, the RF unit 112 transmits a message supplied from the control unit 113 as the non-contact short-range communication signal via the antenna 111 or receives the non-contact short-range radio communication signal transmitted from an external device via the antenna 111 to supply a message included in the received non-contact short-range radio communication signal to the control unit 113.

The control unit 113 controls the RF unit 112 to control the transmission and reception of the non-contact short-range radio communication signal. The control unit 113 controls the card RF gates 114-1 to 114-3 to control transmission and reception of the message to and from the UICC 103.

Here, the CLF 102 and the UICC 103 are connected to each other according to a logical interface defined in the ETSI SCP HCI standard. In the interface of the HCI standard, end points called gates are connected to each other through a communication channel called a pipe.

The card RF gates 114-1 to 114-3 are gates of the CLF 102 in the interface of the HCI standard.

The card RF gate 114-1 has a registry 115-1 storing a message or the like transmitted and received over the interface of the HCI standard. The card RF gate 114-1 is connected to a card application gate (hereinafter, referred to as a card APP gate) 121-1 which is a gate of the UICC 103 via a pipe 131-1. That is, the card RF gate 114-1 and the card APP gate 121-1 transmit and receive a message or the like to and from each other via the pipe 131-1.

Likewise, the card RF gate 114-2 has a registry 115-2 and is connected to a card APP gate 121-2 via a pipe 131-2. That is, the card RF gate 114-2 and the card APP gate 121-2 transmit and receive a message or the like to and from each other via the pipe 131-2.

Likewise, the card RF gate 114-3 has a registry 115-3 and is connected to a card APP gate 121-3 via a pipe 131-3. That is, the card RF gate 114-3 and the card APP gate 121-3 transmit and receive a message or the like to and from each other via the pipe 131-3.

Hereinafter, when it is not necessary to distinguish the card RF gates 114-1 to 114-3 from each other in the following description, the card RF gates 114-1 to 114-3 are simply called the card RF gates 114. In addition, when it is not necessary to distinguish the registries 115-1 to 115-3 from each other in the following description, the registries 115-1 to 115-3 are simply called the registries 115.

The UICC 103 includes the card APP gates 121-1 to 121-3, a UICC OS (Operating System) 123, a card OS 124, and applications 125-1 to 125-N.

The card APP gates 121-1 to 121-3 are gates of the UICC 103 in the interface of the above-described HCI standard.

The card APP gate 121-1 is connected to the card RF gate 114-1 via the pipe 131-1 and has a registry 122-1 storing a message or the like to be transmitted or received.

Likewise, the card APP gate 121-2 is connected to the card RF gate 114-2 via the pipe 131-2 and has a registry 122-2 storing a message or the like to be transmitted or received.

Likewise, the card APP gate 121-3 is connected to the card RF gate 114-3 via the pipe 131-3 and has a registry 122-3 storing a message or the like to be transmitted or received.

Hereinafter, when it is not necessary to distinguish the card APP gates 121-1 to 121-3 from each other in the following description, the card APP gates 121-1 to 121-3 are simply called the card APP gates 121. In addition, when it is not necessary to distinguish the registries 122-1 to 122-3 from each other, the registries 122-1 to 122-3 are simply called the registries 122.

Likewise, when it is not necessary to distinguish the pipes 131-1 to 131-3 from each other, the pipes 131-1 to 131-3 are simply called the pipes 131.

The interface of the HCI standard for the gates and the pipes are installed in each function or application. The CLF 102 and the UICC 103 have the arbitrary number of interfaces of the HCI standard. The CLF 102 and the UICC 103 may have a gate or a pipe other than the gates or the pipes shown in FIG. 1. For example, CLF 102 and the UICC 103 may have a gate or a pipe for an application realizing an operation of a reader/writer of the non-contact short-range radio communication.

The UICC OS 123 is basic software supplying the hardware interface of the UICC 103 to the software. The card OS 124 is basic software supplying an interface regarding the function of a non-contact IC card executing the non-contact short-range radio communication to the software.

The applications 125-1 to 125-N are software using the non-contact short-range radio communication and realizing different functions.

The logical interface between the CLF 102 and the UICC 103 has hitherto been described. However, the logical interface between the terminal host 101 and the CLF 102 and the logical interface between the terminal host 101 and the UICC 103 may be also configured by the interface of the HCI standard.

HCP Packet

Figure 2:
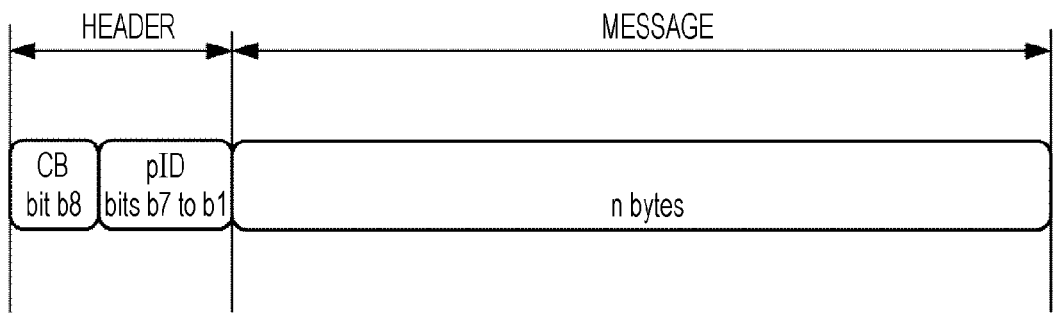
FIG. 2 is a diagram illustrating an exemplary structure of an HCP packet.

Next, the HCI standard will be described. FIG. 2 is a diagram illustrating an exemplary structure of an HCP (Host Controller Protocol) packet. A message transmitted and received through the pipes is packeted in the data link layer by a host controller, as shown in FIG. 2.

As shown in FIG. 2, the packet includes a header and a message.

The header includes a CB (Chaining bit) and a $P_{ID}$ (Pipe Identifier).

The CB is flag information indicating whether the message of the packet is a fragmented message other than the final fragmented message.

For example, when the message of the packet is the fragmented (segmented) message (message fragment) and is not the final message of the plurality of fragmented messages (that is, the message fragment other than the final message fragment), the CB has "0".

For example, when it is determined that the message of the packet is not the fragmented message or is the final message of the fragmented messages, the CB has "1".

The $P_{ID}$ is identification information identifying the pipe used to transmit the packet. That is, the $P_{ID}$ is also information regarding the transmission destination gate of the packet.

n-byte message information is stored in the message.

HCP Message

Figure 3:
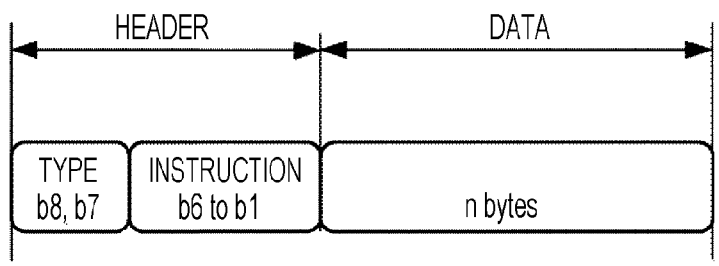
FIG. 3 is a diagram illustrating an exemplary structure of optional data of a message.

Likewise, the message includes a message header and data, as shown in FIG. 3.

The message header includes a type and an instruction.

The type is identification information indicating the type of instruction. For example, the instruction indicates "commands" (TYPE=0), "events" (TYPE=1), and "responses to commands" (TYPE=2). There is also TYPE=3 as reserves (RFU).

Data can be added irrespective of the types of instruction. The usable event or the detail of the command is determined in advance by the gate. The gate permits an event or a command only when the pipe is opened. The gate does not permit an event or a command when the pipe awaits the response to a command.

The instruction indicates identification information of an instruction.

Message Fragment

Figure 4:
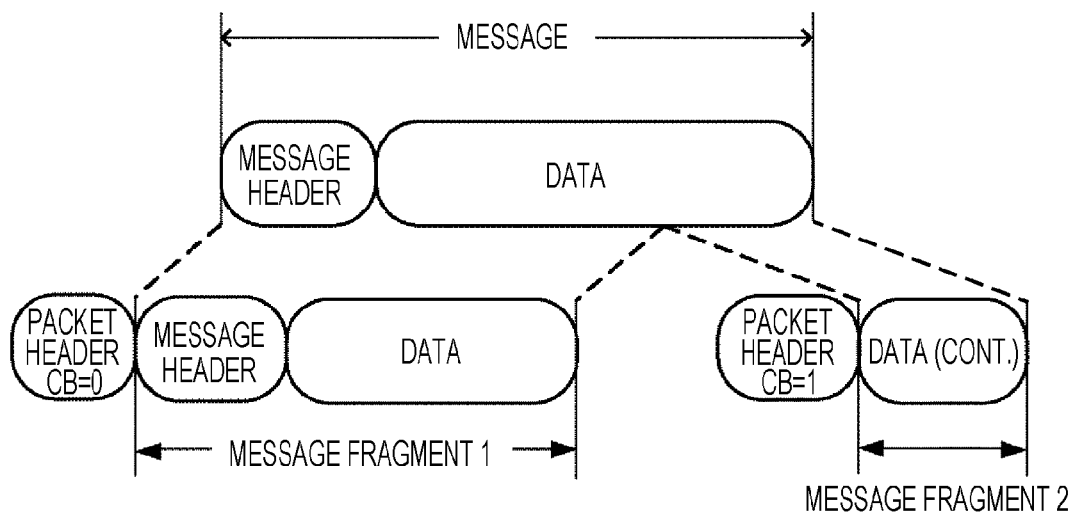
FIG. 4 is an explanatory diagram illustrating an example of the message fragment.

FIG. 4 is an explanatory diagram illustrating an example of the fragmented message. The message is fragmented when the size of the message is larger than the size admitted in the data link layer. Hereinafter, the fragmented message is called a message fragment.

As shown in FIG. 4, the message is fragmented from the head of the message header whenever the size of the message has the maximum value (for example, the maximum value of a predetermined transmissible data size admitted in the data link layer) of the data size determined in a data transmission standard. Accordingly, the message header is added only to the initial message fragment among the message fragments generated by fragmenting the message.

However, a packet header is added to all of the message fragments, as described with reference to FIG. 2.

As described above, the value of the CB is "1" only in the final message fragment among the message fragments generated from one message and the value of the CB is "0" in the remaining message fragments.

Events

Figures 5, 6:
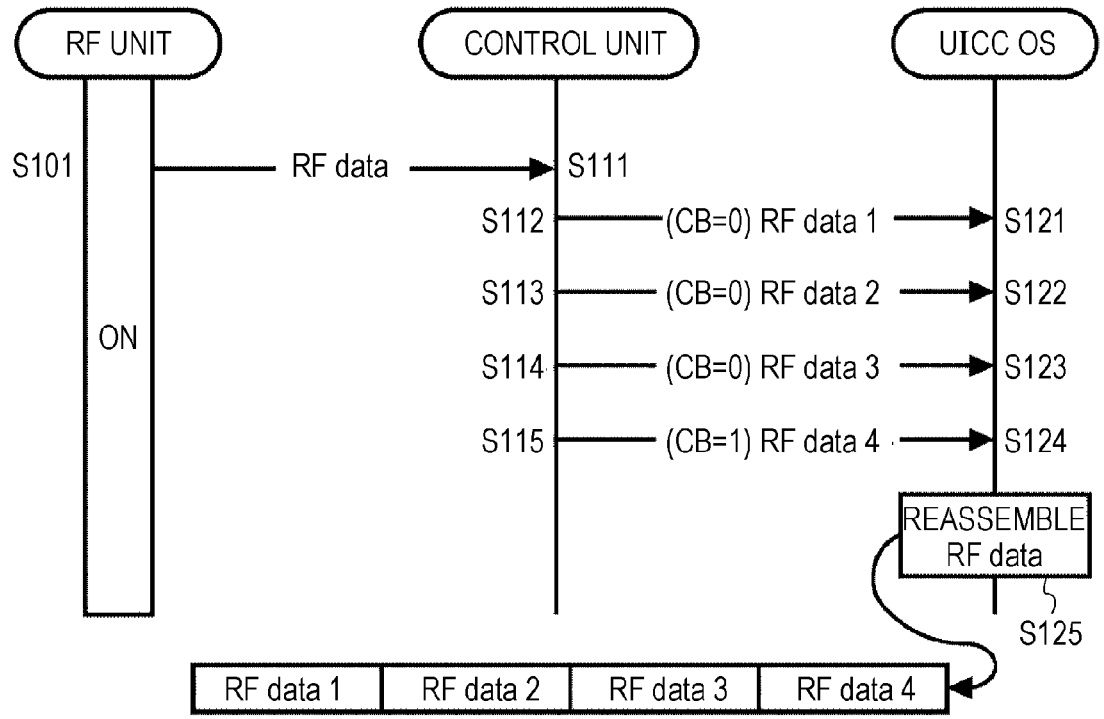
FIG. 5 is an explanatory diagram illustrating an example of events.
FIG. 6 is a flowchart illustrating an example of message transmission and reception when the message transmission and reception end normally.

FIG. 5 is a diagram illustrating the list of events which the card APP gates 121 can support.

The event "EVT_FIELD_ON" is transmitted from the CLF 102 to the UICC 103 when the CLF 102 detects an RF signal supplied from a device such as an external reader of the communication device 100.

The event "EVT_CARD_DEACTIVATED" is transmitted from the CLF 102 to the UICC 103 when the CLF 102 becomes "deactivated" defined by ISO (International Organization for Standardization)/IEC (International Electrotechnical Commission) 14443-3 for Type B or ISO/IEC 14443-4 for Type A.

The event "EVT_CARD_ACTIVATED" is transmitted from the CLF 102 to the UICC 103 when the CLF 102 becomes "activated" defined by ISO/IEC 14443-3 for Type B or ISO/IEC 14443-4 for Type A.

The event "EVT_FIELD_OFF" is transmitted from the CLF 102 to the UICC 103 when the CLF 102 does not detect an RF signal supplied from a device such as an external reader of the communication device 100.

The event "EVT_SEND_DATA" is transmitted from the CLF 102 to the UICC 103 when data are transmitted from the CLF 102 to the UICC 103.

Flow of Process

When the NFC device, such as a mobile phone, using the HCI operates in a card emulation mode in which the NFC device operates as a non-contact IC card, the NFC device obtains power from an external RF field output by the reader/writer, receives and processes a command transmitted through modulation of the RF field from the reader/writer, and returns a response by load modulation.

The command transmitted from the reader/writer is received by the CLF 102 and is transmitted to the UICC 103 via the pipe 131.

In some cases, when the command transmitted from the reader/writer has a length larger than the maximum length of data flowing in the pipe, a plurality of message fragments has to be transmitted, as described above.

An exemplary flow of the process when the transmission of the message fragments ends normally will be described with reference to the flowchart of FIG. 6.

The RF unit 112 receiving RF data from the outside supplies the RF data to the control unit 113 in step S101.

When the control unit 113 receives the RF data in step S111, the control unit 113 fragments the RF data, and then transmits the respective message fragments via the card RF gates 114 in steps S112 to S115.

The CBs of the message fragments (RF data 1, RF data 2, and RF data 3) transmitted in steps S112 to S114 are "0". The CB of the final message fragment (RF data 4) transmitted in step S115 is "1".

The message fragments transmitted from the CLF 102 are supplied to the UICC 103 via the pipes 131.

In steps S121 to S124, the UICC OS 123 receives the message fragments via the card APP gates 121.

When the UICC OS 123 acquires the message fragment in which the value of the CB is 1, the UICC OS 123 recognizes the message fragment as the final message fragment and reassembles the message fragments acquired until the recognition of the final message fragment to restore the message before the fragment in step S125.

In some cases, an event occurs during the transmission of the message fragments. In a method according to the related art, the transmission of the message fragments may end abnormally due to the occurrence of the event such as shown in the flowchart of FIG. 7.

Figure 7:
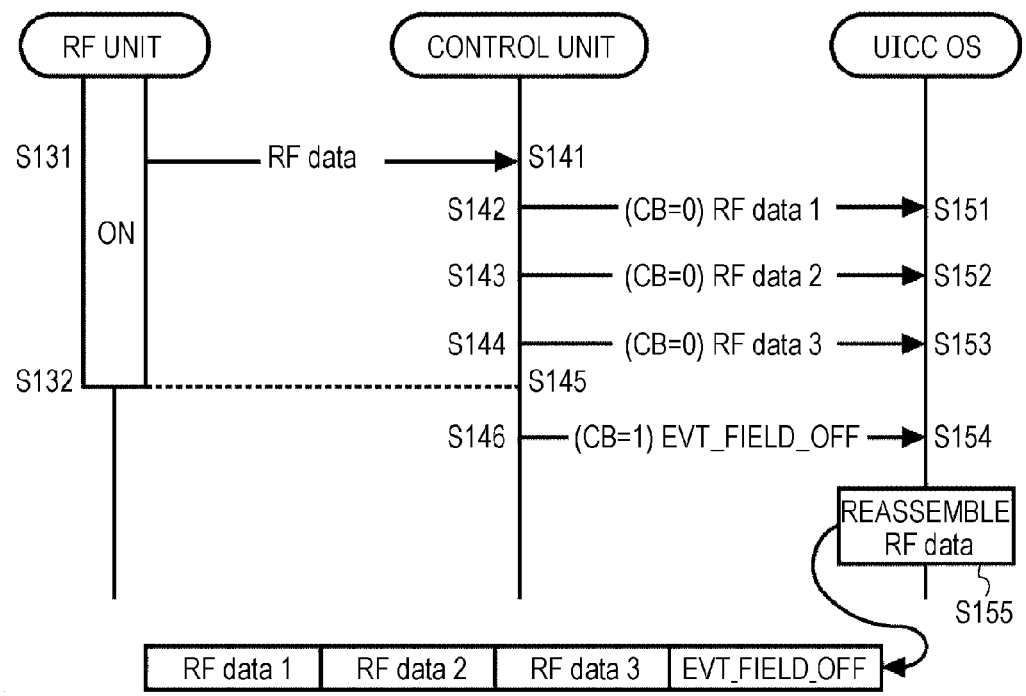
FIG. 7 is a flowchart illustrating an example of message transmission and reception according to the related art when the message transmission and reception end abnormally.

For example, as shown in FIG. 7, the RF unit 112 supplies the RF data received from the outside to the control unit 113 in step S131, as in the example of FIG. 6. The control unit 113 receives the RF data in step S141, as in the example of FIG. 6, fragments the RF data, and sequentially tries to transmit the message fragments (steps S142 to S144).

The message fragments transmitted from the CLF 102 are supplied to the UICC 103 via the pipes 131. In steps S151 to S153, the UICC OS 123 receives the message fragments via the card APP gates 121.

At this time, (before the final message fragment (RF data 4) is transmitted), when the RF unit 112 may not detect a signal from the external reader/writer in step S132, the control unit 113 understands, in step S145, that the signal has not been detected. In step S146, the control unit 113 transmits the event "EVT_FIELD_OFF", which indicates that the signal may not be detected from the reader/writer, to the UICC OS 123, like the message fragment.

Since the event message is not the message fragment, the value of the CB is "1". In step S154, the UICC OS 123 receives the event message. Since the value of the CB is "1", the UICC OS 123 recognizes the event message as the final message fragment. Therefore, in step S155, the UICC OS 123 tries to reassemble the message fragments acquired until the recognition of the final message fragment to restore the message before the fragment.

Therefore, the UICC OS 123 may not recognize the event "EVT_FIELD_OFF". Accordingly, since mismatch between the RF state and the internal state of the NRF device occurs, the processing by the NFC device may not be correctly performed.

The card OS 124 manages the state called a mode and controls the command which can correspond to the state. For example, the card OS 124 controls whether a response to polling is made in accordance with the mode. However, for example, when the event "EVT_FIELD_OFF" is not recognizable, as described above, in a case where the mode of the card OS 124 becomes 2 (state where no response to the polling is made) by the command from the reader/writer, the mode of the card OS 124 is not returned to 0 (state where a response to the polling is made) and the reply to the subsequent polling is not made. Therefore, a problem may arise in that the reader/writer may not detect the NFC device.

The event "EVT_FIELD_OFF" has hitherto been described. However, for example, it can be considered that each of the plurality of applications 125 (card applications) share one card APP gate 121 and one pipe 131 in the UICC 103. Accordingly, when the plurality of card applications is simultaneously activated, the CLF 102 transmits the event "EVT_ACTIVATED" or the event "EVT_DEACTIVATED" as another message in some cases.

In this case, the event message is added next to the message fragment, and thus the reception side (the UICC OS 123) may not correctly recognize the next message of the message fragment.

When the event "EVT_ACTIVATED" is not recognizable, a command for an application is transmitted from the reader/writer although an application is not activated on the UICC 103. Therefore, a problem may arise in that the response to the command is not returned and thus the application is not executable.

When the event "EVT_DEACTIVATED" is not recognizable, a message regarding activation (EVT_ACTIVATED) of the next application is transmitted although the application does not end on the UICC 103. Since there is a possibility that the previously executed application remains to be activated, this state may affect the operation of the application. For example, it is considered that a session key of the next application may be erroneously used when a session key generated in the previously executed application may remain.

Exemplary Configuration of Functional Block

Figure 8A:
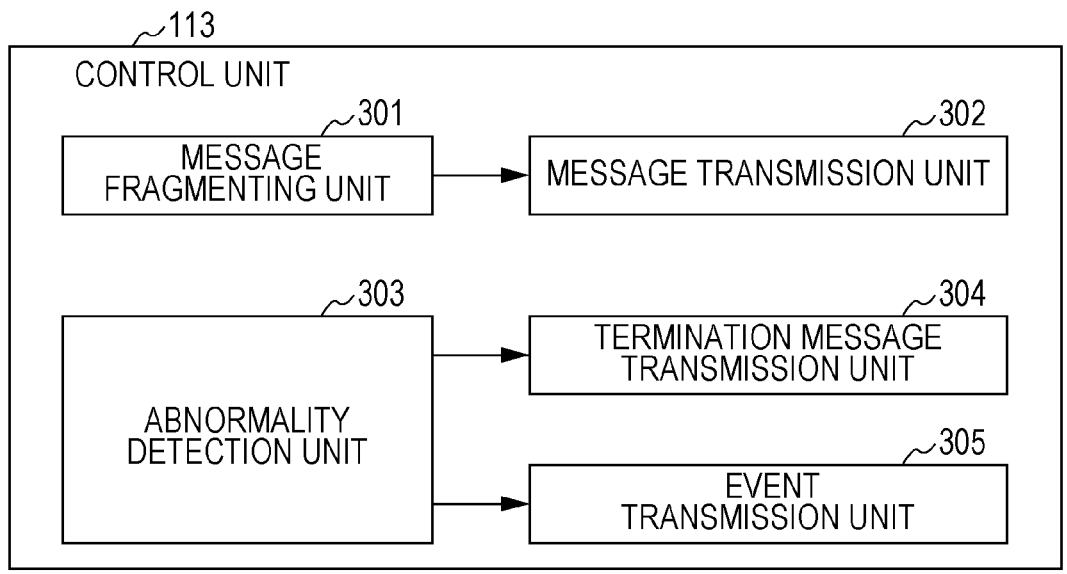
FIGS. 8A and 8B are functional block diagrams illustrating exemplary main configurations of a control unit and a UICC OS.
Figure 8B:
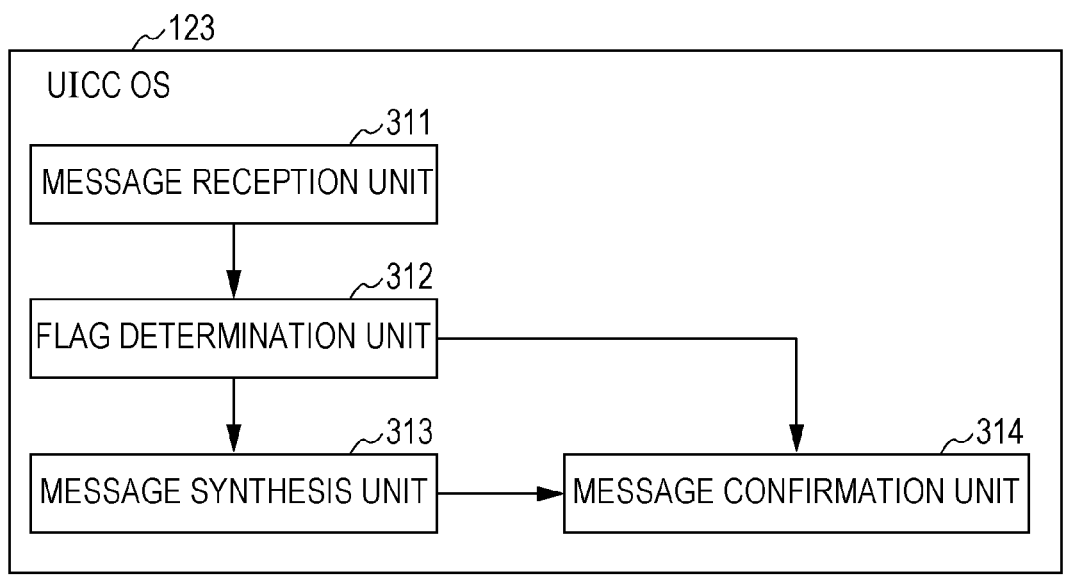

The control unit 113 and the UICC OS 123 have functional blocks shown in FIGS. 8A and 8B.

As shown in FIG. 8A, the control unit 113 includes a message fragmenting unit 301, a message transmission unit 302, an abnormality detection unit 303, a termination message transmission unit 304, and an event transmission unit 305 as the functional block.

As shown in FIG. 8B, the UICC OS 123 includes a message reception unit 311, a flag determination unit 312, a message synthesis unit 313, and a message confirmation unit 314 as the functional block.

Flow of Process

Figure 9:
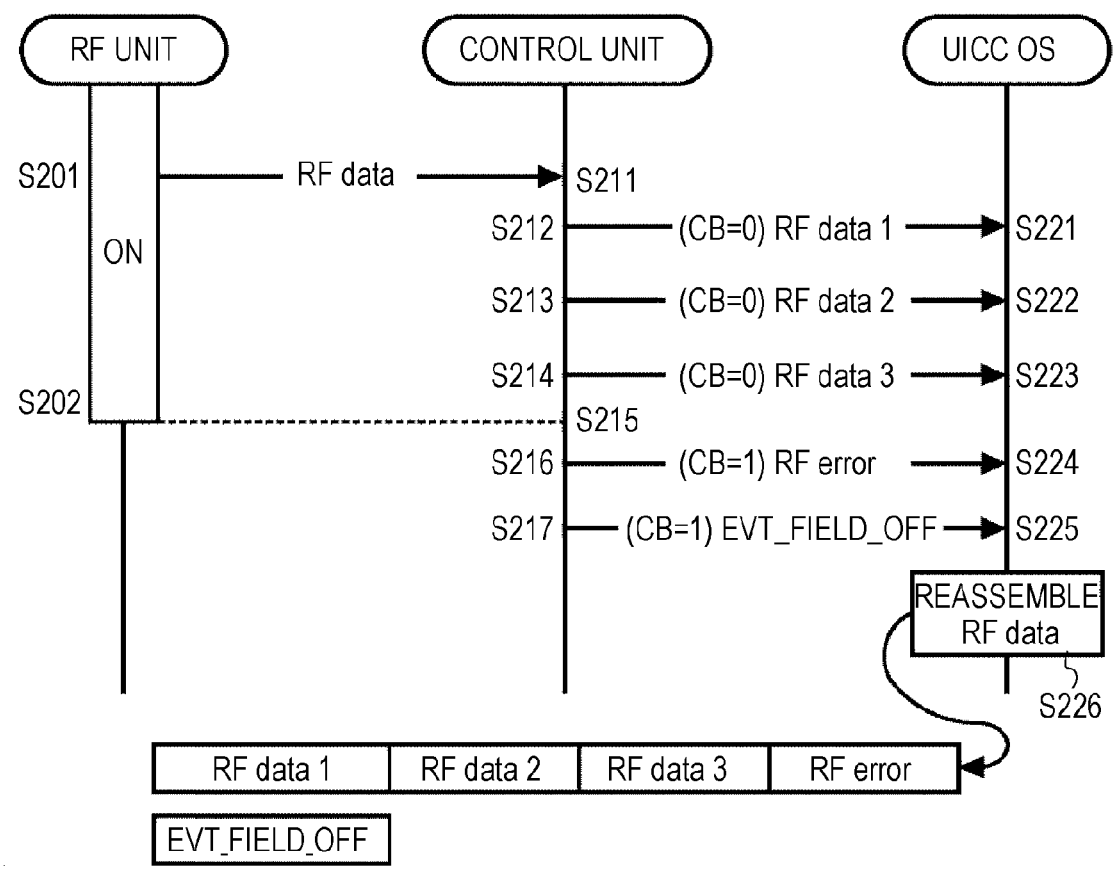
FIG. 9 is a flowchart illustrating an example of message transmission and reception.

Exemplary transmission and reception of the message fragments will be described with reference to the flowchart of FIG. 9.

As in the example of FIG. 6, in step S201, the RF unit 112 supplies the RF data received from the outside to the control unit 113. In step S211, the message division unit 301 of the control unit 113 receives the RF data and fragments the RF data so as to have a predetermined size, as in the example of FIG. 6.

The message transmission unit 302 transmits the obtained message fragments one by one to the UICC 103 via the card RF gates 114. The message fragments transmitted from the CLF 102 are supplied to the UICC 103 via the pipes 131. The UICC OS 123 receives the message fragments via the card APP gates 121.

For example, it is assumed that the message division unit 301 fragments the RF data into four message fragments. In step S212, the message transmission unit 302 transmits the initial message fragment (RF data 1). In step S221, the message reception unit 311 of the UICC OS 123 receives this message fragment (RF data 1). The value of the CB of this packet is "0". When the flag determination unit 312 determines that the value of the CB is "0", the flag determination unit 312 supplies this message fragment (RF data 1) to the message synthesis unit 313.

Subsequently, in step S213, the message transmission unit 302 transmits the second message fragment (RF data 2). In step S222, the message reception unit 311 of the UICC OS 123 receives this message fragment (RF data 2). The value of the CB of this packet is "0". When the flag determination unit 312 determines that the value of the CB is "0", the flag determination unit 312 supplies this message fragment (RF data 2) to the message synthesis unit 313.

Subsequently, in step S214, the message transmission unit 302 transmits the third message fragment (RF data 3). In step S223, the message reception unit 311 of the UICC OS 123 receives this message fragment (RF data 3). The value of the CB of this packet is "0". When the flag determination unit 312 determines that the value of the CB is "0", the flag determination unit 312 supplies this message fragment (RF data 3) to the message synthesis unit 313.

At this time, (before the final message fragment (RF data 4) is transmitted), when the RF unit 112 may not detect a signal from the external reader/writer in step S202 (when the short-range radio communication is disconnected), the abnormality detection unit 303 of the control unit 113 detects, in step S215, that the signal has not been detected.

In step S216, the termination message transmission unit 304 gives notification of an RF error and transmits a termination message indicating the termination of the message fragments before the event message is transmitted. That is, the termination message indicates the termination of the message fragments and indicates that the message fragments are terminated due to the disconnection of the short-range radio communication. The termination message (RF error) is supplied from the card RF gates 114 to the card APP gates 121 via the pipes 131, like the other message fragments.

In step S222, the message reception unit 311 of the UICC OS 123 receives the termination message (RF error). The value of the CB of the packet is "1". When the flag determination unit 312 determines that the value of the CB is "1", the flag determination unit 312 supplies the termination message (RF error) to the message synthesis unit 313.

When the termination message is transmitted, the event transmission unit 305 transmits the event "EVT_FIELD_OFF" to the UICC OS 123 in step S217, like the message fragment.

Since the event message is not the message fragment, the value of the CB is "1". In step S225, the message reception unit 311 of the UICC OS 123 receives the event message. Since the value of the CB is "1", the flag determination unit 312 recognizes that the event message is not the message fragment and supplies the event message to the message confirmation unit 314.

In step S226, the message synthesis unit 313 synthesizes the acquired message fragments (RF data 1 to RF data 3) and the termination message (RF error). The message synthesis unit 313 supplies the synthesis result to the message confirmation unit 314.

The message confirmation unit 314 can understand the synthesis result as one message, and thus can recognize the event message "EVT_FIELD_OFF" supplied apart from the synthesis result.

Accordingly, the card OS 124 can return the operation mode to the mode 0 based on the event message "EVT_FIELD_OFF". That is, the CLF 102 can respond to the subsequent polling.

That is, before the event transmission unit 305 transmits another message, the termination message transmission unit 304 transmits the termination message indicating the termination of the message fragments. Therefore, the UICC OS 123 can correctly receive the message fragments.

Accordingly, the communication device 100 can transmit the message in a device more accurately.

Another message interrupted and transmitted during the transmission of the message fragments is an arbitrary message and may be, of course, a message other than the event message. That is, when another arbitrary message is transmitted during the transmission of the message fragments (without awaiting the transmission termination of the message fragments) in an arbitrary situation, the CLF 102 transmits the termination message indicating the termination of the message fragments. Therefore, the message in a device can be transmitted more accurately.

Another Exemplary Configuration of Functional Block

The case where the control unit 113 fragments and transmits the data received by the RF unit 112 to the UICC 103 has hitherto been described. However, it can also be considered that the UICC 103 transmits the message fragments to the CLF 102.

Even in this case, basically, the message fragments can be terminated by the termination message, as described above.

Figure 10A:
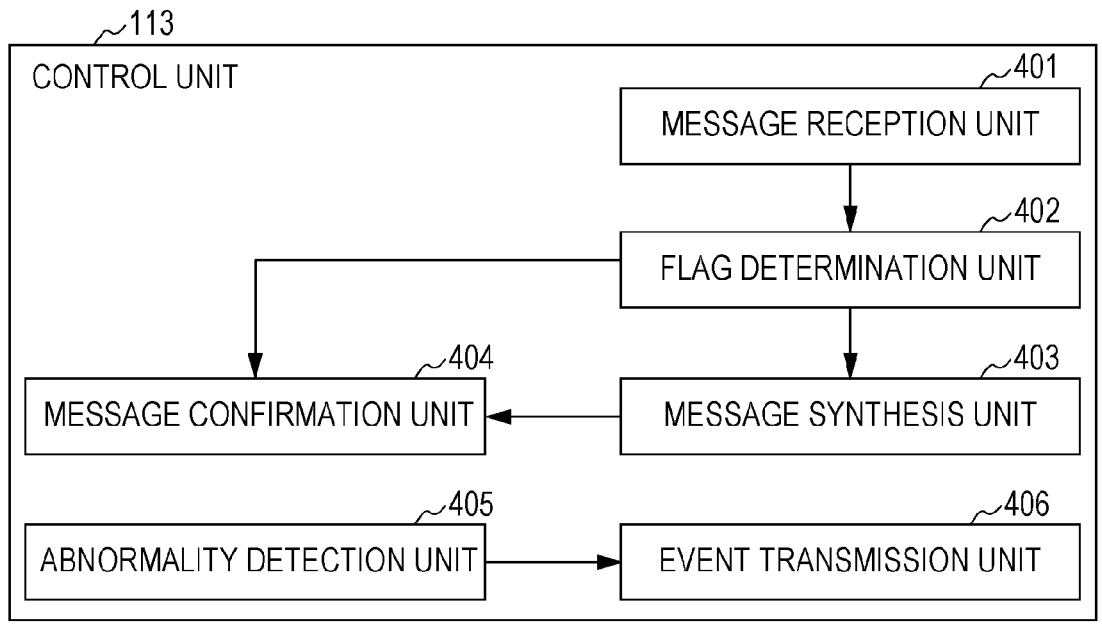
FIGS. 10A and 10B are functional block diagrams illustrating other exemplary configurations of the control unit and the UICC OS.
Figure 10B:
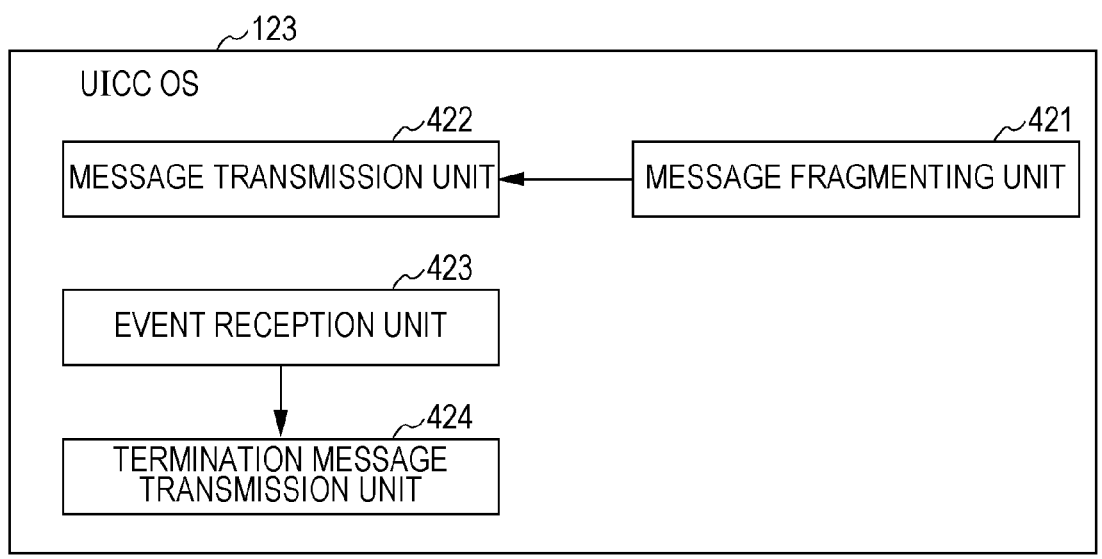

In this case, the control unit 113 and the UICC OS 123 have the functional blocks shown in FIGS. 10A and 10B.

As shown in FIG. 10A, the control unit 113 includes a message reception unit 401, a flag determination unit 402, a message synthesis unit 403, a message confirmation unit 404, an abnormality detection unit 405, and an event transmission unit 406 as the functional block.

As shown in FIG. 10B, the UICC OS 123 includes a message fragmenting unit 421, a message transmission unit 422, an event reception unit 423, and a termination message transmission 424 as the functional block.

Flow of Process

Figure 11:
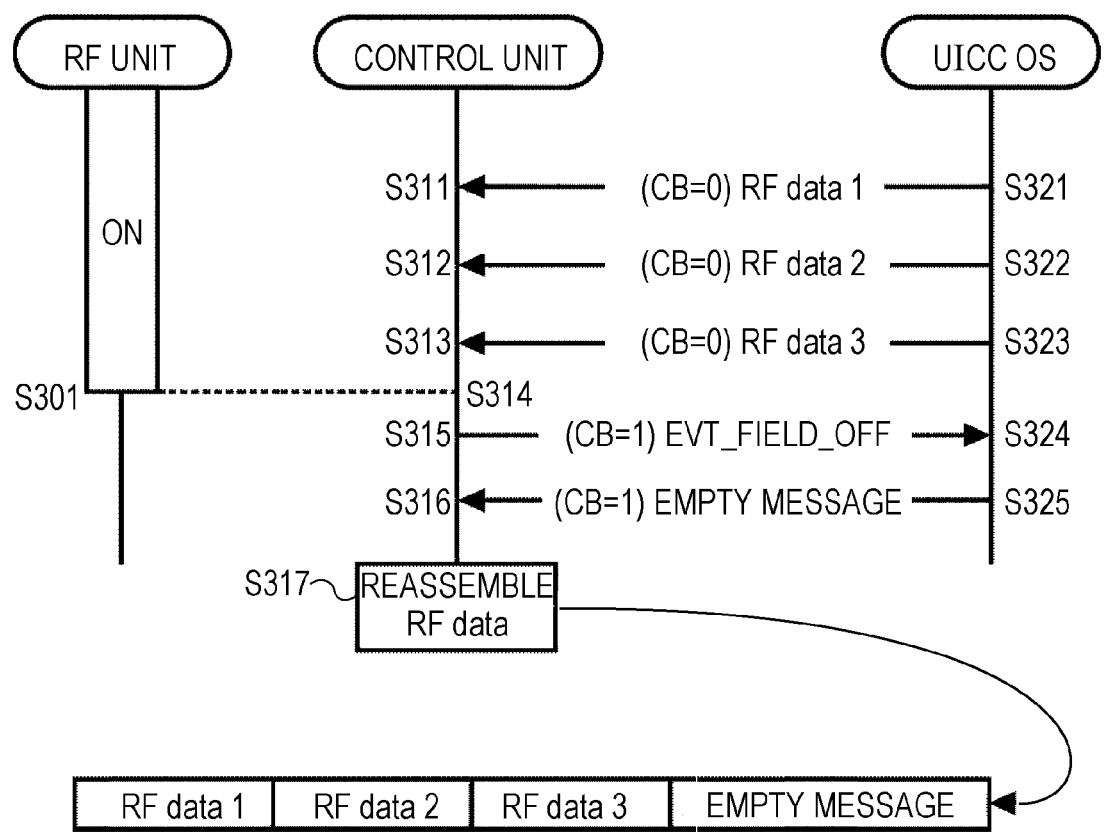
FIG. 11 is a flowchart illustrating another example of message transmission and reception.

Exemplary transmission and reception of the message fragments will be described with reference to a flowchart of FIG. 11.

The message fragmenting unit 421 of the UICC OS 123 fragments a message to be transmitted to the CLF 102 so as to have a predetermined size. The message transmission unit 422 transmits the obtained message fragments one by one to the CLF 102 via the card APP gates 121. The message fragments transmitted from the UICC 103 are supplied to the CLF 102 via the pipes 131. The control unit 113 receives the message fragments via the card RF gates 114.

For example, it is assumed that the message fragmenting unit 421 fragments the message into four message fragments. In step S321, the message transmission unit 422 transmits the initial message fragment (RF data 1). In step S311, the message reception unit 401 of the control unit 113 receives this message fragment (RF data 1). The value of the CB of this packet is "0". When the flag determination unit 402 determines that the value of the CB is "0", the flag determination unit 402 supplies this message fragment (RF data 1) to the message synthesis unit 403.

Subsequently, in step S322, the message transmission unit 422 transmits the second message fragment (RF data 2). In step S312, the message reception unit 401 of the control unit receives this message fragment (RF data 2). The value of the CB of this packet is "0". When the flag determination unit 402 determines that the value of the CB is "0", the flag determination unit 402 supplies this message fragment (RF data 2) to the message synthesis unit 403.

Subsequently, in step S323, the message transmission unit 422 transmits the third message fragment (RF data 3). In step S313, the message reception unit 401 of the control unit 113 receives this message fragment (RF data 3). The value of the CB of this packet is "0". When the flag determination unit 402 determines that the value of the CB is "0", the flag determination unit 402 supplies this message fragment (RF data 3) to the message synthesis unit 403.

At this time, (before the final message fragment (RF data 4) is transmitted), when the RF unit 112 may not detect a signal from the external reader/writer in step S301, the abnormality detection unit 405 of the control unit 113 understands, in step S314, that the signal has not been detected.

The event transmission unit 406 transmits the event "EVT_FIELD_OFF" to the UICC OS 123 in step S315, like the message fragment. In step S324, the event reception unit 423 of the UICC OS 123 receives the event message.

Since it is determined that the communication with the reader/writer is not possible by the event "EVT_FIELD_OFF", the termination message transmission unit 424 transmits a message indicating that the value of the CB is "1" to the control unit 113 in step S325.

In a case of a message transmitted from the UICC OS 123 to the control unit 113, an error may not be expressed since a field indicating the RF error is not defined. As described above, however, the termination message transmission unit 424 can give an instruction to terminate the message fragments by transmitting an empty message indicting the value of the CB is "1".

In step S316, the message reception unit 401 of the control unit 113 receives the empty message.

In step S317, the message synthesis unit 403 synthesizes the acquired message fragments (RF data 1 to RF data 3) and the empty message. The message synthesis unit 403 supplies the synthesis result to the message confirmation unit 404.

The message confirmation unit 404 can interpret the synthesis result as one message. That is, even when a new message (or the message fragment) is transmitted subsequently, the message confirmation unit 404 can interpret the synthesis result as a new message different from the above-described synthesis result.

That is, the CLF 102 can correctly receive the newly supplied message.

Accordingly, the communication device 100 can transmit the message in a device more accurately.

Still Another Exemplary Configuration of Functional Block

For example, when short-range radio communication with the reader/writer is disconnected, the CLF 102 continues not to receive a command or the like from the reader/writer although the UICC OS 123 does not receive the event "EVT_FIELD_OFF". That is, the UICC OS 123 continues not to receive a message from the CLF 102 either.

Accordingly, the UICC OS 123 sets a predetermined period as a timeout period. When a period in which no message is received from the CLF 102 is equal to or longer than the timeout period, the UICC OS 123 determines that the short-range radio communication with the reader/writer is disconnected. Then, the operation mode of the card OS 124 may be returned to 0 to respond to the polling subsequently.

An interval between the commands transmitted from the reader/writer is determined depending on the application. Accordingly, it is desirable to freely set the timeout period in the NFC device.

Figure 12A:
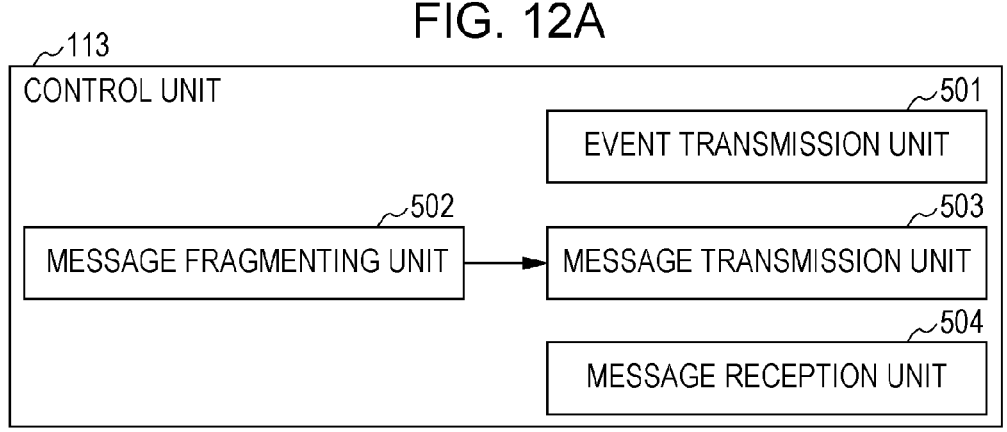
FIGS. 12A to 12C are functional block diagrams illustrating examples of the control unit, the UICC OS, and the card OS.
Figure 12B:
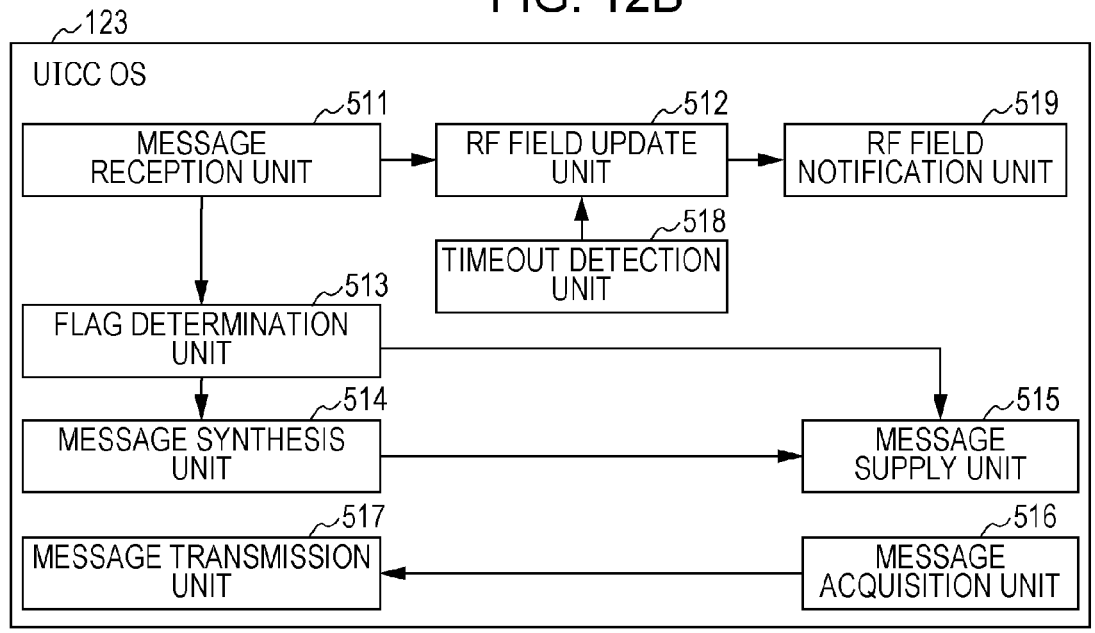
Figure 12C:
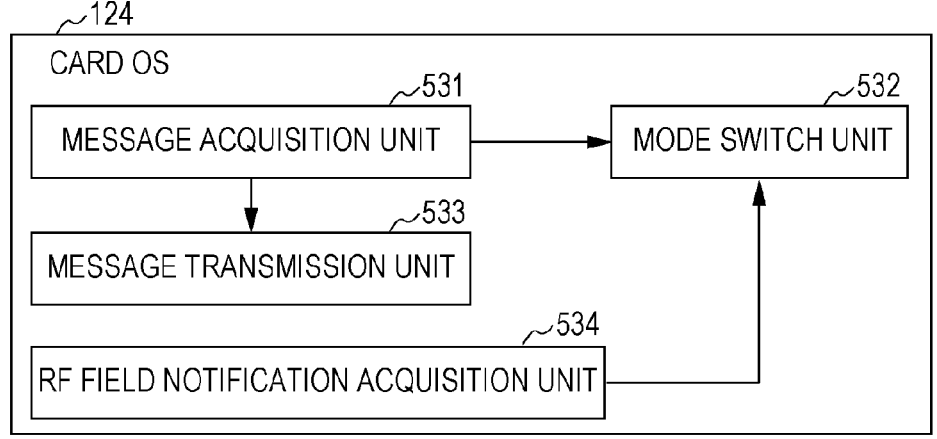

FIGS. 12A to 12C are functional block diagrams illustrating exemplary configurations of the control unit, the UICC OS, and the card OS.

As shown in FIG. 12A, the control unit 113 includes an event transmission unit 501, a message fragmenting unit 502, a message transmission unit 503, and a message reception unit 504 as the functional block.

As shown in FIG. 12B, the UICC OS 123 includes a message reception unit 511, an RF field update unit 512, a flag determination unit 513, a message synthesis unit 514, a message supply unit 515, a message acquisition unit 516, a message transmission unit 517, a timeout determination unit 518, and an RF field notification unit 519.

As shown in FIG. 12C, the card OS 124 includes a message acquisition unit 531, a mode switch unit 532, a message transmission unit 533, and an RF field notification acquisition unit 534.

Flow of Process

Exemplary transmission and reception of the message fragments will be described with reference to the flowchart of FIG. 13.

The UICC OS 123 stores the present state of the timeout period and the RF field. The initial value of the state of the RF field is OFF.

The card OS 124 stores the set value of the operation mode. The initial value of the mode of the card OS 124 is 0.

Figure 13:
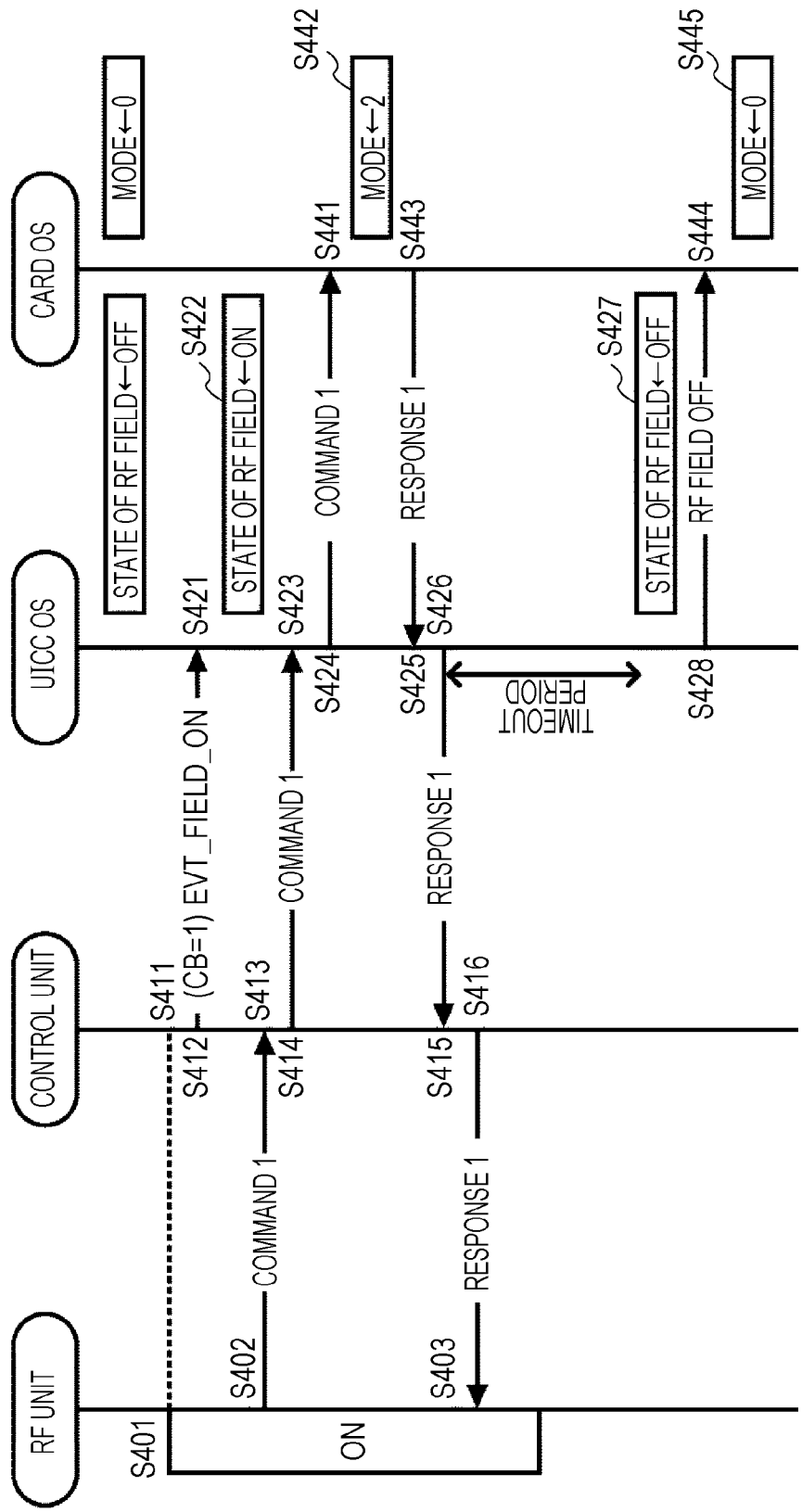
FIG. 13 is a flowchart illustrating still another example of message transmission and reception.

When the reader/writer generates the RF field, as shown in FIG. 13, the RF unit 112 notifies the control unit 113 of the fact that the RF field is generated in step S401. When the control unit 13 acquires the notification in step S411, the event transmission unit 501 of the control unit 113 transmits the event "EVT_FIELD_ON" to the UICC OS 123 in step S412.

Since the event message is not the message fragment, the value of the CB is "1". In step S421, the message reception unit 511 of the UICC OS 123 receives the event message. In step S422, the RF field update unit 512 updates the state of the RF field from OFF to ON.

When the RF unit 112 receives Command 1 from the reader/writer, the RF unit 112 supplies Command 1 to the control unit 113 in step S402. When the control unit 113 acquires Command 1 in step S413, the control unit 113 transmits Command 1 to the UICC OS 123 in step S414. In step S423, the message reception unit 511 of the UICC OS 123 receives Command 1. Command 1 may be transmitted as the message fragments, as described above.

When the flag determination unit 513 determines that the message of Command 1 is not the message fragments, the message supply unit 515 supplies Command 1 to the card OS 124 in step S424.

In step S441, the message acquisition unit 531 of the card OS 124 acquires Command 1. In step S442, the mode switch unit 532 switches the mode from 0 to 2. In step S443, the message transmission unit 533 supplies Response 1, which is a response to Command 1, to the UICC OS 123.

In step S425, the message acquisition unit 516 acquires Response 1. In step S426, the message transmission unit 517 transmits Response 1 to the control unit 113. In step S415, the message reception unit 504 of the control unit 113 receives Response 1. Response 1 may be transmitted as the message fragments, as described above.

In step S416, the control unit 113 supplies Response 1 to the RF unit 112. When the RF unit 112 acquires Response 1 in step S403, the RF unit 112 transmits Response 1 to the reader/writer.

Thereafter, when the command is not supplied from the control unit 113 to the UICC OS 123 for a period equal to or longer than the timeout period due to the disconnection of the reader/writer and deactivation of the RF field, the timeout determination unit 518 determines that the timeout occurs.

When the timeout occurs, the RF field update unit 512 updates the state of the RF field from ON to OFF in step S427. In step S428, the RF field notification unit 519 notifies the card OS 124 of the fact that the state of the RF field is updated.

In step S444, the message acquisition unit 531 of the card OS 124 acquires the notification. In step S444, the mode switch unit 532 switches the mode from 2 to 0.

By setting the timeout period and performing the controlling based on the timeout period, the operation of the card OS 124 can be switched without transmitting and receiving the event "EVT_FIELD_OFF", and thus the next message can be prepared.

Accordingly, the communication device 100 can transmit the message in a device more accurately.

The timeout may be controlled by combination with the method of using the above-described termination message. In this case, the interruption of the transmission of the message fragments can be processed appropriately using the termination message. Moreover, even when the termination message may not be transmitted, the next message can be correctly received earlier by the control of the timeout period.

That is, the communication device 100 can transmit the message in a device more accurately.

2. Second Embodiment

Overview

When another hardware line is connected between the CLF and the UICC and the event EVT_FIELD_OFF may not be received, the event message EVT_FIELD_OFF is transmitted and the signal may be transmitted via this line when the CLF detects the loss of the RF field.

The events EVT_ACTIVATED and EVT_DEACTIVATED are transmitted via the same line. It is necessary to define the signals to be transmitted for each message.

Hereinafter, the details will be described.

Configuration of Communication Device

Figure 14:
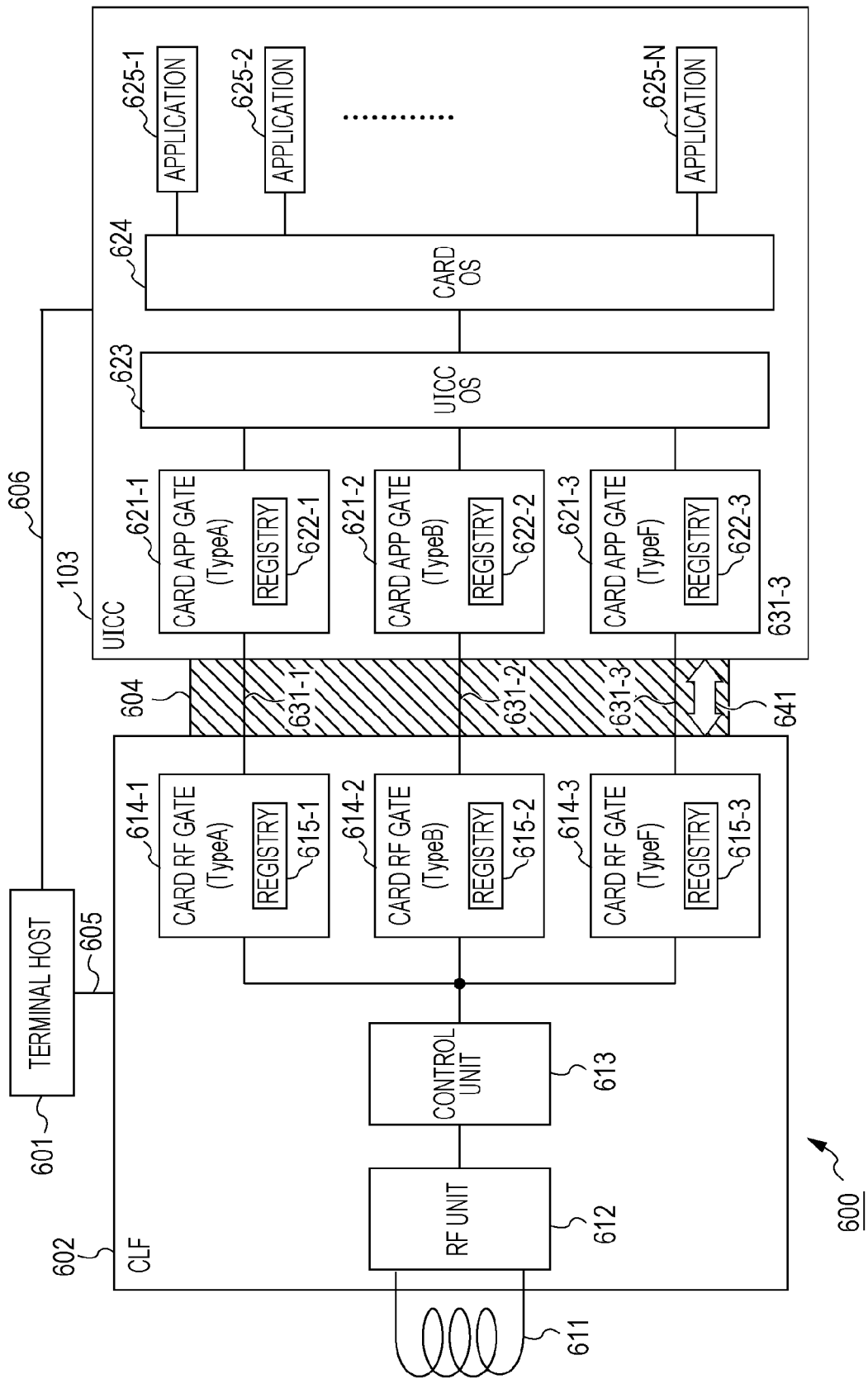
FIG. 14 is a block diagram illustrating another exemplary configuration of the communication device according to an embodiment.

FIG. 14 is a block diagram illustrating another exemplary configuration of a communication device according to the embodiment.

As shown in FIG. 14, a communication device 600 basically has the same configuration as that of the communication device 100 and performs the same process. That is, the communication device 600 includes a terminal host 601 corresponding to the terminal host 101, a CLF 602 corresponding to the CLF 102, a UICC 603 corresponding to the UICC 103, a bus 604 corresponding to the bus 104, and a bus 605 corresponding to the bus 105. For example, the bus 604 is formed by a single physical line. For example, the bus 605 is formed by two physical lines. The terminal host 601 and the UICC 603 are also connected to each other through, for example, a bus 606 corresponding to the bus 106.

The CLF 602 includes an antenna 611 corresponding to the antenna 111, an RF unit 612 corresponding to the RF unit 112, a control unit 613 corresponding to the control unit 113, and card RF gates 614-1 to 614-3 respectively corresponding to the card RF gates 114-1 to 114-3.

The card RF gates 614-1 to 614-3 have registries 615-1 to 615-3 corresponding to the registries 115-1 to 115-3, respectively.

The card RF gates 614-1 to 614-3 are connected to pipes 631-1 to 631-3 corresponding to the pipes 131-1 to 131-3, respectively.

The UICC 603 includes card APP gates 621-1 to 621-3 respectively corresponding to the card APP gates 121-1 to 121-3, a UICC OS 623 corresponding to the UICC OS 123, a card OS 624 corresponding to the card OS 124, and applications 625-1 to 625-N respectively corresponding to the applications 125-1 to 125-N.

The card APP gates 621-1 to 621-3 have registries 622-1 to 622-3 corresponding to the registries 122-1 to 122-3, respectively.

The card APP gates 621-1 to 621-3 are connected to the pipes 631-1 to 631-3, respectively.

That is, the card RF gates 614-1 to 614-3 and the card APP gates 621-1 to 621-3 are connected to each other through the pipes 631-1 to 631-3, respectively.

Hereinafter, when it is not necessary to distinguish the card RF gates 614-1 to 614-3 from each other in the following description, the card RF gates 614-1 to 614-3 are simply called the card RF gates 614. In addition, when it is not necessary to distinguish the registries 615-1 to 615-3 from each other in the following description, the registries 615-1 to 615-3 are simply called the registries 615.

When it is not necessary to distinguish the pipes 631-1 to 631-3 from each other in the following description, the pipes 631-1 to 631-3 are simply called the pipes 631.

Likewise, when it is not necessary to distinguish the card APP gates 621-1 to 621-3 from each other in the following description, the card APP gates 621-1 to 621-3 are simply called the card APP gates 621. In addition, when it is not necessary to distinguish the registries 622-1 to 622-3 from each other in the following description, the registries 622-1 to 622-3 are simply called the registries 622.

The CLF 602 and the UICC 603 are connected to each other not only by the above-described pipes 631 but also a line 641. A control signal indicating the transmission of the event message via the pipes 631 is transmitted and received through the line 641. The control signal may be a signal defined in each event message. In this case, by interpreting the control signal, the types of event message can be identified.

Exemplary Configuration of Functional Block

Figure 15A:
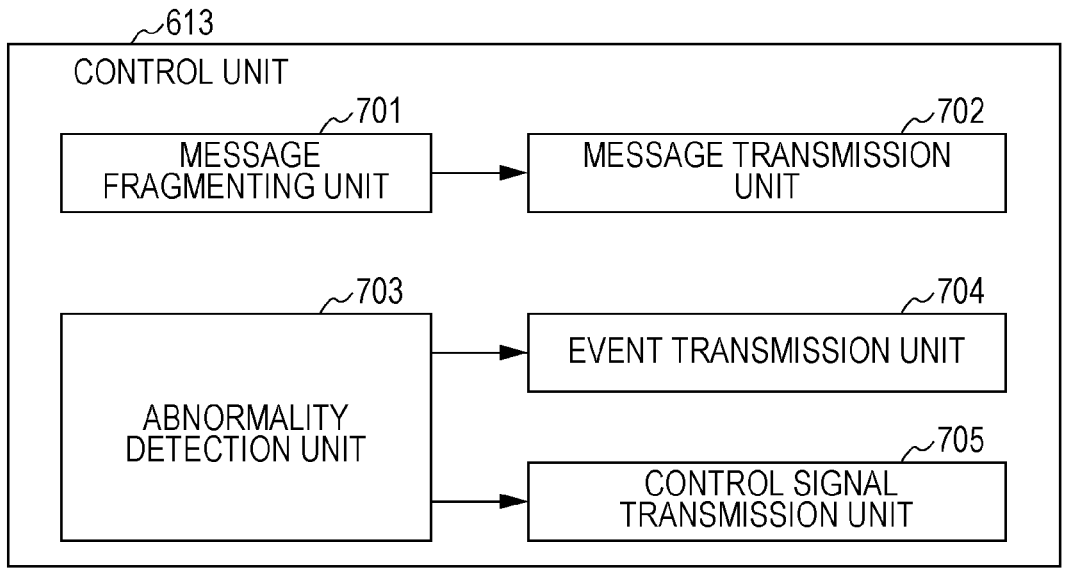
FIGS. 15A and 15B are functional block diagrams illustrating other exemplary configurations of the control unit and the UICC OS.
Figure 15B:
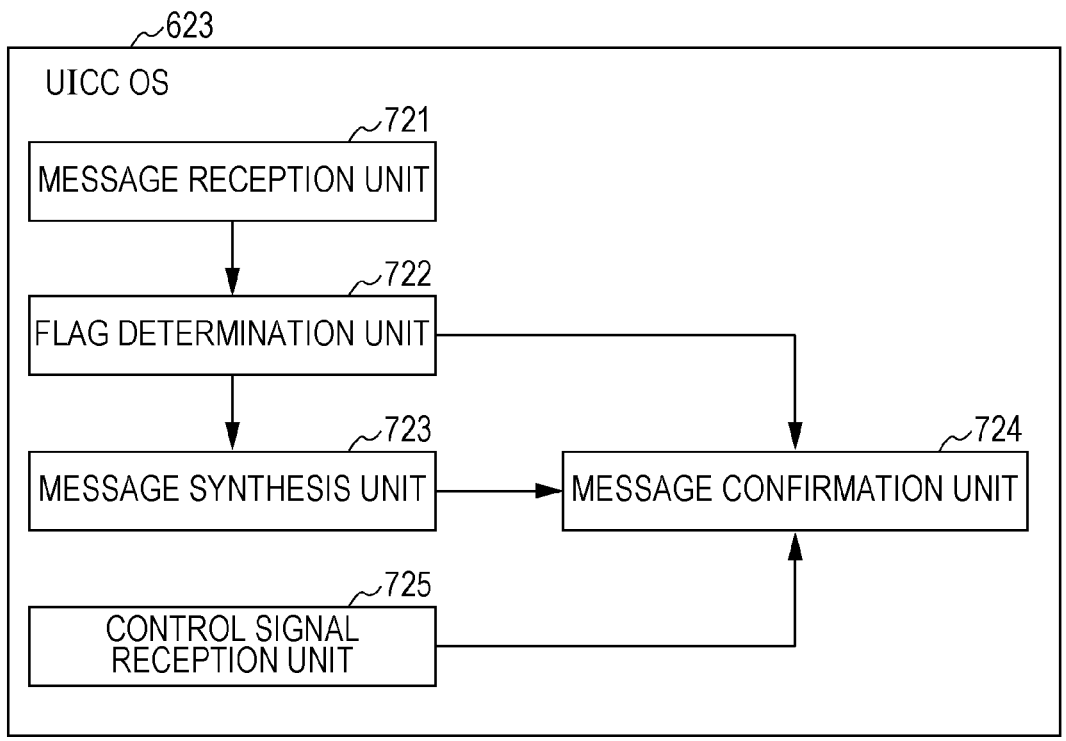

The control unit 613 and the UICC OS 623 have functional blocks as those shown in FIGS. 15A and 15B.

As shown in FIG. 15A, the control unit 613 includes a message fragmenting unit 701, a message transmission unit 702, an abnormality detection unit 703, an event transmission unit 704, and a control signal transmission 705 as the functional block.

As shown in FIG. 15B, the UICC OS 623 includes a message reception unit 721, a flag determination unit 722, a message synthesis unit 723, a message confirmation unit 724, and a control signal reception unit 725 as the functional block.

Flow of Process

Figure 16:
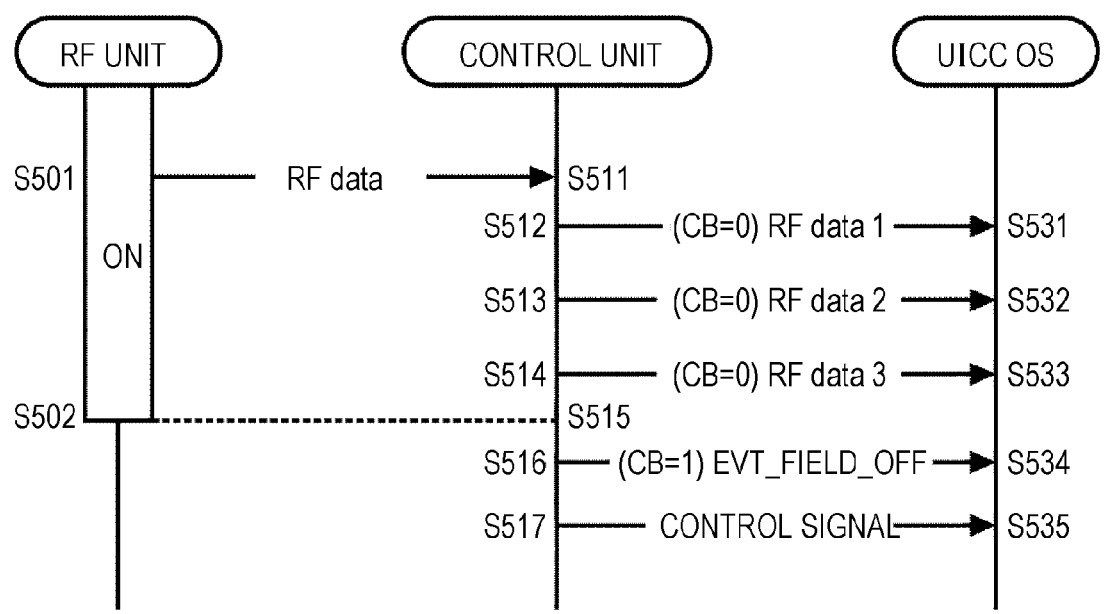
FIG. 16 is a flowchart illustrating still another example of message transmission and reception.

Exemplary transmission and reception of the message fragments will be described with reference to a flowchart of FIG. 16.

In step S501, the RF unit 612 supplies RF data received from the outside to the control unit 613. In step S511, the message fragmenting unit 701 of the control unit 613 receives the RF data and fragments the RF data so as to have a predetermined size.

The message transmission unit 702 transmits the obtained message fragments one by one to the UICC 603 via the card RF gates 614. The message fragments transmitted from the CLF 602 are supplied to the UICC 603 via the pipes 631. The UICC OS 623 receives the message fragments via the card APP gates 621.

For example, it is assumed that the message fragmenting unit 701 fragments the RF data into four message fragments. In step S512, the message transmission unit 702 transmits the initial message fragment (RF data 1). In step S531, the message reception unit 721 of the UICC OS 623 receives this message fragment (RF data 1). The value of the CB of this packet is "0". When the flag determination unit 722 determines that the value of the CB is "0", the flag determination unit 722 supplies this message fragment (RF data 1) to the message synthesis unit 723.

Subsequently, in step S513, the message transmission unit 702 transmits the second message fragment (RF data 2). In step S532, the message reception unit 721 of the UICC OS 623 receives this message fragment (RF data 2). The value of the CB of this packet is "0". When the flag determination unit 722 determines that the value of the CB is "0", the flag determination unit 722 supplies this message fragment (RF data 2) to the message synthesis unit 723.

Subsequently, in step S514, the message transmission unit 702 transmits the third message fragment (RF data 3). In step S533, the message reception unit 721 of the UICC OS 623 receives this message fragment (RF data 3). The value of the CB of this packet is "0". When the flag determination unit 722 determines that the value of the CB is "0", the flag determination unit 722 supplies this message fragment (RF data 3) to the message synthesis unit 723.

At this time, (before the final message fragment (RF data 4) is transmitted), when the RF unit 612 may not detect a signal from an external reader/writer in step S502, the abnormality detection unit 703 of the control unit 613 detects the abnormality in step S515.

In step S516, the event transmission unit 704 transmits an event message to the UICC 603 via the card RF gates 614 and the pipes 631. At this time, in step S517, the control signal transmission unit 705 transmits the event message and also transmits a control signal corresponding to this event message to the UICC 603 via the line 641.

In step S535, the UICC OS 623 receives the control signal. The UICC OS 623 understands that the message transmitted via the pipes 631 is the event message by interpreting the control signal.

That is, even when the transmission of the message fragments is interrupted and thus the event message is transmitted, as described above, the UICC OS 623 can understand the details by using the control signal and correctly detecting the event message.

Accordingly, the communication device 600 can transmit the message in a device more accurately.

3. Third Embodiment

Overview

The HCI communication between the CLF and the UICC when the non-contact short-range radio communication is carried out between the communication device and an external device has hitherto been described.

However, when the CLF (NFCC) is connected to a DH (Device Host) controlling the entirety of the UICC and the NFC, data are exchanged in an interface between the CLF (NFCC) and the UICC in conformity with the ETSI SCP HCI standard and data are exchanged in an interface between the CLF (NFCC) and the DH in conformity with the NFC FORUM NCI (NFC Controller Interface) standard.

In this case, the CLF (NFCC) has to have a conversion function between two standards to allow the DH and the UICC to communicate with each other. However, there is no standard defining the conversion process and a vendor own interface is installed in effect.

In this embodiment, therefore, a conversion process between the two standards of the HCI and the NCI is defined so that the UICC and the DH easily exchange data via the two interfaces.

Communication Device

Figure 17:
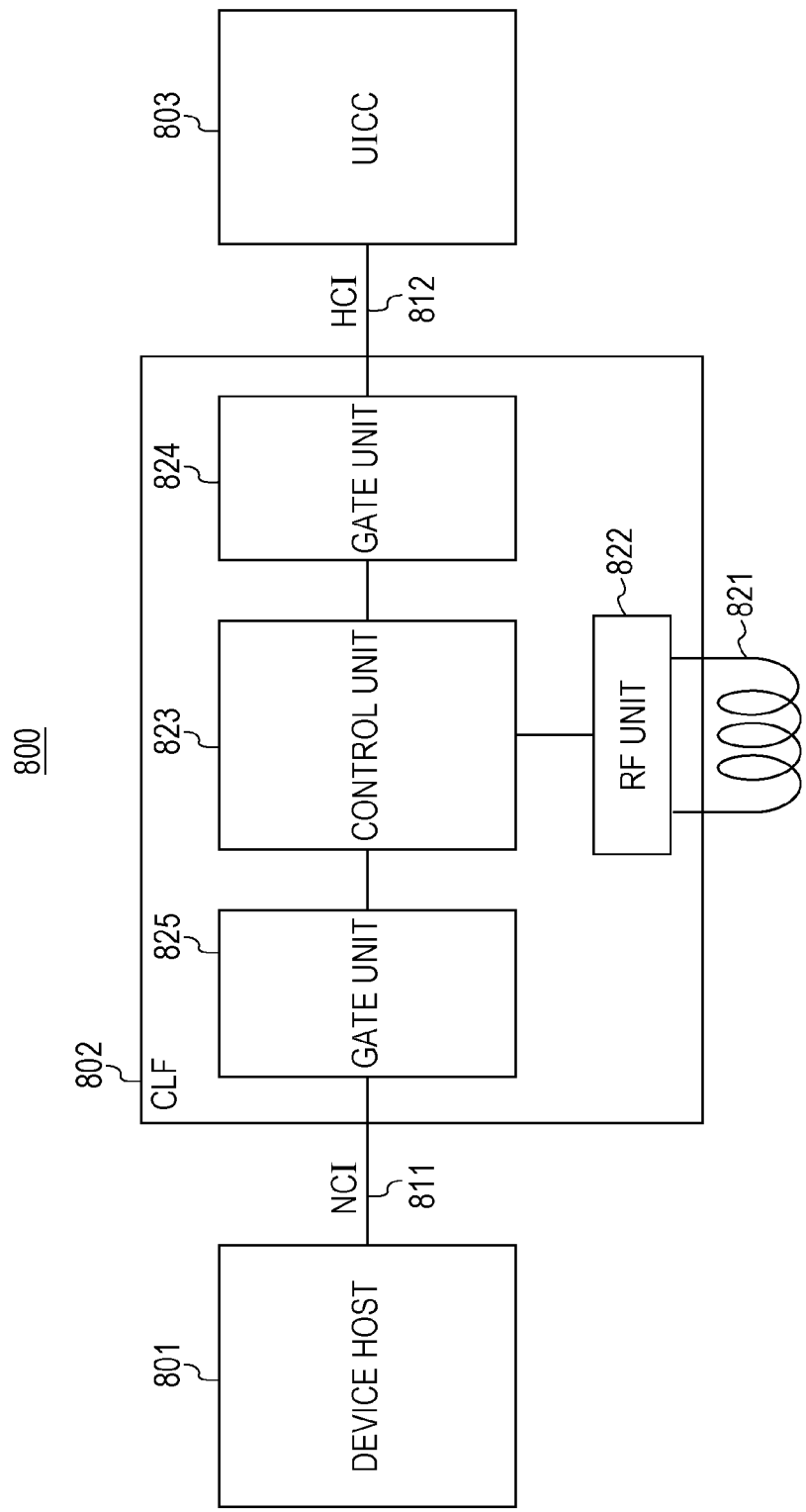
FIG. 17 is a block diagram illustrating another exemplary configuration of a communication device according to an embodiment.

FIG. 17 is a block diagram illustrating an exemplary main configuration of a communication device according to an embodiment. A communication device 800 is an NFC device which has the same non-contact short-range radio communication function as that of the communication device 100 in FIG. 1.

As shown in FIG. 17, the communication device 800 basically the same configuration as that of the communication device 100 in FIG. 1 and performs the same process as that of the communication device 100. That is, the communication device 800 includes a CLF 802 which is the same as the CLF 102 and a UICC 803 which is the same as the UICC 103. However, the communication device 800 has a device host 801 communicating with the CLF 802 via an NCI standard interface, instead of the terminal host 101 communicating with the CLF 102 or the UICC 103 via a vender own interface.

The device host (DH) 801 controls the entire communication device 800. Since the device host 801 is connected to the CLF 802 via a bus 811, the device host 801 communicates with the CLF 802 via the bus 811. The device host 801 communicates with the CLF 802 in conformity with the NCI standard.

Figure 18:
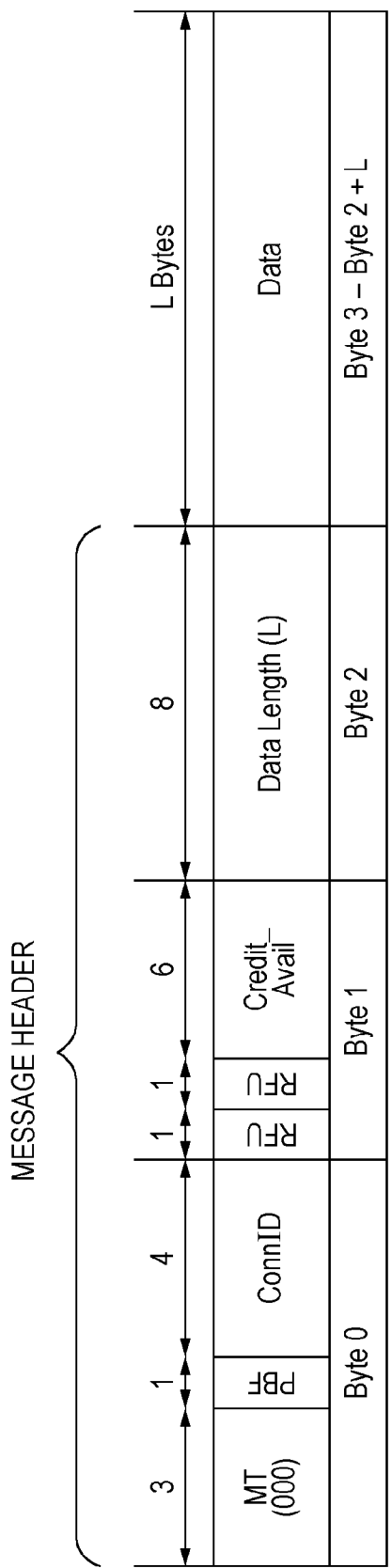
FIG. 18 is a diagram illustrating an exemplary structure of an NCI message format.

FIG. 18 is a diagram illustrating an exemplary structure of an NCI message format in conformity with the NCI standard. As shown in FIG. 18, an NCI message includes 24-byte header information (NCI message header) and L-byte NCI message data.

The NCI message header includes PBF, ConnID, Credit_Avail, and Data Length (L). The PBF is a message fragment obtained by fragmenting the NCI message data by an NCI buffer size (which is the maximum length of data transmittable once) and is flag information indicating whether there is data subsequent to the present data. In a case of PBF=1, there is subsequent data. In addition, the NCI buffer size is designated when the connection is established.

The ConnID is identification information identifying the connection. The ConnID can be assigned by the CLF 802 when the connection is established. The Credit_Avail is used for NCI flow control performed by the CLF 802. The Data Length (L) indicates the data length of the NCI message data.

The device host 801 transmits and receives a message to and from the UICC 803 via the CLF 802. For example, the device host 801 executes an application to implement a function of a non-contact IC card on the communication device 800. For example, the device host 801 executes an application to implement deposit/payment, management, or the like of electronic money. Then, the data (the balance of the deposited (paid) of the electronic money, deposit/payment data, or the like) of the electron money is assumed to be stored in, for example, the UICC 803. For example, when the application of the device host 801 demands the confirmation of the balance of the electronic money being charged, the demand is supplied to the UICC 803 via the CLF 802. The UICC 803 supplies information regarding the balance to the device host 801 via the CLF 802 in response to the demand.

Of course, the contents of the transmitted and received data (message) are arbitrary. The device host 801 and the UICC 803 can transmit and receive, for example, the data (message) via the CLF 802.

The CLF 802 includes an antenna 821, an RF unit 822, a control unit 823, a gate unit 824, and a gate unit 825.

The antenna 821, which is the same as the antenna 111, is an antenna that transmits and receives a non-contact short-range radio communication signal to and from an external device such as a reader/writer (R/W). For example, a loop antenna is used as the antenna 821.

The RF unit 822, which is the same processing unit as the RF unit 112, transmits and receives the non-contact short-range radio communication signal. For example, the RF unit 822 transmits a message supplied from the control unit 823 as the non-contact short-range communication signal via the antenna 821 or receives the non-contact short-range radio communication signal transmitted from an external device via the antenna 821 to supply a message included in the received non-contact short-range radio communication signal to the control unit 823.

The control unit 823, which is basically the same processing unit as the control unit 113, controls the RF unit 822 to control the transmission and reception of the non-contact short-range radio communication signal. The control unit 823 controls the gate 824, which is the same as the card RF gates 114, to control transmission and reception of the message to and from the UICC 803. Here, the CLF 802 and the UICC 803 are physically connected to the bus 812, but are logically connected to each other according to a logical interface defined in the ETSI SCP HCI standard. In the interface of the HCI standard, end points called gates are connected to each other through a communication channel called a pipe. The gate unit 824 is a gate of the CLF 802 in the interface of the HCI standard. The gate unit 824 transmits and receives a message or the like to and from the UICC 803 via a pipe. That is, the control unit 823 communicates with the UICC 803 via the gate unit 824.

The control unit 823 controls the gate unit 825 to control the transmission and reception of a message to and from the device host 801. Here, the CLF 802 and the device host 801 are physically connected to the bus 811, but are logically connected to each other according to a logical interface defined in the NFC FORUM NCI standard. In the interface of the NCI standard, end points called gates are connected to each other through a communication channel called a pipe. The gate unit 825 is a gate of the CLF 802 in the interface of the NCI standard. The gate unit 825 transmits and receives a message or the like to and from the device host 801 via a pipe. That is, the control unit 823 communicates with the device host 801 via the gate unit 825.

That is, the control unit 823 controls both the communication executed with the device host 801 via the gate unit 825 and the communication executed with the UICC 803 via the gate unit 824. Moreover, the control unit 823 can perform message format conversion between the HCI standard and the NCI standard.

For example, the control unit 823 converts the format of a message of the NCI standard acquired from the device host 801 and supplies the converted message as a message of the HCI standard to the UICC 803. On the contrary, for example, the control unit 823 converts the format of a message of the HCI standard acquired from the UICC 803 and supplies the converted message as a message of the NCI standard to the device host 801.

Since the control unit 823 performs the conversion process, the device host 801 can easily communicate with the UICC 803 using the interface of the existing NCI standard. Similarly, the UICC 803 can easily communicate with the device host 801 using the interface of the existing HCI stand.

Control Unit

Figure 19:
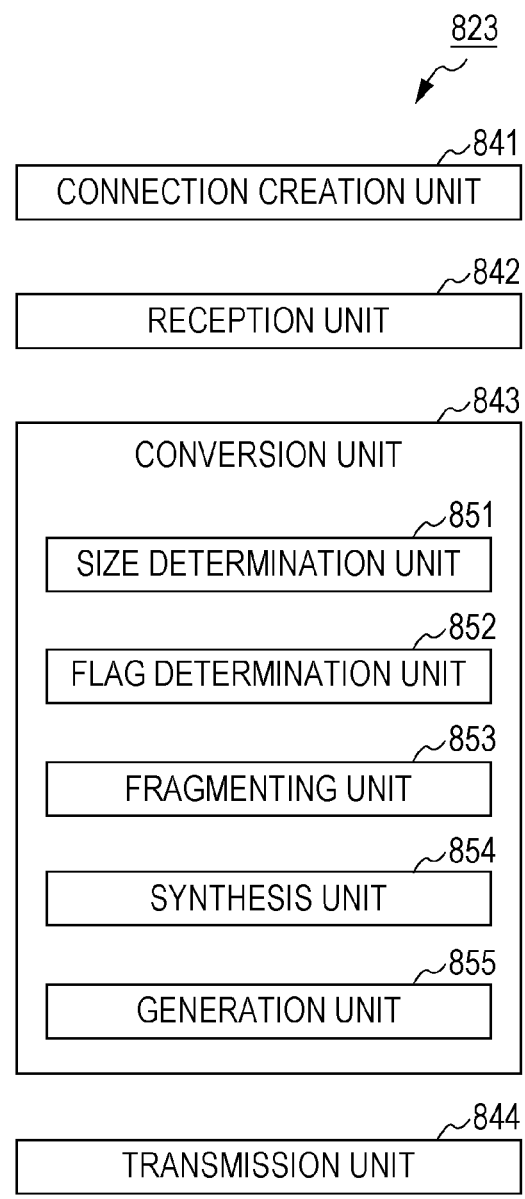
FIG. 19 is a functional block diagram illustrating an exemplary configuration of a control unit.

FIG. 19 is a functional block diagram illustrating an exemplary main configuration of the control unit 823. As shown in FIG. 19, the control unit 823 includes a connection creation unit 841, a reception unit 842, a conversion unit 843, and a transmission unit 844.

The connection creation unit 841 creates communication connection with the device host 801 or the UICC 803. At this time, for example, as shown in FIG. 20, the connection creation unit 841 generates and manages a correspondence table indicating a correspondence relationship among the pipe (connection) with the device host 801, the pipe (connection) with the UICC 803, and the buffer size which is the amount data transmitted once in each communication.

The reception unit 842 controls the gate unit 824 to perform a process associated with the reception of the HCI message from the UICC 803. Moreover, the reception unit 842 controls the gate unit 825 to perform a process associated with the reception of the NCI message from the device host 801.

The conversion unit 843 performs a process of converting the NCI message received by the process of the reception unit 842 into the HCI message or a process of converting the HCI message received by the process of the reception unit 842 into the NCI message.

When converting the NCI message into the HCI message, as in FIG. 21, the conversion unit 843 stores PBF and NCI message data (NCI Data) of the NCI message in HCP message data (Data) of an HCP packet. For example, when the size of the PBF is 1 byte, 0x10 is regarded as PBF=1 and 0x00 is regarded as PBF=0.

When converting the HCI message into the NCI message, the conversion unit 843 stores an HCP message data (HCI Data) of the HCP packet in the NCI message data (Data) of the NCI message, as in FIG. 22.

Since the maximum value (buffer size) of the data length transmittable once is predetermined in each of the HCI standard and the NCI standard, meaningful data with a length longer than that of the data are fragmented and transmitted. In addition, the buffer sizes of the both standards may be different from each other.

Accordingly, when performing the conversion process between the HCI standard and the NCI standard, the conversion unit 843 not only converts the format but also fragments or synthesize the data according to the length or the like of the data.

The conversion unit 843 includes a size determination unit 851, a flag determination unit 852, a fragmenting unit 853, a synthesis unit 854, and a generation unit 855.

The size determination unit 851 determines the data size (data length) of the NCI message data or the HCP message data. The flag determination unit 852 determines the value of a flag such as the PBF or the CB.

The fragmenting unit 853 performs a process of fragmenting the message data. The synthesis unit 854 performs a process (process of synthesizing the message data) of connecting a plurality of message data into one message. The generation unit 855 generates information necessary in the format conversion of the header information or the like.

The transmission unit 844 controls the gate unit 824 to perform a process of transmitting the message to the UICC 803. Moreover, the transmission unit 844 controls the gate unit 825 to perform a process of transmitting the message to the device host 801.

Flow of Conversion Process

Next, an exemplary flow of an NCI-HCI conversion process of converting the NCI format into the HCI format by the control unit 823 will be described with reference to the flowcharts of FIGS. 23 to 25.

The control unit 823 performs the NCI-HCI conversion process, when supplying the message, which is supplied from the device host 801, to the UICC 803.

When the NCI-HCI conversion process starts, the connection creation unit 841 creates connection of the NCI communication (communication with the device host 801) and the HCI communication (communication with the UICC 803) in step S601. At this time, the connection creation unit 841 generates and manages the correspondence table indicating the correspondence relationship between identification information of each connection and the buffer sizes, for example, as shown in FIG. 20. Then, the connection creation unit 841 also sets the identification information or the buffer sizes, as necessary. In the subsequent processes, the information is used.

In step S602, the reception unit 842 controls the gate unit 825 to receive the NCI message from the device host 801. In step S603, the conversion unit 843 determines whether the NCI message received at this time is the initial NCI message data of the HCP packet in consideration of even a case where a plurality of NCI message data are synthesized to generate one HCP packet.

When the conversion unit 843 determines that the NCI message received at this time is the initial NCI message data of the HCP packet, the reception unit 842 allows the process to proceed to step S604. That is, when the NCI message data are not synthesized or when the NCI message data are synthesized, each process subsequent to step S604 of FIG. 23 or each process of FIG. 24 is performed on the initial NCI message data.

In step S604, the size determination unit 851 determines whether the sum data size of the PBF and the NCI message data is larger than the HCI buffer size (which is the maximum value of the data length transmittable once in the connection of the HCI standard). For example, when the HCI transport layer is SWP (Single Wire Protocol), the HCI buffer size (SWP buffer size) is 30 bytes.

When the sum data size of the PBF and the NCI message data is larger than the HCI buffer size, it is necessary to fragment the NCI message data by the HCI buffer size. When the size determination unit 851 determines that the sum data size of the PBF and the NCI message data is larger than the HCI buffer size, the size determination unit 851 allows the process to proceed to step S605.

In step S605, the generation unit 855 generates the same HCP message header (the message header in FIG. 4) as the header shown in FIG. 3 and adds the HCP message header to the PBF and the NCI message data.

In step S606, the fragmenting unit 853 sets the PBF and the NCI message data to the HCP message data (the data in FIG. 4) and fragments the HCP message (the HCP message header and the HCP message data) by the HCI buffer size. Hereinafter, each fragmented HCP message is also referred to as an HCP message fragment.

In step S607, the generation unit 855 generates the same HCP packet header (the packet header in FIG. 4) as the header shown in FIG. 2 and adds the HCP packet header to each HCP message fragment. In step S608, the generation unit 855 sets the CB of the HCP packet (the HCP message fragments to which the HCP packet header is added) including the final (the final HCP message fragment) of the HCP message to CB=1 and sets the CBs of the other HCP packets to CB=0. CB=1 indicates that there is another HCP message fragment subsequent to the present HCP message fragment. CB=0 indicates that there is no HCP message fragment subsequent to the present HCP message fragment, that is, indicates that the present HCP message fragment is the final of the HCP message.

In step S609, the transmission unit 844 transmits each HCP packet to the UICC 803 via the gate unit 824 in predetermined order (for example, arrangement order of the HCP message fragments).

When the sum data size of the PBF and the NCI message data is larger than the HCI buffer size, the NCI message data are fragmented into the plurality of fragments and is transmitted in this manner.

In step S610, the control unit 823 determines whether the NCI-HCI conversion process ends. When the reception of the NCI message group from the device host 801 is not completed and it is determined that the NCI-HCI conversion process does not end, the processing target is updated to the next NCI message and the process returns to step S602.

In step S610, when the conversion of all of the NCI messages ends and it is determined that the NCI-HCI conversion process ends, the control unit 823 terminates the NCI-HCI conversion process.

Figure 24:
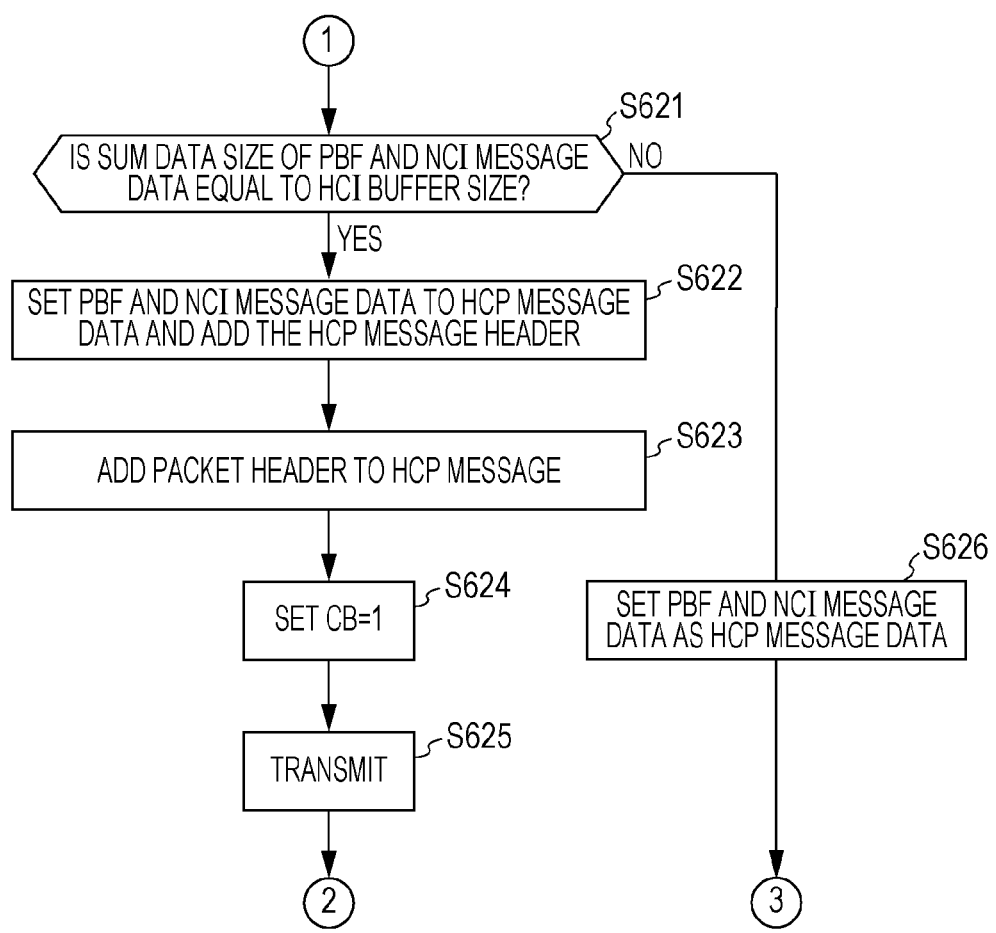
FIG. 24 is a flowchart subsequent to the flowchart of FIG. 23 to explain the exemplary flow of the NCI-HCI conversion process.

When it is determined that the sum data size of the PBF and the NCI message data is not larger than the HCI buffer size in step S604, the size determination unit 851 allows the process to proceed to step S621 of FIG. 24.

In step S621 of FIG. 24, the size determination unit 851 determines whether the sum data size of the PBF and the NCI message data is equal to the HCI buffer size. When the size determination unit 851 determines that the sum data size of the PBF and the NCI message data is equal to the HCI buffer size, it is not necessary to synthesize the plurality of NCI message data. Therefore, the size determination unit 851 allows the process to proceed to step S622 to execute the process from step S622 to step S625 of FIG. 24.

That is, in step S622, the generation unit 855 sets the PBF and the NCI message data to the HCP message data and generates the HCP message by generating and adding the HCP message header. In step S623, the generation unit 855 generates the HCP packet by generating the HCP packet header and adding the HCP packet header to the HCP message. That is, in this case, in the HCP packet, one NCI message data is stored.

Accordingly, since there is no subsequent fragment of the data, the generation unit 855 sets the CB of the HCP packet to CB=1 in step S624. In step S625, the transmission unit 844 transmits the HCP packet to the UICC 803 via the gate unit 824.

Figure 23:
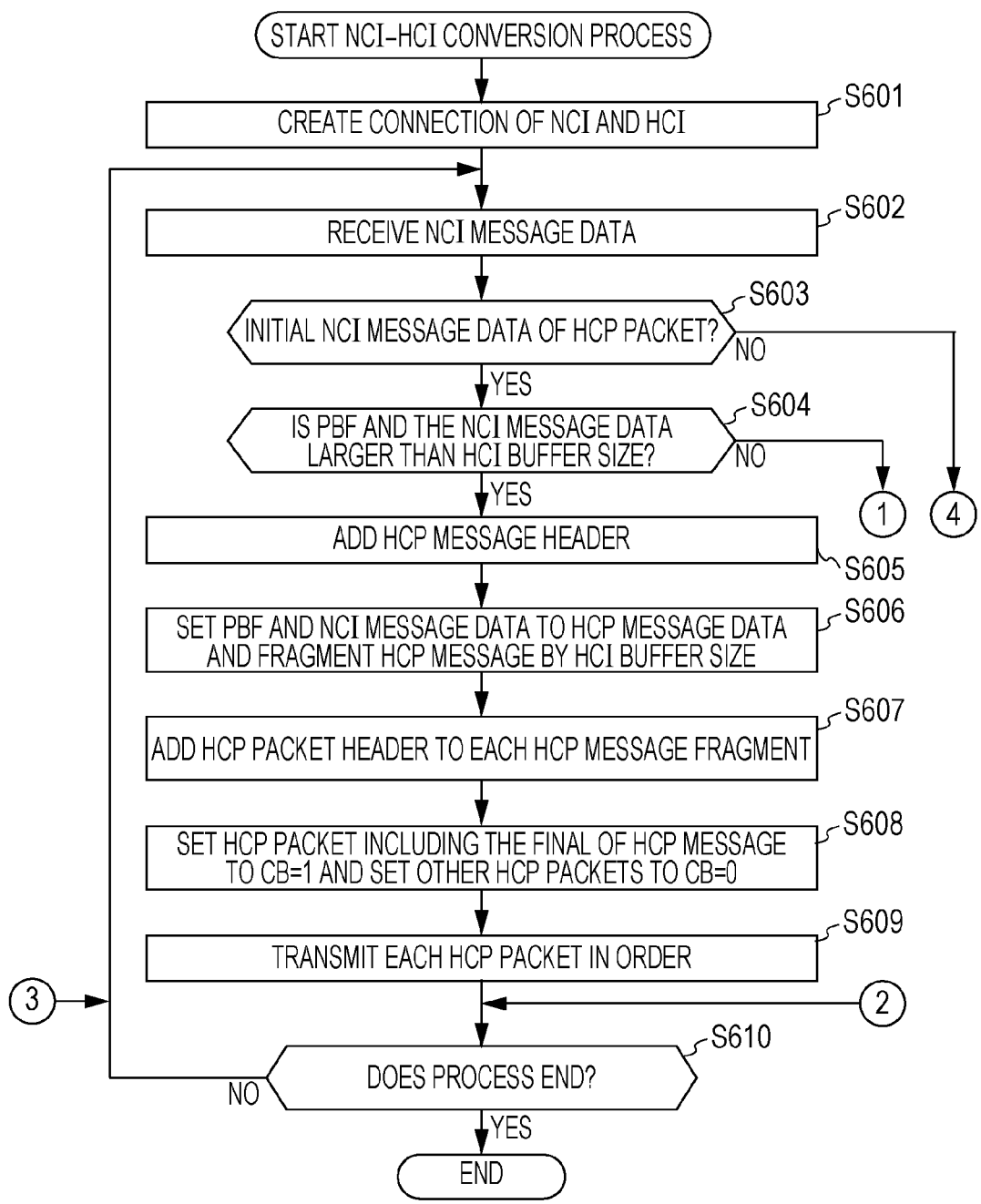
FIG. 23 is a flowchart illustrating an exemplary flow of an NCI-HCI conversion process.

When the HCP packet is transmitted, the control unit 823 returns the process to step S610 of FIG. 23 to repeat the subsequent processes.

When the size determination unit 851 determines that the sum data size of the PBF and the NCI message data is not equal to the HCI buffer size in step S621 of FIG. 24, the size determination unit 851 allows the process to proceed to step S626. In this case, the sum data size of the PBF and the NCI message data is smaller than the HCI buffer size.

The control unit 823 supplies the meaningful data supplied as the NCI message data to the UICC 803 as the possible smallest number of HCP packets. That is, the control unit 823 synthesizes the plurality of NCI message data obtained by fragmenting one meaningful data within the range which does not exceed the HCI buffer size (connecting).

For example, when one meaningful data is fragmented by the device host 801 and is transmitted as the plurality of NCI message data with the size smaller than the HCI buffer size, the control unit 323 synthesizes the NCI message data within the range which does not exceed the HCI buffer size (connecting).

By doing so, the control unit 823 can reduce the number of HCP packets. Therefore, the bandwidth of the bus 812 can be prevented from being consumed unnecessarily, thereby efficiently supplying the message to the UICC 803.

One HCP packet may include the plurality of meaningful data. However, since it is necessary for the UICC 803 to fragment the message by each meaningful data, the control unit 823 has to indicate the fragmenting place of the message (break of meaningful data).

In step S626, the conversion unit 843 retains the PBF and the NCI message data as the HCP message data. When the process of step S626 ends, the control unit 823 returns the process to step S610 of FIG. 23 to repeat the subsequent processes.

That is, when there is the subsequent NCI message data, it is necessary to determine whether the NCI message data are synthesized. Therefore, the control unit 823 does not transmit the NCI message data received at this time and receive the subsequent NCI message data.

Figure 25:
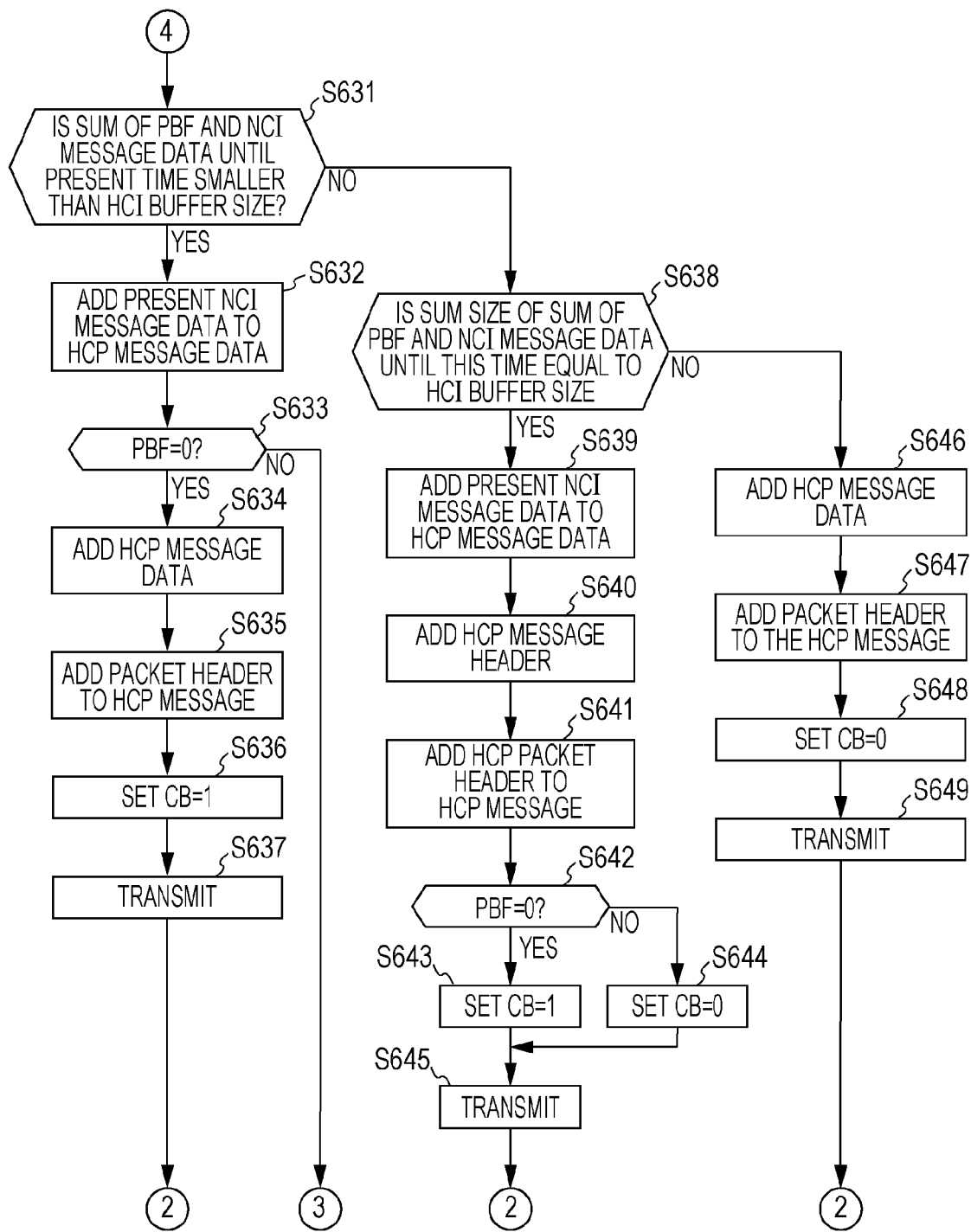
FIG. 25 is a flowchart subsequent to the flowchart of FIG. 23 to explain the exemplary flow of the NCI-HCI conversion process.

When it is determined that the NCI message data is not the initial NCI message data of the HCP packet in step S603 of FIG. 23, the control unit 823 allows the process to proceed to step S631 of FIG. 25. That is, when it is determined that there are HCP message data (the HCP message data at least including the previously received NCI message data) which are not transmitted, the control unit 823 performs each process of FIG. 25 to synthesize the NCI message data until the HCP message data exceeds the HCI buffer size or until the NCI message data including the final of the meaningful data are received.

In step S631, the size determination unit 851 determines whether the sum size of the PBF and the sum of the NCI message data until the present time is smaller than the HCI buffer size. When the size determination unit 851 determines that the sum size of the PBF and the sum of the NCI message data until the present time is smaller than the HCI buffer size, the size determination unit 851 allows the process to proceed to step S632.

In step S632, the synthesis unit 854 adds the present NCI message data to the HCP message data retained by the control unit 823. In step S633, the flag determination unit 852 determines whether the PBF of the NCI message received at this time is PBF=0. When the flag determination unit 852 determines the PBF=0, that is, determines that the NCI message data acquired at this time includes the final of the meaningful data (there is no subsequent NCI message data), the flag determination unit 852 allows the process to proceed to step S634.

In step S634, the generation unit 855 generates the HCP message header and adds the HCP message header to the HCP message data retained by the control unit 823. At this time, the generation unit 855 sets the PBF of the HCP message data to PBF=0. In step S635, the generation unit 855 generates the HCP packet header and adds the HCP packet header to the HCP message generated in step S634.

Since there is no NCI message data subsequent to the NCI message data included in the HCP packet generated in this manner, the generation unit 855 sets the CB of the HCP packet to CB=1 in step S636. In step S637, the transmission unit 844 transmits the HCP packet generated in this manner to the UICC 803 via the gate unit 824. When the transmission unit 844 transmits the HCP packet, the process returns to step S610 of FIG. 23 to repeat the subsequent processes.

When the flag determination unit 852 determines the PBF=1, that is, determines that the NCI message data acquired at this time do not include the final of the meaningful data (there is the subsequent NCI message data) in step S633 of FIG. 25, the flag determination unit 852 allows the process to proceed to step S602 of FIG. 23 without transmitting the HCP message data. That is, the NCI message data are continuously synthesized.

When the size determination unit 851 determines that the sum size of the PBF and the sum of the NCI message data until the present time is equal to or larger than the HCI buffer size in step S631 of FIG. 25, the size determination unit 851 allows the process to proceed to step S638. In step S638, the size determination unit 851 determines whether the sum size of the sum of the PBF and the NCI message data until this time is equal to the HCI buffer size. When the size determination unit 851 determines that the sum size of the sum of the PBF and the NCI message data until this time is equal to the HCI buffer size, the process proceeds to step S639.

In step S639, the synthesis unit 854 adds the present NCI message data to the HCP message data. In step S640, the generation unit 855 generates the HCP message header and adds the HCP message header to the HCP message data. In step S641, the generation unit 855 generates the HCP packet by generating the HCP packet header and adding the HCP packet header to the HCP message generated in step S640.

In step S642, the flag determination unit 852 determines whether the PBF of the NCI message received at this time is set to PBF=0. When the flag determination unit 852 determines PBF=0, the process proceeds to step S643, and then the generation unit 855 sets the CB of the HCP packet to CB=1 and the process proceeds to step S645. When the flag determination unit 852 determines PBF=1 in step S642, the process proceeds to step S644, and then the generation unit 855 sets the CB of the HCP packet to CB=0 and the process proceeds to step S645.

In step S645, the transmission unit 844 transmits the HCP packet to the UICC 803 via the gate unit 824. When the transmission unit 844 transmits the HCP packet, the process returns to step S610 of FIG. 23 to repeat the subsequent processes.

When the size determination unit 851 determines that the sum size of the sum of the PBF and the NCI message data until this time is not equal to the HCI buffer size in step S638 of FIG. 25, that is, when the sum size of the sum of the PBF and the NCI message data until this time is larger than the HCI buffer size, the size determination unit 851 allows the process to proceed to step S646.

In this case, since the NCI message data received at this time may not be added to the HCP message data, the control unit 823 transmits the NCI message data until the previous time as the HCP message data.

That is, in step S646, the generation unit 855 generates the HCP message header without adding the NCI message data received at this time to the HCP message data and adds the HCP message header to the HCP message data. In step S647, the generation unit 855 generates the HCP packet header and adds the HCP packet header to the HCP message generated in step S646. In this case, since there is the NCI message data subsequent to the NCI message data received at this time, the generation unit 855 sets the CB of the HCP packet generated at step S647 to CB=0 in step S648.

In step S649, the transmission unit 844 transmits the HCP packet to the UICC 803 via the gate unit 824. When the transmission unit 844 transmits the HCP packet, the process returns to step S610 of FIG. 23 to repeat the subsequent processes.

The control unit 823 can convert the NCI format into the HCI format by doing the above-described processes when receiving the NCI message data. Therefore, the processes can be performed with ease and at high speed compared to a case where all of the meaningful data are received and then the format thereof is converted and transmitted.

Thus, the device host 801 and the UICC 803 can easily transmit and receive the message using the existing NCI interface and HCI interface.

Flow of HCP Message Reception Process

Figure 26:
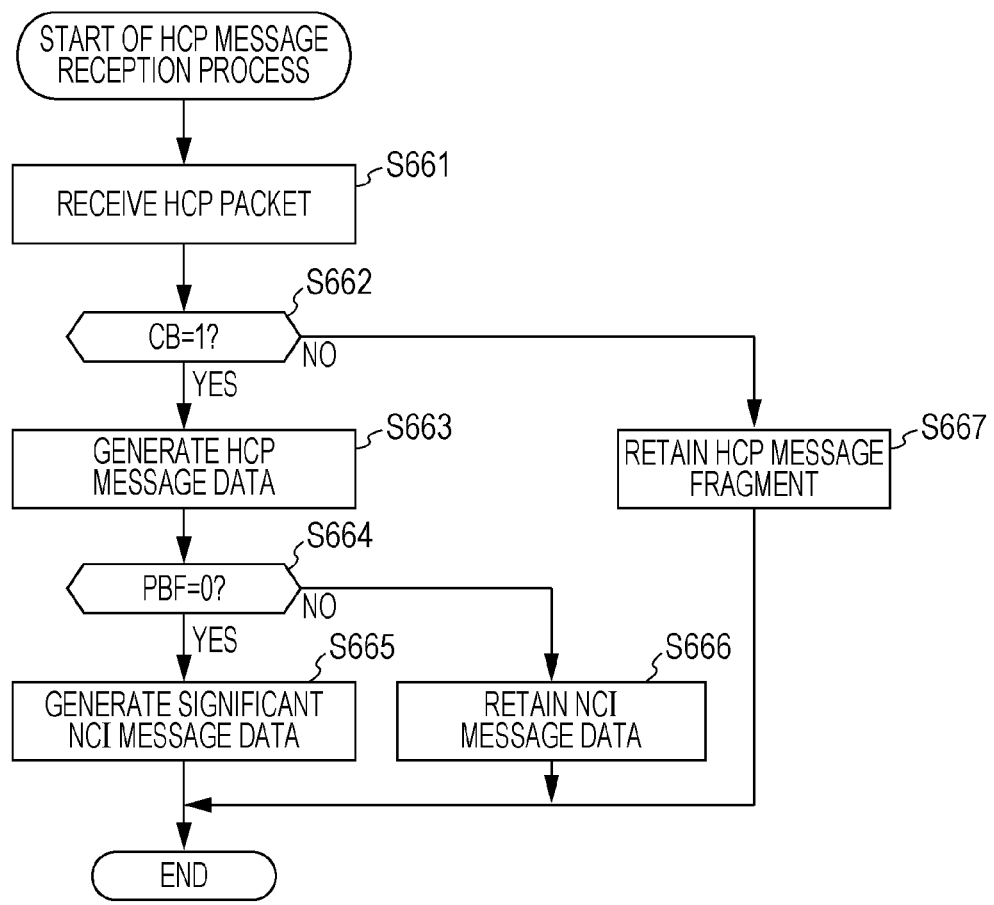
FIG. 26 is a flowchart illustrating an exemplary flow of an HCP message reception process.

An exemplary flow of the HCP message reception process of receiving the message supplied after the format is converted by the CLF 802 will be described with reference to the flowchart of FIG. 26.

The UICC 803 performs the HCP message reception process to receive the HCP packet transmitted from the CLF 802.

In step S661, the UICC 803 receives the HCP packet. In step S662, the UICC 803 determines whether the CB of the received HCP packet is CB=1. When the UICC 803 determines CB=1, the UICC 803 allows the process to proceed to step S663.

In this case, since there is no subsequent HCP message data, the UICC 803 extracts the HCP message data included in the HCP packet received at this time in step S663. For example, when the HCP message fragment is retained, the UICC 803 extracts the HCP message fragment included in the HCP packet received at this time, synthesizes the extracted HCP message and the retained HCP message fragment, and extracts the HCP message data.

In step S664, the UICC 803 determines whether the PBF of the HCP message data generated in step S663 is PBF=0.

When the UICC 803 determines PBF=0, the process proceeds to step S665 and the UICC 803 generates the significant NCI message data, which is the NCI message data by the meaningful data, from the HCP message data. For example, when there is retained NCI message data, that is, when the significant NCI message data are fragmented into the plurality of NCI message data, the UICC 803 synthesizes the plurality of NCI message data and generates the significant NCI message data.

When the UICC 803 generates the significant NCI message data, the UICC 803 terminates the HCP message reception process.

When the UICC 803 determines PBF=1 in step S664, the process proceeds to step S666 and the UICC 803 retains the NCI message data and terminates the HCP message reception process.

When the UICC 803 determines CB=0 in step S662, the process proceeds to step S667 and the UICC 803 retains the HCP message fragment received at this time and terminates the HCP message reception process.

The HCP message reception process is repeatedly performed to receive each HCP packet.

By doing so, the UICC 803 can receive the message, which is transmitted from the device host 801, via the CLF 802 using the HCI interface, like the non-contact short-range radio communication with an external device.

Example of Fragmenting

Figure 27:
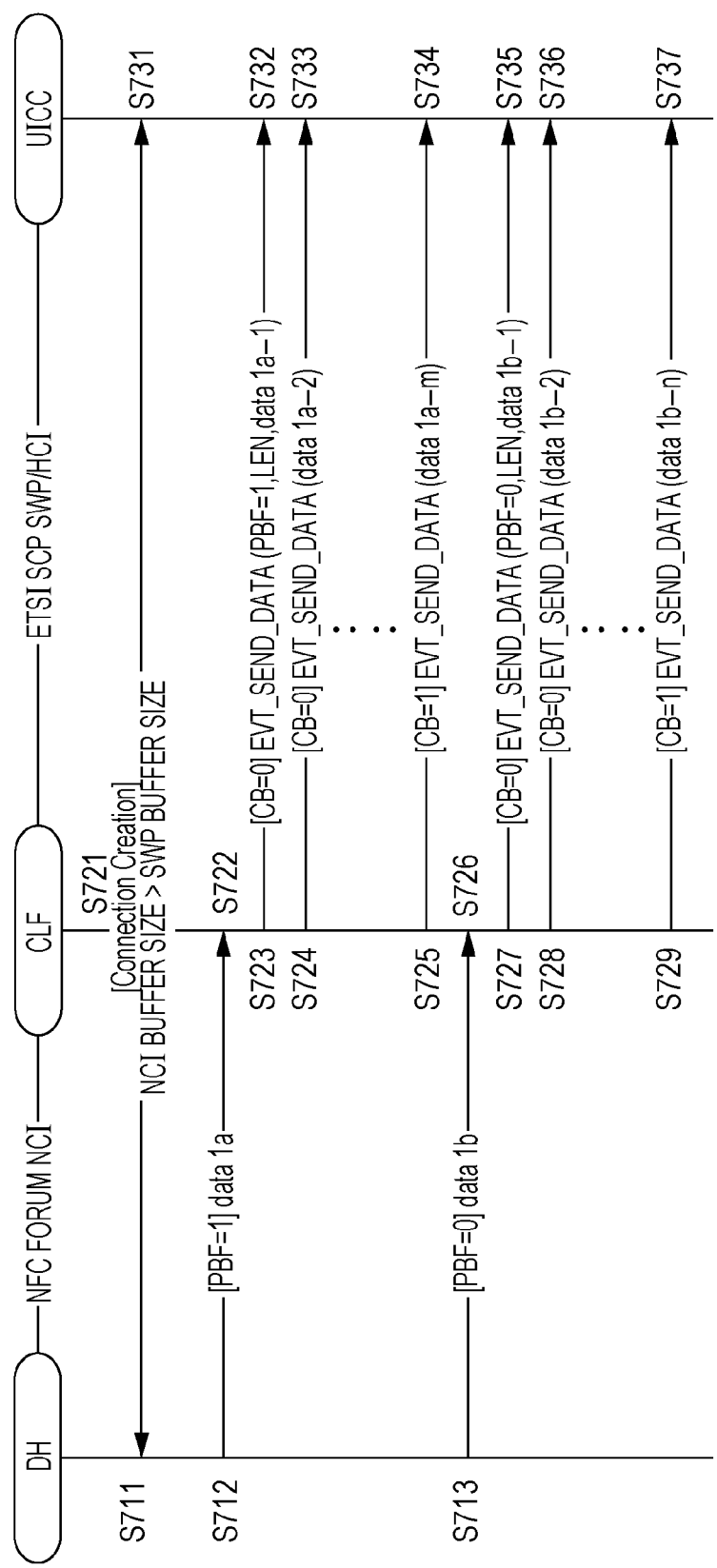
FIG. 27 is an explanatory diagram illustrating an exemplary conversion from NCI to HCI.

For example, when the NCI message data are larger than the HCI buffer size (for example, SWP buffer size), the message is transmitted according to the flowchart of FIG. 27.

That is, when the connection is created in step S711, step S721, and step S731, NCI message data (data $1a$) transmitted in step S712 is received and converted in step S722 by the CLF 802. For example, the NCI message data are fragmented into a plurality of HCP packets (data $1a$-1 to data $1a$-$m$) as in step S723 to step S725, and the plurality of HCP packets are transmitted to the UICC 803. The UICC 803 receives the HCP packets as in step S732 to step S734 and synthesizes the HCP packets to generate the NCI message data (data $1a$).

Likewise, NCI message data (data $1b$) transmitted in step S713 is received and converted in step S726 by the CLF 802. For example, the NCI message data are fragmented into a plurality of HCP packets (data $1b$-1 to data $1b$-$n$) as in step S727 to step S729, and the plurality of HCP packets are transmitted to the UICC 803. The UICC 803 receives the HCP packets as in step S735 to step S737 and synthesizes the HCP packets to generate the NCI message data (data $1b$).

Figure 28:
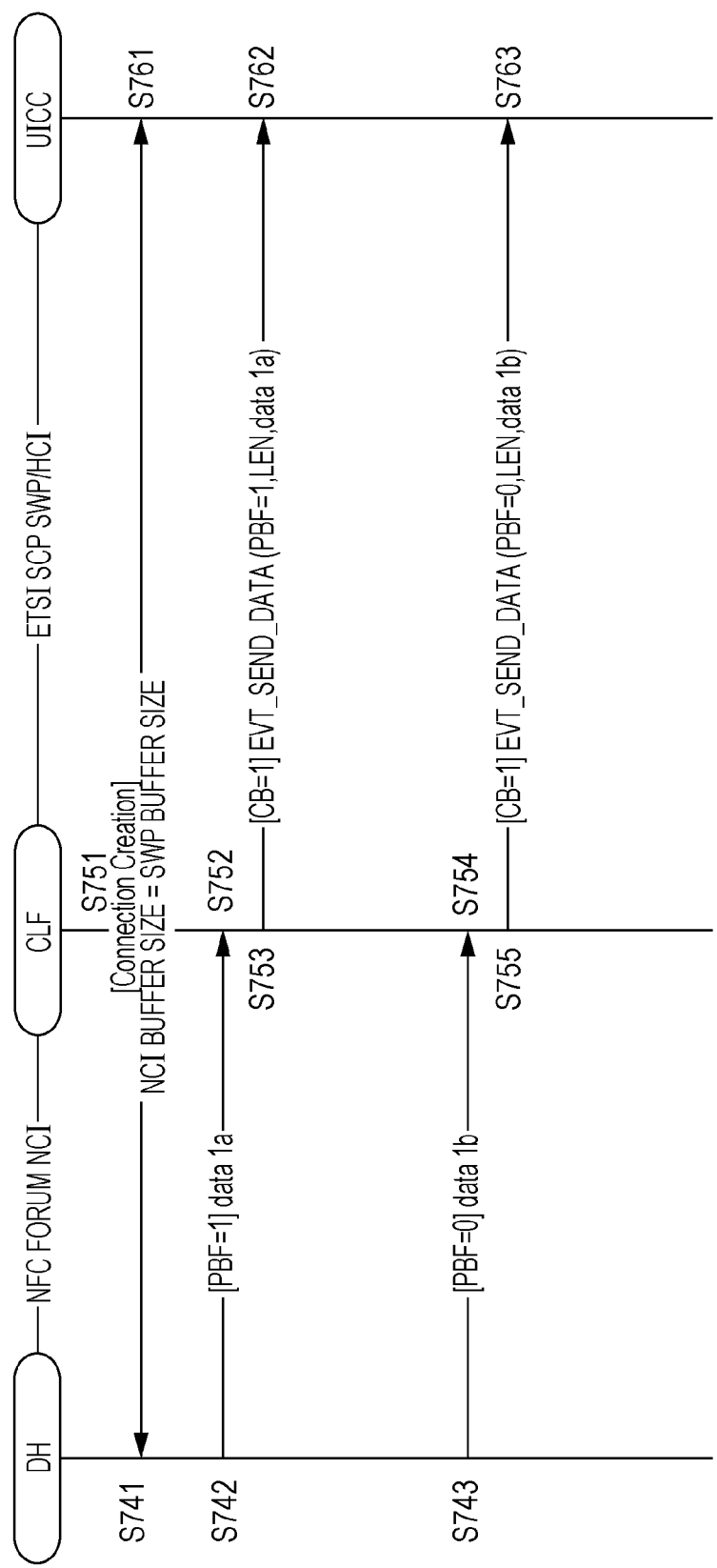
FIG. 28 is an explanatory diagram illustrating an exemplary conversion from NCI to HCI.

The UICC 803 synthesizes the NCI message data (data $1a$) and the NCI message data (data $1b$) to generate the meaningful data (data 1).

data $1a$=data $1a$-1+data $1a$-2+ . . . +data $1a$-$m$
data $1b$=data $1b$-1+data $1b$-2+ . . . +data $1b$-$n$
meaningful data data 1=data $1a$+data $1b$ Example of Equality For example, when the NCI message data are equal to the HCI buffer size (for example, SWP buffer size), the message is transmitted according to the flowchart of FIG. 28. That is, one NCI message is converted into one HCP packet and is transmitted.

That is, when the connection is created in step S741, step S751, and step S761, the NCI message data (data $1a$) transmitted in step S742 is received and converted in step S752 by the CLF 802 and the converted NCI message data are transmitted as the HCP packet to the UICC 803 in step S753. The UICC 803 receives the HCP packet in step S762.

The NCI message data (data $1b$) transmitted in step S743 is received and converted in step S754 by the CLF 802 and the converted NCI message data are transmitted as the HCP packet to the UICC 803 in step S755. The UICC 803 receives the HCP packet in step S763.

The UICC 803 synthesizes the NCI message data (data 1*a*) and the NCI message data (data 1*b*) to generate the meaningful data (data 1).

meaningful data data 1=data 1*a*+data 1*b*

Example of Synthesis

Figure 29:
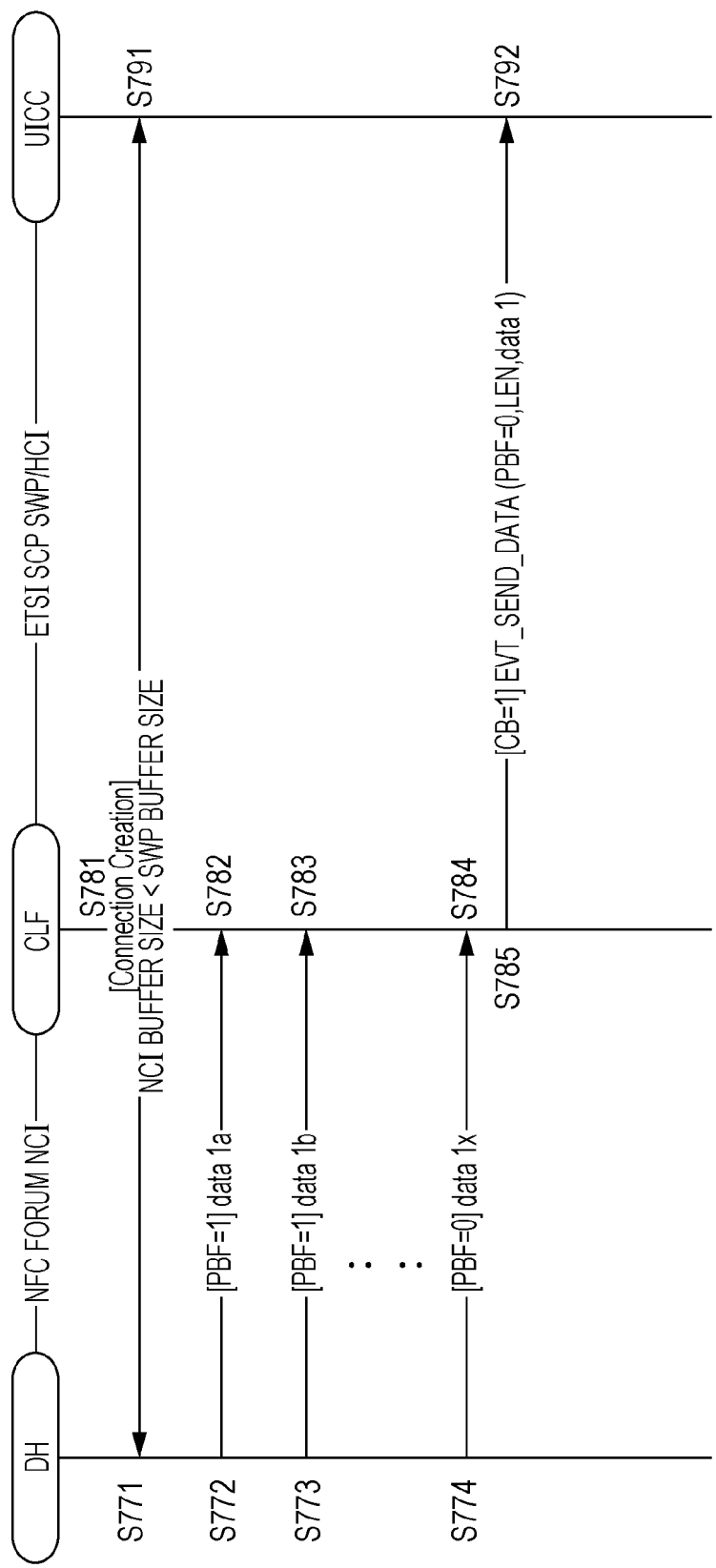
FIG. 29 is an explanatory diagram illustrating an exemplary conversion from NCI to HCI.

For example, when the NCI message data are smaller than the HCI buffer size (for example, SWP buffer size), the message is transmitted according to the flowchart of FIG. 29.

That is, when the connection is created in step S771, step S781, and step S791, the plurality of NCI message data (data 1*a* to data 1*x*) is transmitted from the device host 801 as in step S772 to step S774, and is received by the CLF 802 as in step S782 to step S784. The data are converted by the CLF 802 and are unified into one HCP packet (data 1). Then, the HCP packet is transmitted to the UICC 803 in step S785. The UICC 803 receives the HCP packet in step S792.

meaningful data data 1=data 1*a*+data 1*b*

In FIG. 29, the case where the data size of the meaningful data data 1 is smaller than the HCI buffer size (for example, SWP buffer size) has been described. For example, when the data size of the meaningful data data 1 is larger than the HCI buffer size, the meaningful data data 1 is transmitted as the plurality of HCP packets to the UICC 803. In this case, the CLF 802 may synthesize and transmit the NCI message data until the data size exceeds to the HCI buffer size or may transmit one NCI message data as one HCP packet without the synthesis. For example, the NCI message data may be equally fragmented so that the size of each fragmented NCI message data does not exceed the HCI buffer size. Other fragmenting methods may be used.

The synthesis and the transmission may be performed whenever the NCI message data are received or may be performed after all of the meaningful data are received. Moreover, the synthesis and the transmission may be performed at other timing.

As described above, the CLF 802 can appropriately convert the NCI format into the HCI format in various cases. Thus, even when it is necessary to fragment and synthesis the message, the UICC 803 can easily receive the message from the device host 801 using the existing HCI interface, as in the case where the non-contact short-range communication with an external device is performed.

Flow of Conversion Process

Next, an exemplary flow of an HCI-NCI conversion process of converting the HCI format into the NCI format by the control unit 823 will be described with reference to the flowcharts of FIGS. 30 to 32.

The control unit 823 performs the HCI-NCI conversion process when supplying the message, which is supplied from the UICC 803, to the device host 801.

When the HCI-NCI conversion process starts, the connection creation unit 841 creates connection of the NCI communication (communication with the device host 801) and the HCI communication (communication with the UICC 803) in step S801. At this time, the connection creation unit 841 generates and manages the correspondence table indicating the correspondence relationship between identification information of each connection and the buffer sizes, for example, as shown in FIG. 20, as shown in FIG. 20. Then, the connection creation unit 841 also sets the identification information or the buffer sizes, as necessary. In the subsequent processes, the information is used.

In step 802, the reception unit 842 controls the gate unit 824 to receive the HCP packet from the UICC 803. In step S803, the conversion unit 843 determines whether the HCP packet received at this time is the initial HCP packet of the NCI message data in consideration of even a case where a plurality of HCP packets is synthesized to generate one NCI message.

When the conversion unit 843 determines that the HCP packet received at this time is the initial HCP packet of the NCI message data, the reception unit 842 allows the process to proceed to step S804. That is, when the HCP packets are not synthesized or when the HCP packets are synthesized, each process subsequent to step S804 of FIG. 30 or each process of FIG. 31 is performed on the initial HCP packet.

In step S804, the size determination unit 851 determines whether the data size of the HCP message data is larger than the NCI buffer size (which is the maximum value of the data length transmittable once in the connection of the NCI standard).

When the size of the HCP message data is larger than the NCI buffer size, it is necessary to fragment the HCP message data by the NCI buffer size. When the size determination unit 851 determines whether the size of the HCP message data is larger than the NCI buffer size, the size determination unit 851 allows the process to proceed to step S805.

In step S805, the fragmenting unit 853 sets the HCP message data to the NCI message data and fragments the NCI message data by the NCI buffer size. Hereinafter, each fragmented NCI message is also referred to as an NCI message fragment.

In step S806, the generation unit 855 generates the NCI message header and adds the NCI message header to each fragmented NCI message data. In step S807, the flag determination unit 852 determines whether the CB of the received HCP packet is CB=1.

When the flag determination unit 852 determines CB=1, the flag determination unit 852 allows the process to proceed to step S808. In this case, there is not subsequent HCP packet fragmented from the same meaningful data. Accordingly, in step S808, the generation unit 855 sets the PBF of the NCI message including the final of the NCI message data in the fragmented NCI message data to PBF=0 and sets the PBFs of the other NCI messages to PBF=1. When the process of step S808 ends, the generation unit 855 allows the process to proceed to step S810.

When the flag determination unit 852 determines CB=0 in step S807, the flag determination unit 852 allows the process to proceed to step S809. In this case, there is the subsequent HCP packet fragmented from the same meaningful data. Accordingly, in step S809, the generation unit 855 sets the PBFs of all of the NCI messages to PBF=1. When the process of step S809 ends, the generation unit 855 allows the process to proceed to step S810.

In step S810, the transmission unit 844 transmits each NCI message to the device host 801 via the gate unit 825 in predetermined order (for example, arrangement order of the NCI message fragments).

When the size of the HCP message data is larger than the NCI buffer size, the HCP message data are fragmented into the plurality of fragments and is transmitted in this manner.

In step S811, the control unit 823 determines whether the HCI-NCI conversion process ends. When the reception of the HCI packet group from the UICC 803 is not completed and it is determined that the HCI-NCI conversion process does not end, the processing target is updated to the next HCP packet and the process returns to step S802.

In step S811, when the conversion of all of the HCP packets ends and it is determined that the HCI-NCI conversion process ends, the control unit 823 terminates the HCI-NCI conversion process.

Figure 31:
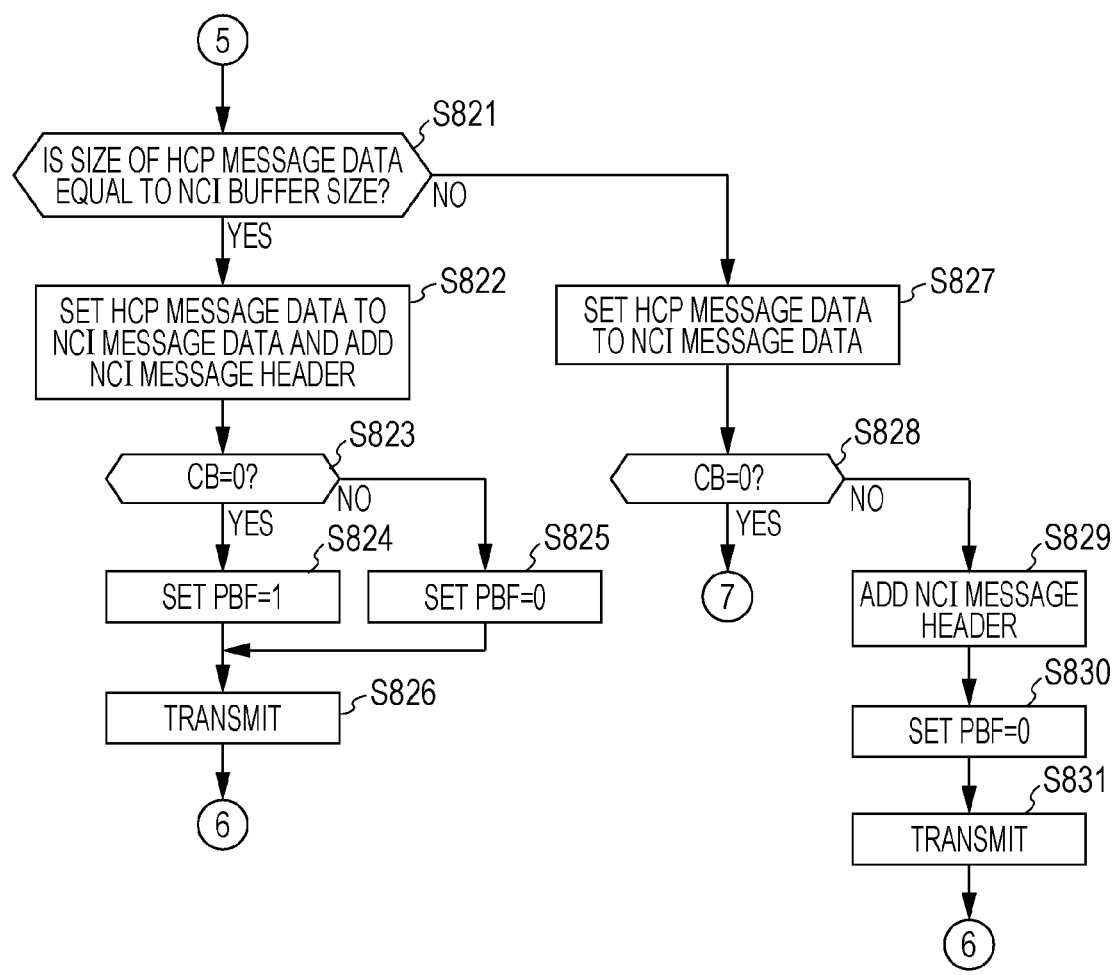
FIG. 31 is a flowchart subsequent to the flowchart of FIG. 30 to explain the exemplary flow of the HCI-NCI conversion process.

When it is determined that the size of the HCP message data is not larger than the NCI buffer size in step S804, the size determination unit 851 allows the process to proceed to step S821 of FIG. 31.

In step S821 of FIG. 31, the size determination unit 851 determines whether the size of the HCP message data is equal to the NCI buffer size. When the size determination unit 851 determines that the size of the HCP message data is equal to the NCI buffer size, it is not necessary to synthesize the plurality of HCP message data. Therefore, the size determination unit 851 allows the process to proceed to step S822 to execute the process from step S822 to step S826 of FIG. 31.

That is, in step S822, the generation unit 855 sets the HCP message data to the NCI message data and generates the NCI message by generating and adding the NCI message header.

In step S823, the flag determination unit 852 determines whether the CB of the HCP message data received at this time is CB=0. When the flag determination unit 852 determines CB=0 and that there is the subsequent HCP message data, the generation unit 855 sets the PBF of the NCI message generated in step S822 to PBF=1 in step S824 and the process proceeds to step S826.

When the flag determination unit 852 determines CB=1 and that there is no subsequent HCP message data in step S823, the generation unit 855 sets the PBF of the NCI message generated in step S822 to PBF=0 in step S825 and the process proceeds to step S826.

In step S826, the transmission unit 844 transmits the NCI message to the device host 801 via the gate unit 825.

Figure 30:
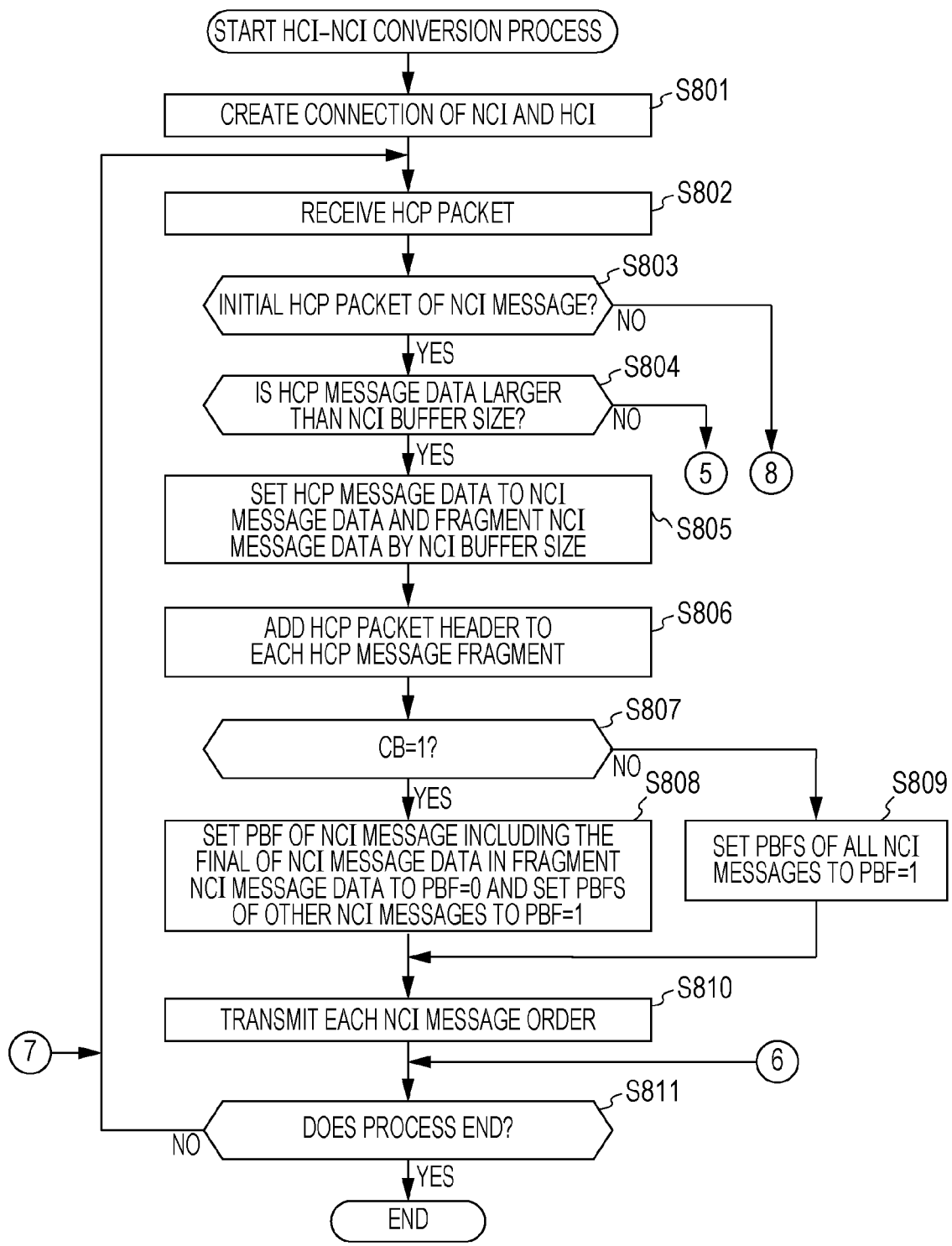
FIG. 30 is a flowchart illustrating an exemplary flow of an HCI-NCI conversion process.

When the transmission unit 844 transmits the NCI message, the control unit 823 returns the process to step S811 of FIG. 30 to repeat the subsequent processes.

When the size determination unit 851 determines that the size of the sum of the HCP message data is not equal to the NCI buffer size in step S821 of FIG. 31, the size determination unit 851 allows the process to proceed to step S827. In this case, the size of the HCP message data is smaller than the NCI buffer size.

The control unit 823 transmits the meaningful data supplied as the HCP packet to the device host 801 as the possible smallest number of NCI messages. That is, the control unit 823 synthesizes the plurality of HCP message data obtained by fragmenting one meaningful data within the range which does not exceed the NCI buffer size (connecting).

For example, when one meaningful data is fragmented by the UICC 803 and is transmitted as the plurality of HCP message data with the size smaller than the NCI buffer size, the control unit 323 synthesizes the HCP message data within the range which does not exceed the NCI buffer size (connecting).

By doing so, the control unit 823 can reduce the number of NCI messages. Therefore, the bandwidth of the bus 811 can be prevented from being consumed unnecessarily, thereby efficiently supplying the message to the device host 801.

One NCI message may include the plurality of meaningful data. However, since it is necessary for the device host 801 to fragment the message by each meaningful data, the control unit 823 has to indicate the fragmenting place of the message (break of meaningful data).

In step S827, the conversion unit 843 retains the HCP message data as the NCI message data. In step S828, the flag determination unit 852 determines whether the CB of the HCP message data is CB=0. When the flag determination unit 852 determines CB=0 and that there is the subsequent HCP message, the control unit 823 returns the process to step S802 of FIG. 30 to repeat the subsequent processes.

That is, when there is the subsequent HCP message data, it is necessary to determine whether the HCP message data are synthesized. Therefore, the control unit 823 does not transmit the HCP message data received at this time and receive the subsequent HCP message data.

When the flag determination unit 852 determines CB=1 and that there is no subsequent HCP message in step S828 of FIG. 31, the process proceeds to step S829 and the generation unit 855 generates the NCI message by adding the NCI message header to the NCI message data. In step S830, the generation unit 855 sets the PBF of the NCI message to PBF=0. In step S831, the transmission unit 844 transmits the NCI message to the device host 801 via the gate 825.

When the transmission unit 844 transmits the NCI message, the control unit 823 returns the process to step S811 of FIG. 30 to repeat the subsequent processes.

Figure 32:
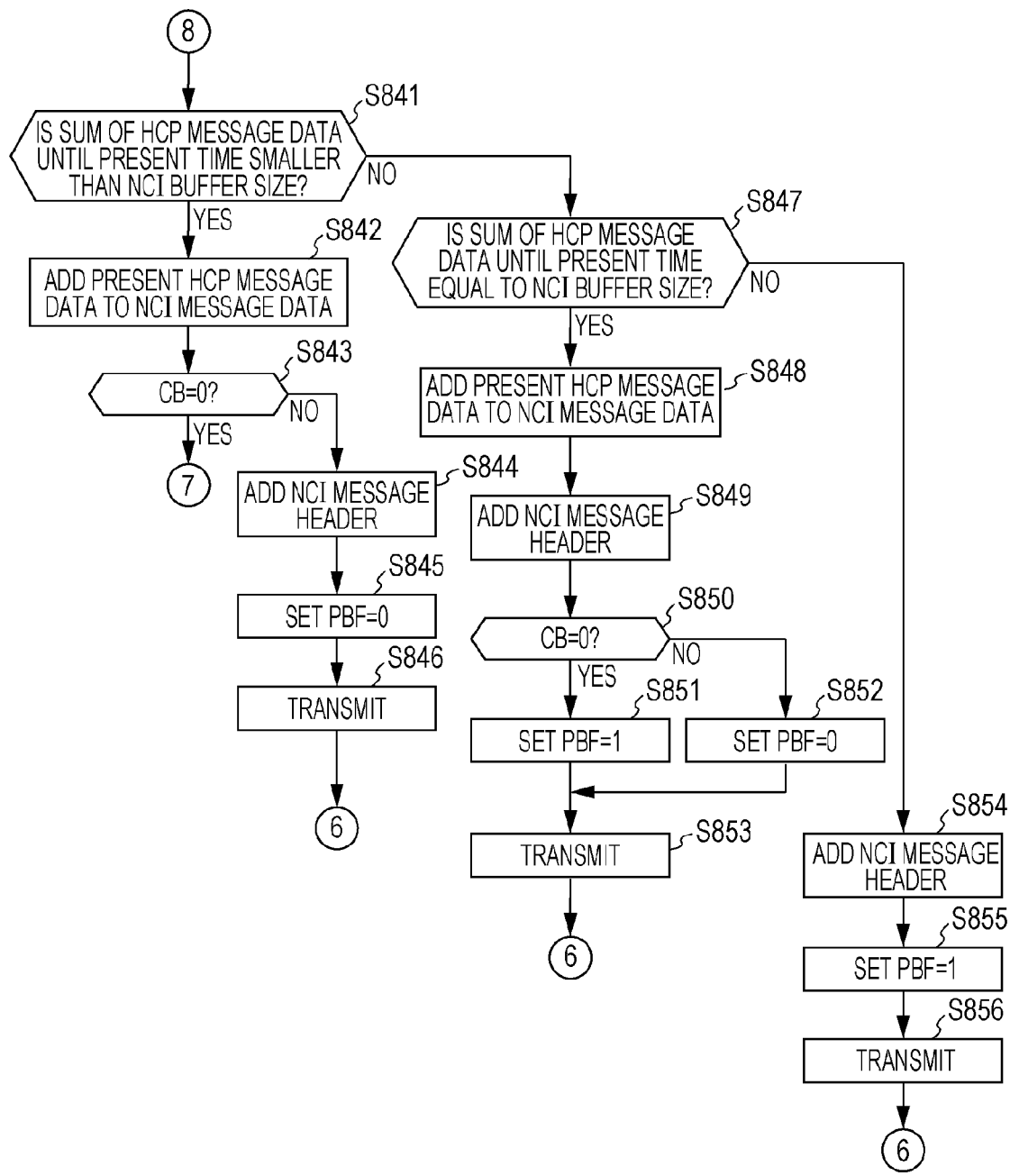
FIG. 32 is a flowchart subsequent to the flowchart of FIG. 31 to explain the exemplary flow of the HCI-NCI conversion process.

When it is determined that the NCI message is not the initial NCI message of the HCP packet in step S803 of FIG. 30, the control unit 823 allows the process to proceed to step S841 of FIG. 32. That is, when it is determined that there is the NCI message data (the NCI message data at least including the previously received HCP message data) which is not transmitted, the control unit 823 performs each process of FIG. 32 to synthesize the HCP message data until the NCI message data exceeds the NCI buffer size or until the HCP message data including the final of the meaningful data are received.

In step S841, the size determination unit 851 determines whether the sum size of the sum of the HCP message data until the present time is smaller than the NCI buffer size. When the size determination unit 851 determines that the sum size of the sum of the HCP message data until the present time is smaller than the NCI buffer size, the size determination unit 851 allows the process to proceed to step S842.

In step S842, the synthesis unit 854 adds the present HCP message data to the NCI message data retained by the control unit 823. In step S843, the flag determination unit 852 determines whether the CB of the HCP message received at this time is CB=0. When the flag determination unit 852 determines the CB=0, that is, determines that the HCP message data acquired at this time does not include the final of the meaningful data (there is the subsequent NCI message data), the flag determination unit 852 returns the process to step S802 of FIG. 30 to repeat the subsequent processes.

When the flag determination unit 852 determines the CB=1 in step S843 of FIG. 32, that is, determines that the HCP message data acquired at this time includes the final of the meaningful data (there is no subsequent NCI message data), the generation unit 855 generates the NCI message by generating the NCI message header and adding the NCI message header to the NCI message data retained by the control unit 823. In step S845, the generation unit 855 sets the PBF of the NCI message to PBF=0.

In step S846, the transmission unit 844 transmits the generated NCI message to the device host 801 via the gate unit 825. When the transmission unit 844 transmits the NCI message, the process returns to step S811 of FIG. 30 to repeat the subsequent processes.

When the size determination unit 851 determines that the sum size of the HCP message data until the present time is larger than the NCI buffer size in step S841 of FIG. 32, the size determination unit 851 allows the process to proceed to step S847. In step S847, the size determination unit 851 determines whether the sum size of the HCP message data until the present time is equal to the NCI buffer size. When the size determination unit 851 determines that the sum size of the HCP message data is equal to the NCI buffer size, the size determination 851 allows the process to proceed to step S848.

In step S848, the synthesis unit 854 adds the present HCP message data to the NCI message data retained by the control unit 823. In step S849, the generation unit 855 generates the NCI message by generating the NCI message header and adding the NCI message header to the NCI message data.

In step S850, the flag determination unit 852 determines whether the CB of the HCP packet received at this time is CB=0. When the flag determination unit 852 determines CB=0, that is, determines that there is the subsequent HCP message data, the process proceeds to step S851 and the generation unit 855 sets the PBF of the NCI message generated in step S848 to PBF=1 and allows the process to proceed to step S853.

When the flag determination unit 852 determines CB=1 in step S850, that is, determines that there is no subsequent HCP message data, the process proceeds to step S852 and the generation unit 855 sets the PBF of the NCI message generated in step S848 to PBF=0 and allows the process to proceed to step S853.

In step S853, the transmission unit 844 transmits the generated NCI message to the device host 801 via the gate unit 825. When the transmission unit 844 transmits the NCI message, the process returns to step S811 of FIG. 30 to repeat the subsequent processes.

When the size determination unit 851 determines that the data size of the sum of the HCP message data until the present time is not equal to the NCI buffer size in step S847 of FIG. 32, that is, determines that the data size of the sum of the HCP message data until the present time is larger than the NCI buffer size, the size determination unit 851 allows the process to proceed to step S854.

In this case, since the HCP message data received at this time may not be added to the NCI message data, the control unit 823 transmits the HCP message data until the previous time as the NCI message data.

That is, in step S854, the generation unit 855 generates the NCI message header without adding the HCP message data received at this time to the NCI message data and adds the NCI message header to the NCI message data. In step S855, the generation unit 855 sets the PBF of the NCI message to PBF=1.

In step S856, the transmission unit 844 transmits the NCI message to the device host 801 via the gate unit 825. When the transmission unit 844 transmits the NCI message, the process returns to step S811 of FIG. 30 to repeat the subsequent processes.

The control unit 823 can convert HCI format into the NCI format by doing the above-described processes when receiving the HCI message data. Therefore, for example, the processes can be performed with ease and at high speed compared to a case where all of the meaningful data are received and then the format thereof is converted and transmitted.

Thus, the device host 801 and the UICC 803 can easily transmit and receive the message using the existing HCI interface and NCI interface.

Flow of NCI Message Reception Process

Figure 33:
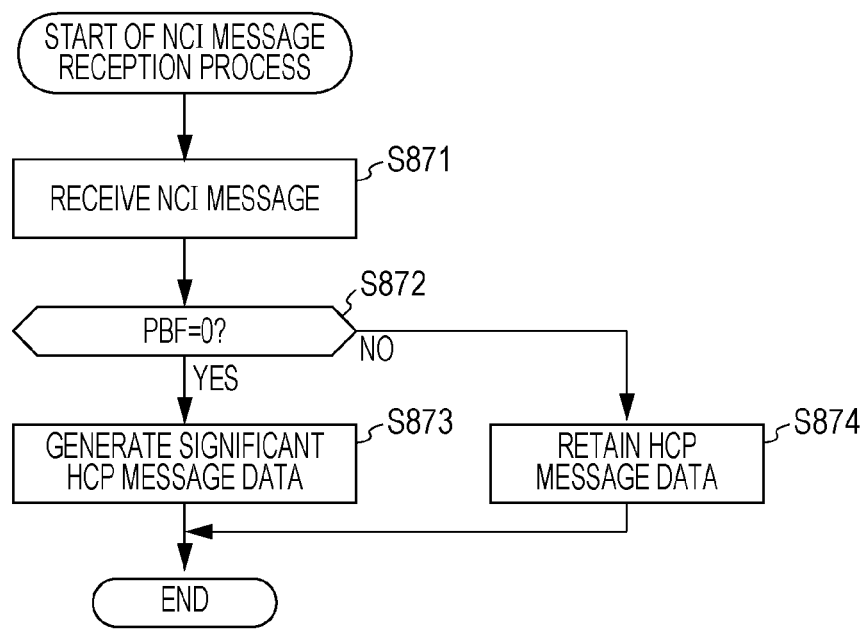
FIG. 33 is a flowchart illustrating an exemplary flow of an NCI message reception process.

An exemplary flow of the NCI message reception process of receiving the message supplied after the format is converted by the CLF 802 will be described with reference to the flowchart of FIG. 33.

The device host 801 performs the NCI message reception process to receive the NCI message transmitted from the CLF 802.

In step S871, the device host 801 receives the NCI message. In step S872, the device host 801 determines whether the PBF of the received NCI message is PBF=0. When the device host 801 determines PBF=0, the device host 801 allows the process to proceed to step S873.

In this case, since there is no subsequent NCI message data, the device host 801 extracts the HCP message data included in the NCI message received at this time in step S873, appropriately synthesizes the extracted HCP message data together with, for example, another retained fragmented HCP message data, and generates the significant HCP message data which is the meaningful HCP message data.

When the device host 801 determines PBF=1 in step S872, the device host 801 allows the process to proceed to step S874. In step S874, the device host 801 retains the HCP message data extracted from the NCI message.

When the process of step S873 or step S874 ends, the device host 801 terminates the NCI message reception process.

The NCI message reception process is repeatedly performed to receive each NCI message.

By doing so, the device host 801 can receive the message transmitted from the UICC 803 via the CLF 802 using the existing NCI interface. That is, the UICC 803 can transmit the message to be transmitted to the device host 801 via the CLF 802 using the HCI interface, like the non-contact short-range radio communication with an external device.

Example of Fragmenting

Figure 34:
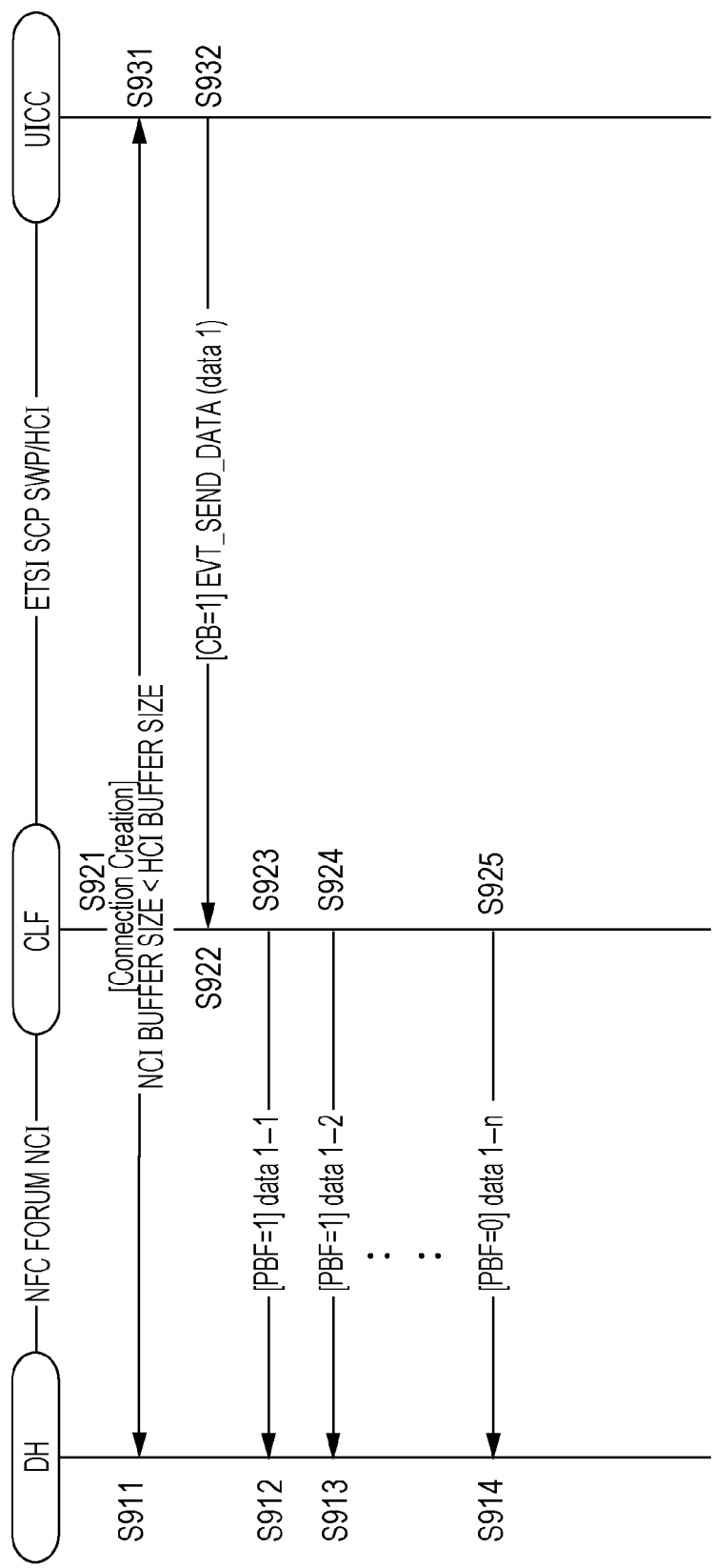
FIG. 34 is an explanatory diagram illustrating an exemplary conversion from HCI to NCI.

For example, when the HCP message data are larger than the NCI buffer size, the message is transmitted according to the flowchart of FIG. 34.

That is, when the connection is created in step S911, step S921, and step S931, HCP packet (data 1) transmitted in step S932 from the UICC 803 is received and converted in step S922 by the CLF 802. For example, the HCP packet is fragmented into a plurality of NCI messages (data 1-1 to data 1-$n$) as in step S923 to step S925, and the plurality of NCI messages are transmitted to the device host 801. The device host 801 receives the NCI messages as in step S912 to step S914 and synthesizes the NCI messages to generate the HCP message data (data 1).

meaningful data data 1=data 1-1+data 1-2+ . . . +data 1-$n$

Example of Equality

Figure 35:
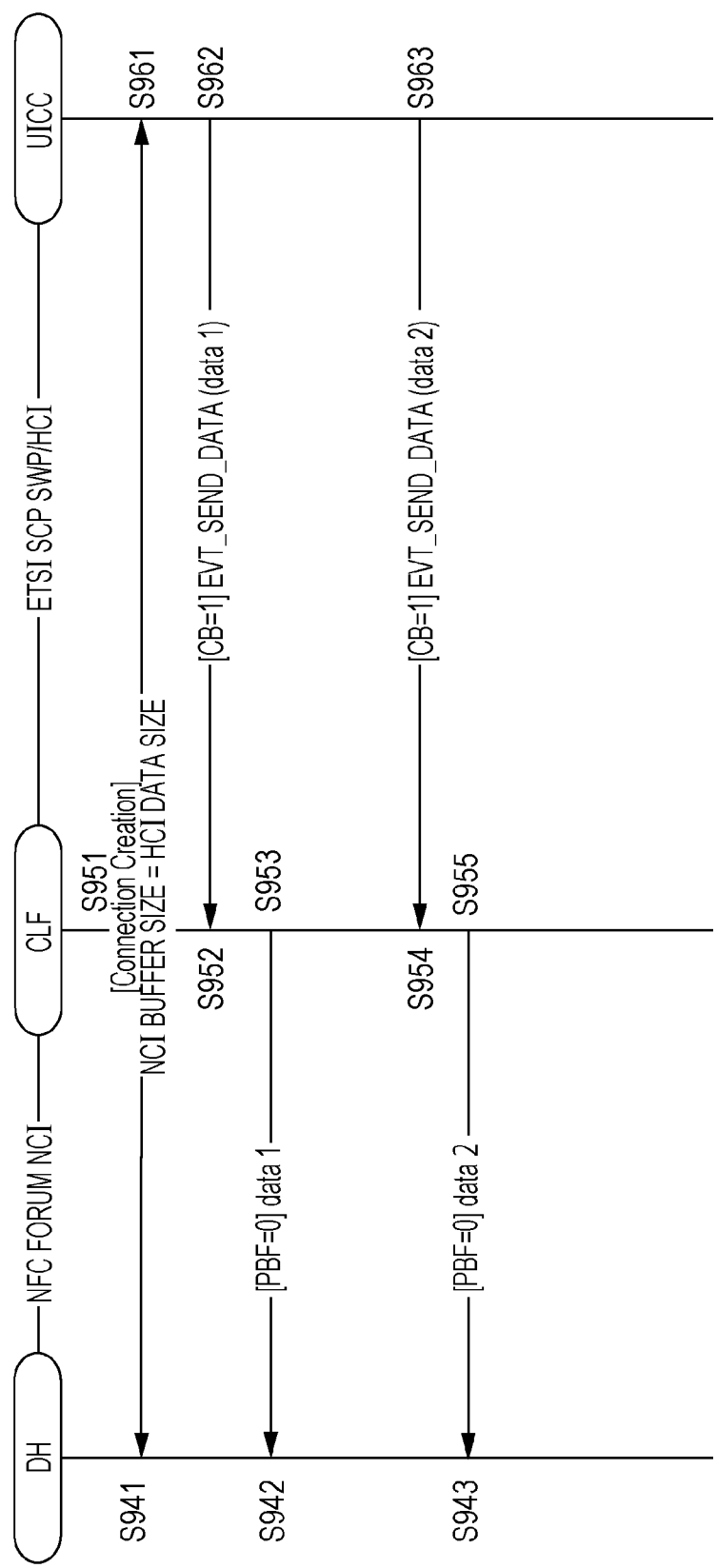
FIG. 35 is an explanatory diagram illustrating an exemplary conversion from HCI to NCI.

For example, when the HCP message data are equal to the NCI buffer size, the message is transmitted according to the flowchart of FIG. 35. That is, one HCP packet is converted into one NCI message and is transmitted.

That is, when the connection is created in step S941, step S951, and step S961, the HCP packet (data 1) transmitted from the UICC 803 in step S962 is received and converted in step S952 by the CLF 802 and the converted HCP packet data are transmitted as the NCI message (data 1) to the device host 801 in step S953. The device host 801 receives the NCI message in step S942.

Likewise, the HCP packet (data 2) transmitted from the UICC 803 in step S963 is received and converted in step S954 by the CLF 802 and the converted HCP packet data are transmitted as the NCI message (data 2) to the device host 801 in step S955. The device host 801 receives the NCI message in step S943.

In this case, both the NCI message (data 1) and the NCI message (data 2) are the meaningful data.

Example of Synthesis

Figure 36:
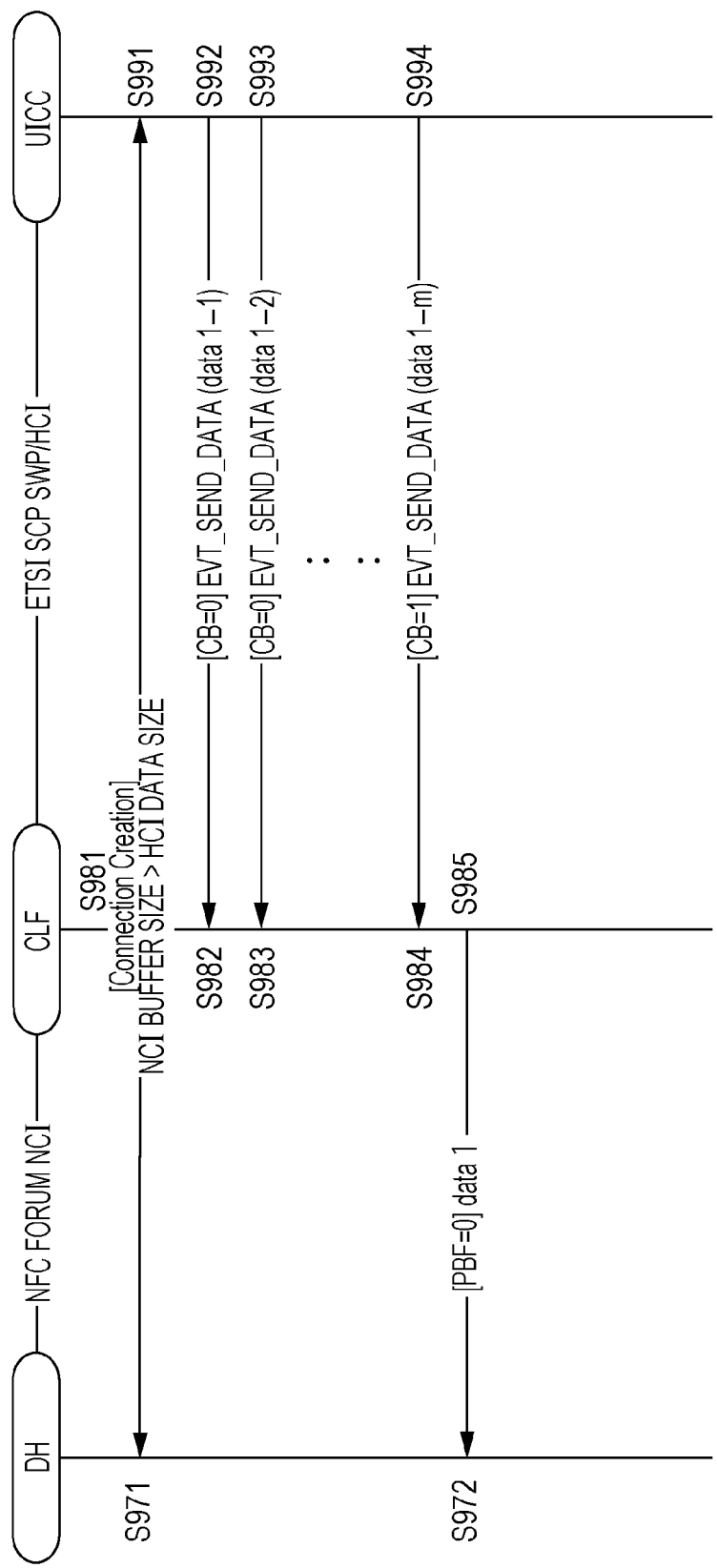
FIG. 36 is an explanatory diagram illustrating an exemplary conversion from HCI to NCI.

For example, when the HCP message data are smaller than the NCI buffer size, the message is transmitted according to the flowchart of FIG. 36.

That is, when the connection is created in step S971, step S981, and step S991, the plurality of HCP packets (data 1-1 to data 1-$m$) is transmitted from the UICC 803 as in step S992 to step S994, and is received by the CLF 802 as in step S982 to step S984. The data are converted by the CLF 802 and are unified into one NCI message (data 1). Then, the NCI message is transmitted to the device host 801 in step S985. The device host 801 receives the NCI message in step S972.

meaningful data data 1=data 1-1+data 1-2+ . . . +data 1-*m*

In FIG. 36, the case where the data size of the meaningful data data 1 is smaller than the NCI buffer size has been described. For example, when the data size of the meaningful data data 1 is larger than the NCI buffer size, the meaningful data data 1 is transmitted as the plurality of NCI messages to the device host 801. In this case, the CLF 802 may synthesize and transmit the HCP message data until the data size exceeds the NCI buffer size or may transmit one HCP message data as one NCI message without the synthesis. For example, the HCP message data may be equally fragmented so that the size of each fragmented HCP message data does not exceed the NCI buffer size. Other fragmenting methods may be used.

The synthesis and the transmission may be performed whenever the HCP message data are received or may be performed after all of the meaningful data are received. Moreover, the synthesis and the transmission may be performed at other timing.

As described above, the CLF 802 can appropriately convert the HCI format into the NCI format in various cases. Thus, even when it is necessary to fragment and synthesize the message, the UICC 803 can easily transmit the message to the device host 801 using the existing HCI interface, as in the case where the non-contact short-range communication with an external device is performed.

4. Fourth Embodiment

Computer

The above-described series of processes may be executed by hardware or software. In this case, a computer, for example, shown in FIG. 37 may be configured.

Figure 37:
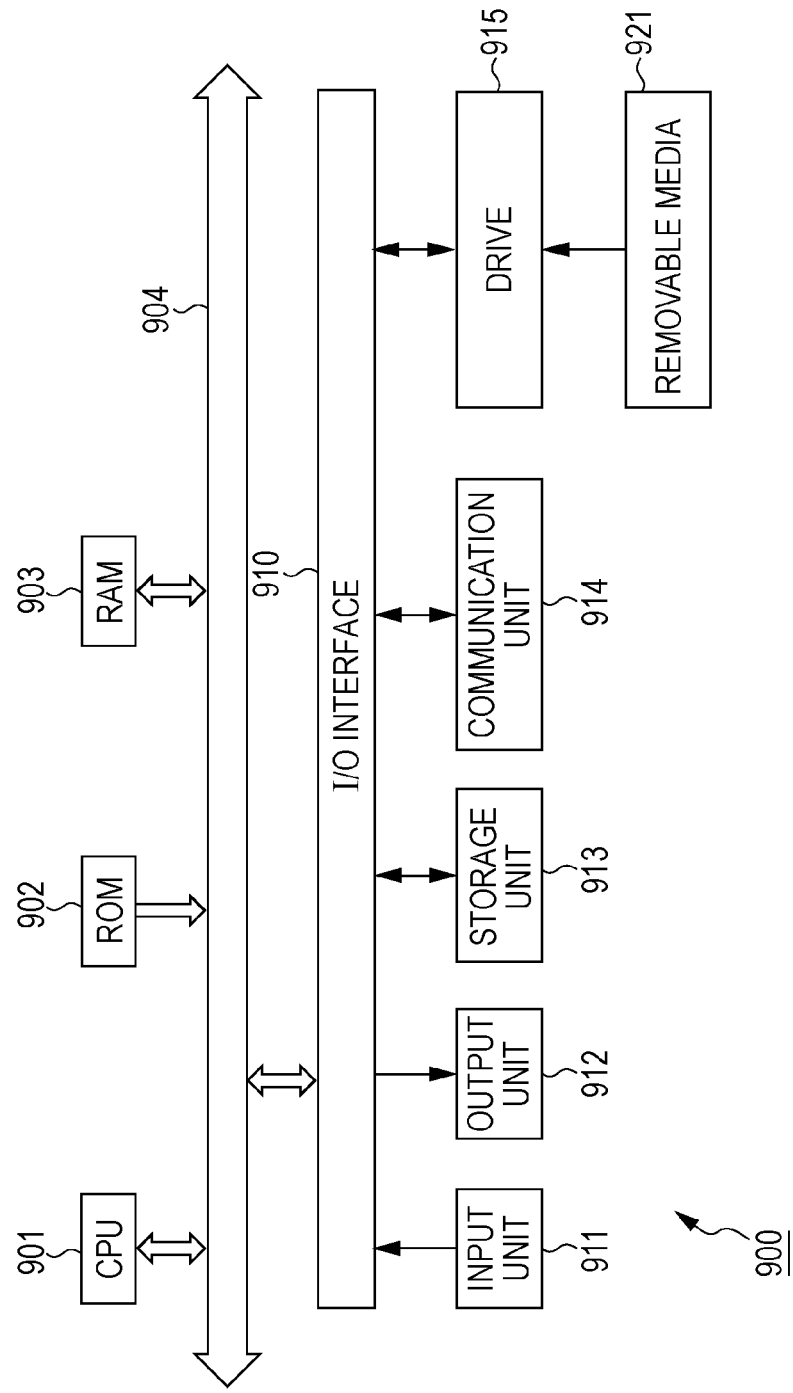
FIG. 37 is a block diagram illustrating an exemplary main configuration of a computer according to an embodiment.

In FIG. 37, a CPU (Central Processing Unit) 901 of a computer 900 executes a program stored in a ROM (Read-Only Memory) 902 or various kinds of processes in accordance with a program loaded in a RAM (Random Access Memory) 903 from a storage unit 913. In the RAM 903, when the various kinds of processes are executed by the CPU 901, necessary data are appropriately stored.

The CPU 901, the ROM 902, and the RAM 903 are connected to each other through a bus 904. An I/O interface 910 is also connected to the bus 904. For example, the bus 904 is formed by one or two physical lines.

An input unit 911 including a keyboard and a mouse, a display including a CRT (Cathode Ray Tube) and an LCD (Liquid Crystal Display), an output unit 912 including a speaker, a storage unit 913 including a hard disk, and a communication unit 914 including a modem are connected to the I/O interface 910. The communication unit 914 executes a communication process via a network such as the Internet.

A drive 915 is connected to the I/O interface 910, as necessary. A removable media 921 such as a magnetic disk, an optical disk, a magneto-optical disk, or a semiconductor memory is appropriately mounted and a computer readable program read from the removable media 921 is installed in the storage unit 913, as necessary.

When the above-described series of processes are executed by software, a program forming the software is installed via a network or from a recording medium.

For example, as shown in FIG. 37, the recording medium may be formed by the removable media 921, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory recording the program, which is distributed to deliver the program to users, apart from the device main body. Moreover, the recording medium may be formed by the ROM 902, a hard disk included in the storage unit 913, or the like recording the program, which is delivered to users in an embedded state in the device main body.

The program executed by a computer may be a program executed chronologically in the order described in the specification or a program executed in parallel or at necessary timing such as a timing when the program is called.

In the specification, the steps describing the program stored in the recording medium may be executed chronologically in the described order. Of course, the steps may be executed in parallel or individually instead of the chronological execution.

In the specification, the system indicates the entire device including the plurality of devices (apparatuses).

One device (or processing unit) described above may be divided and formed by a plurality of devices (or processing units). On the contrary, the plurality of devices (or processing units) described above may be combined and formed by one device (or processing unit). Of course, a configuration other than the above-described configuration may be added to the configuration of each device (or each processing unit). When the configurations of the operations of the entire system are substantially the same, a part of the configuration of any device (or any processing unit) may be included in the configuration of another device (or another processing unit).

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A communication device comprising:
a communication unit executing short-range radio communication with another device;
a control unit controlling the short-range radio communication executed by the communication unit;
a first fragmenting unit fragmenting a message transmitted from the communication unit to the control unit so as to have a predetermined size;
a first message fragment transmission unit sequentially transmitting a plurality of message fragments obtained by fragmenting the message by the first fragmenting unit, the plurality of message fragments including a sequence of one or more first message fragments and a final message fragment; and
a first termination message transmission unit transmitting a termination message within the communication device, which replaces at least the final message fragment and is used to terminate the message fragments being transmitted by the first message fragment transmission unit due to a disconnection of the short-range radio communication, before another message when the another message is transmitted during the transmission of the plurality of message fragments from the first message fragment transmission unit.
2. The communication device according to claim 1, wherein the predetermined size is an upper limit value of data size determined by a data transmission standard between the communication unit and the control unit.

3. The communication device according to claim 1, further comprising:
an event detection unit detecting occurrence of an event; and
an event transmission unit transmitting an event message used to give notification of the event from the communication unit to the control unit when the event detection unit detects the occurrence of the event,
wherein the first termination message transmission unit transmits the termination message before the transmission of the event message, when the event transmission unit transmits the event message during the transmission of the plurality of message fragments by the first message fragment transmission unit.

4. The communication device according to claim 3,
wherein the event detection unit detects disconnection of the short-range radio communication, which is executed by the communication unit, with the another device,
wherein the first termination message transmission unit terminates the message fragments and transmits the termination message indicating that a cause for terminating the message fragments is the disconnection of the short-range radio communication, and
wherein the event transmission unit transmits an event message indicating the disconnection of the short-range radio communication after the transmission of the termination message ends.

5. The communication device according to claim 1,
wherein flag information indicating whether the message fragment is the message fragment other than a the final message fragment is added to the message fragment, and
wherein the flag information with a value indicating that the message fragment is the final message fragment is added to the termination message.

6. The communication device according to claim 5, further comprising:
a message reception unit receiving the message fragments transmitted by the first message fragment transmission unit or the termination message transmitted by the first termination message transmission unit;
a message determination unit determining a value of the flag information added to the message received by the message reception unit;
a synthesis unit synthesizing the messages determined as the message fragments by the message determination unit; and
a confirmation unit confirming the message determined not to be the message fragment by the message determination unit or the message synthesized by the synthesis unit.

7. The communication device according to claim 1, further comprising:
a period determination unit determining whether a period in which the message is not transmitted by the first fragment message transmission unit exceeds a maximum allowable value; and
a setting update unit updating setting of an operation of the control unit when the period determination unit determines that the period in which the message is not transmitted exceeds the maximum allowable value.

8. The communication device according to claim 1, further comprising:
a second fragmenting unit fragmenting a message to be transmitted from the control unit to the communication unit so as to have a predetermined size;
a second message fragment transmission unit sequentially transmitting a plurality of message fragments obtained by fragmenting the message by the second fragmenting unit to the communication unit; and
a second termination message transmission unit transmitting a termination message, which is a message used to terminate the message fragments being transmitted by the second message fragment transmission unit, before another message when the another message is transmitted during the transmission of the plurality of message fragments from the control unit to the communication unit.

9. The communication device according to claim 8, wherein the second termination message transmission unit transmits the termination message of an empty message to terminate the message fragments.

10. The communication device according to claim 8, further comprising:
an event detection unit detecting occurrence of an event;
an event transmission unit transmitting an event message used to give notification of the event from the communication unit to the control unit when the event detection unit detects the occurrence of the event; and
an event reception unit receiving the event message transmitted by the event transmission unit,
wherein the second termination message transmission unit transmits the termination message, when the event reception unit receives the event message during the transmission of the plurality of message fragments by the second message fragment transmission unit.

11. The communication device according to claim 1, wherein the another message is separate from the message fragments.

12. The communication device according to claim 1, further comprising:
a message reception unit,
wherein the first termination message transmission unit transmits the termination message to the message reception unit before the another message is transmitted to the message reception unit when the another message is transmitted during the transmission of the plurality of message fragments from the first message fragment transmission unit to the message reception unit.

13. A communication device comprising:
a short-range radio communication unit executing short-range radio communication with another device;
a first processing unit transmitting and receiving a message to and from the another device through the short-range radio communication executed by the short-range radio communication unit and having a first interface of a predetermined standard;
a second processing unit having a second interface of a standard different from that of the first interface and communicating with the first processing unit via the second interface;
a reception unit receiving a first message, which is a message to be transmitted to the second processing unit, from the first processing unit via the first interface and receiving a second message, which is a message to be transmitted to the first processing unit, from the second processing unit via the second interface;
a conversion unit converting a format of the first message received by the reception unit from a format of the first interface to a format of the second interface and converting a format of the second message received by the reception unit from the format of the second interface to the format of the first interface, wherein the conversion unit includes a size comparison unit for comparing a size of the second message to a maximum size of data in the format of the first interface, wherein the maximum size is a buffer size of the format of the first interface;

a synthesis unit synthesizing a plurality of the second messages until the size of the sum of the plurality of second messages exceeds the maximum size as the comparison result of the size comparison unit; and a transmission unit transmitting the first message, of which the format is converted into the format of the second interface by the conversion unit, to the second processing unit via the second interface and transmitting the second message, of which the format is converted into the format of the first interface by the conversion unit, to the first processing unit via the first interface.

14. The communication device according to claim 13, wherein the conversion unit includes:

a fragmenting unit fragmenting the second message when the size of the second message is larger than the maximum size as the comparison result of the size comparison unit, wherein the transmission unit transmits message fragments obtained by fragmenting the second message by the fragmenting unit one by one.

15. The communication device according to claim 14, wherein the transmission unit transmits the plurality of second messages synthesized by the synthesis unit at once.

16. The communication device according to claim 15, wherein the conversion unit further includes:

a flag determination unit determining a value of flag information indicating whether there is a subsequent message fragmented from data with the same meaning as that of the second message, wherein the synthesis unit also terminates the synthesis even in a case where the size of the sum of the plurality of second messages is smaller than the maximum size, when the flag determination unit determines that there is no subsequent message, and wherein the transmission unit transmits the messages synthesized when the synthesis unit terminates the synthesis at once.

17. The communication device according to claim 13, wherein the conversion unit includes:

the size comparison unit comparing a size of the first message to the maximum size of data in the format of the second interface; and a fragmenting unit fragmenting the first message when the size of the first message is larger than the maximum size as the comparison result of the size comparison unit, wherein the transmission unit transmits message fragments obtained by fragmenting the first message by the fragmenting unit one by one.

18. The communication device according to claim 17, wherein the conversion unit includes:

the synthesis unit synthesizing a plurality of the first messages until the size of the sum of the plurality of first messages exceeds the maximum size as the comparison result of the size comparison unit, wherein the transmission unit transmits the plurality of first messages synthesized by the synthesis unit at once.

19. The communication device according to claim 18, wherein the conversion unit further includes:

a flag determination unit determining a value of flag information indicating whether there is a subsequent message fragmented from data with the same meaning as that of the first message, wherein the synthesis unit also terminates the synthesis even in a case where the size of the sum of the plurality of first messages is smaller than the maximum size, when the flag determination unit determines that there is no subsequent message, and wherein the transmission unit transmits the messages synthesized when the synthesis unit terminates the synthesis at once.

20. The communication device according to claim 13, wherein the conversion unit sets the second message and flag information indicating whether there is a subsequent message fragmented from data with the same meaning as the second message to data in the format of the first interface, when the conversion unit converts the format of the second message, and wherein the conversion unit sets the first message to data in the format of the second interface when the conversion unit converts the format of the first message.

21. A non-transitory computer readable medium storing a program causing a computer to function as:

a short-range radio communication unit executing short-range radio communication with another device;

a first processing unit transmitting and receiving a message to and from the another device through the short-range radio communication executed by the short-range radio communication unit and having a first interface of a predetermined standard;

a second processing unit having a second interface of a standard different from that of the first interface and communicating with the first processing unit via the second interface;

a reception unit receiving a first message, which is a message to be transmitted to the second processing unit, from the first processing unit via the first interface and receiving a second message, which is a message to be transmitted to the first processing unit, from the second processing unit via the second interface;

a conversion unit converting a format of the first message received by the reception unit from a format of the first interface to a format of the second interface and converting a format of the second message received by the reception unit from the format of the second interface to the format of the first interface, wherein the conversion unit includes a size comparison unit for comparing a size of the second message to a maximum size of data in the format of the first interface, wherein the maximum size is a buffer size of the format of the first interface;

a synthesis unit synthesizing a plurality of the second messages until the size of the sum of the plurality of second messages exceeds the maximum size as the comparison result of the size comparison unit; and a transmission unit transmitting the first message, of which the format is converted into the format of the second interface by the conversion unit, to the second processing unit via the second interface and transmitting the second message, of which the format is converted into the format of the first interface by the conversion unit, to the first processing unit via the first interface.

22. A communication method comprising:

executing short-range radio communication with another device by a short-range radio communication unit of a communication device;

transmitting and receiving a message to and from the another device through the short-range radio communication by a first processing unit of the communication device for having a first interface of a predetermined standard;

communicating with the first processing unit via a second interface by a second processing unit of the communication device for having the second interface of a standard different from that of the first interface;

receiving a first message, which is a message to be transmitted to the second processing unit, from the first processing unit via the first interface and receiving a second message, which is a message to be transmitted to the first processing unit, from the second processing unit via the second interface by a reception unit of the communication device;

converting a format of the received first message from a format of the first interface to a format of the second interface and converting a format of the received second message from the format of the second interface to the format of the first interface by a conversion unit of the communication device, and comparing a size of the second message to a maximum size of data in the format of the first interface, wherein the maximum size is a buffer size of the format of the first interface;

synthesizing a plurality of the second messages until the size of the sum of the plurality of second messages exceeds the maximum size as the comparison result of the size comparison unit; and transmitting the first message, of which the format is converted into the format of the second interface, to the second processing unit via the second interface and transmitting the second message, of which the format is converted into the format of the first interface, to the first processing unit via the first interface by a transmission unit of the communication device.

23. A non-transitory computer readable medium storing a program causing a communication device to function as:
a communication unit executing short-range radio communication with another device;
a control unit controlling the short-range radio communication executed by the communication unit;
a fragmenting unit fragmenting a message transmitted from the communication unit to the control unit so as to have a predetermined size;
a message fragment transmission unit sequentially transmitting a plurality of message fragments obtained by fragmenting the message by the fragmenting unit, the plurality of message fragments including a sequence of one or more first message fragments and a final message fragment; and a termination message transmission unit transmitting a termination message within the communication device, which replaces at least the final message fragment and is used to terminate the message fragments being transmitted by the message fragment transmission unit due to a disconnection of the short-range radio communication, before another message when the another message is transmitted during the transmission of the plurality of message fragments from the message fragment transmission unit.

24. A communication method comprising the steps of:
executing, by a communication unit of a communication device, short-range radio communication with another device;
controlling, by a control unit of the communication device, the short-range radio communication;
fragmenting, by a fragmenting unit of the communication device, a message transmitted from the communication unit to the control unit so as to have a predetermined size;
sequentially transmitting, by a message fragment transmission unit of the communication device, a plurality of message fragments obtained by fragmenting the message, the plurality of message fragments including a sequence of one or more first message fragments and a final message fragment; and
transmitting, by a termination message transmission unit of the communication device, a termination message within the communication device, which replaces at least the final message fragment and is used to terminate the message fragments being transmitted due to a disconnection of the short-range radio communication, before another message when the another message is transmitted during the transmission of the plurality of message fragments from the message fragment transmission unit.

* * * * *